US 12,537,946 B2

(12) United States Patent
Wang et al.

(10) Patent No.: US 12,537,946 B2
(45) Date of Patent: Jan. 27, 2026

(54) METHOD, DEVICE, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Yang Wang, Beijing (CN); Li Zhang, Los Angeles, CA (US); Kai Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 23 days.

(21) Appl. No.: 18/562,244

(22) PCT Filed: May 19, 2022

(86) PCT No.: PCT/CN2022/093994
§ 371 (c)(1),
(2) Date: Nov. 17, 2023

(87) PCT Pub. No.: WO2022/242729
PCT Pub. Date: Nov. 24, 2022

(65) Prior Publication Data
US 2024/0259560 A1 Aug. 1, 2024

(30) Foreign Application Priority Data
May 19, 2021 (WO) ................ PCT/CN2021/094729

(51) Int. Cl.
H04N 19/11 (2014.01)
H04N 19/119 (2014.01)
(Continued)

(52) U.S. Cl.
CPC ........... *H04N 19/11* (2014.11); *H04N 19/119* (2014.11); *H04N 19/172* (2014.11);
(Continued)

(58) Field of Classification Search
CPC .... H04N 9/593; H04N 19/119; H04N 19/463; H04N 19/70; H04N 19/60; H04N 19/11; H04N 19/176
See application file for complete search history.

(56) References Cited

U.S. PATENT DOCUMENTS 11,843,725 B2 * 12/2023 Zhang .................... H04N 19/96
11,936,916 B2 * 3/2024 Jang ..................... H04N 19/176
(Continued)

FOREIGN PATENT DOCUMENTS

WO 2017192995 A1 11/2017
WO 2020185910 A1 9/2020

OTHER PUBLICATIONS

Abdoli et al. "Non-CE3: Decoder-side Intra Mode Derivation with Prediction Fusion", JVET of ITU-T SG 16 WP 3 and ISO/IEC JTC 1/SC 29/WG 11, 14th Meeting: Geneva, CH, Document: JVET-N0342-v5, Mar. 19, 2019, 6 pages.
(Continued)

*Primary Examiner* — Tsion B Owens
(74) *Attorney, Agent, or Firm* — Astute IP Law Group

(57) ABSTRACT

Embodiments of the present disclosure provide a solution for video processing. A method for video processing is proposed. The method comprises: processing, during a conversion between a picture of a video and a bitstream of the video, a first video block in the picture based on a combination of decoder-side intra prediction mode derivation (DIMD) and intra prediction with subpartitions (ISP), the DIMD being used for deriving at least one intra prediction mode (IPM); and performing the conversion based on the
(Continued)

first video block. Compared with the conventional solution, the proposed method can advantageously improve the coding effectiveness and coding efficiency.

19 Claims, 28 Drawing Sheets

(51) Int. Cl.
    *H04N 19/172*    (2014.01)
    *H04N 19/176*    (2014.01)
    *H04N 19/593*    (2014.01)
    *H04N 19/60*     (2014.01)
    *H04N 19/70*     (2014.01)
(52) U.S. Cl.
    CPC ......... *H04N 19/176* (2014.11); *H04N 19/593* (2014.11); *H04N 19/60* (2014.11); *H04N 19/70* (2014.11)

(56) References Cited

U.S. PATENT DOCUMENTS

| | | | |
|---|---|---|---|
| 12,047,570 B2* | 7/2024 | Gao | H04N 19/157 |
| 12,200,201 B2* | 1/2025 | Wang | H04N 19/167 |
| 2020/0252608 A1 | 8/2020 | Ramasubramonian et al. | |
| 2021/0051343 A1* | 2/2021 | Piao | H04N 19/109 |
| 2022/0224913 A1* | 7/2022 | Wang | H04N 19/593 |
| 2022/0224922 A1* | 7/2022 | Wang | H04N 19/147 |
| 2022/0329800 A1* | 10/2022 | Ray | H04N 19/176 |
| 2022/0345691 A1* | 10/2022 | Li | H04N 19/70 |

OTHER PUBLICATIONS

De-Luxan-Hernandez et al., "Non-CE6: Combination of ISP and LFNST", JVET of ITU-T SG 16 WP 3 and ISO/IEC JTC 1/SC 29/WG 11, 16th Meeting: Geneva, CH, Document: JVET-P0392-v4, Oct. 11, 2019, 7 pages.
International Search Report in PCT/CN2022/093994, mailed 2022-08-16, 3 pages.

\* cited by examiner log2(nTbH)

1 ←——→ 6

51    ┌  -6 -5 -4 -3 -2 -1
            │  -5 -4 -3 -2 -1  0
            ▲  -4 -3 -2 -1  0  1
            ┊  -4 -3 -2 -1  0  1
            ┊  -3 -2 -1  0  1  2
            ┊  -3 -2 -1  0  1  2
            ┊  -3 -2 -1  0  1  2
            ┊  -2 -1  0  1  2  2
            ┊  -2 -1  0  1  2  2
            ┊  -2 -1  0  1  2  2
   Mode     ┊  -2 -1  0  1  2  2
   index    ┊  -2 -1  0  1  2  2
            ┊  -2 -1  0  1  2  2
            ┊  -1  0  1  2  2  2
            ┊  -1  0  1  2  2  2
            ┊  -1  0  1  2  2  2
            ┊  -1  0  1  2  2  2
            ┊  -1  0  1  2  2  2
            ┊  -1  0  1  2  2  2
            ┊   0  1  2  2  2  2
            ┊   0  1  2  2  2  2
            ┊   0  1  2  2  2  2
            ┊   0  1  2  2  2  2
            ┊   0  1  2  2  2  2
            ┊   1  2  2  2  2  2
            ┊   1  2  2  2  2  2
            ┊   1  2  2  2  2  2
            ▼   2  2  2  2  2  2
      80        2  2  2  2  2  2
                2  2  2  2  2  2

Fig. 11

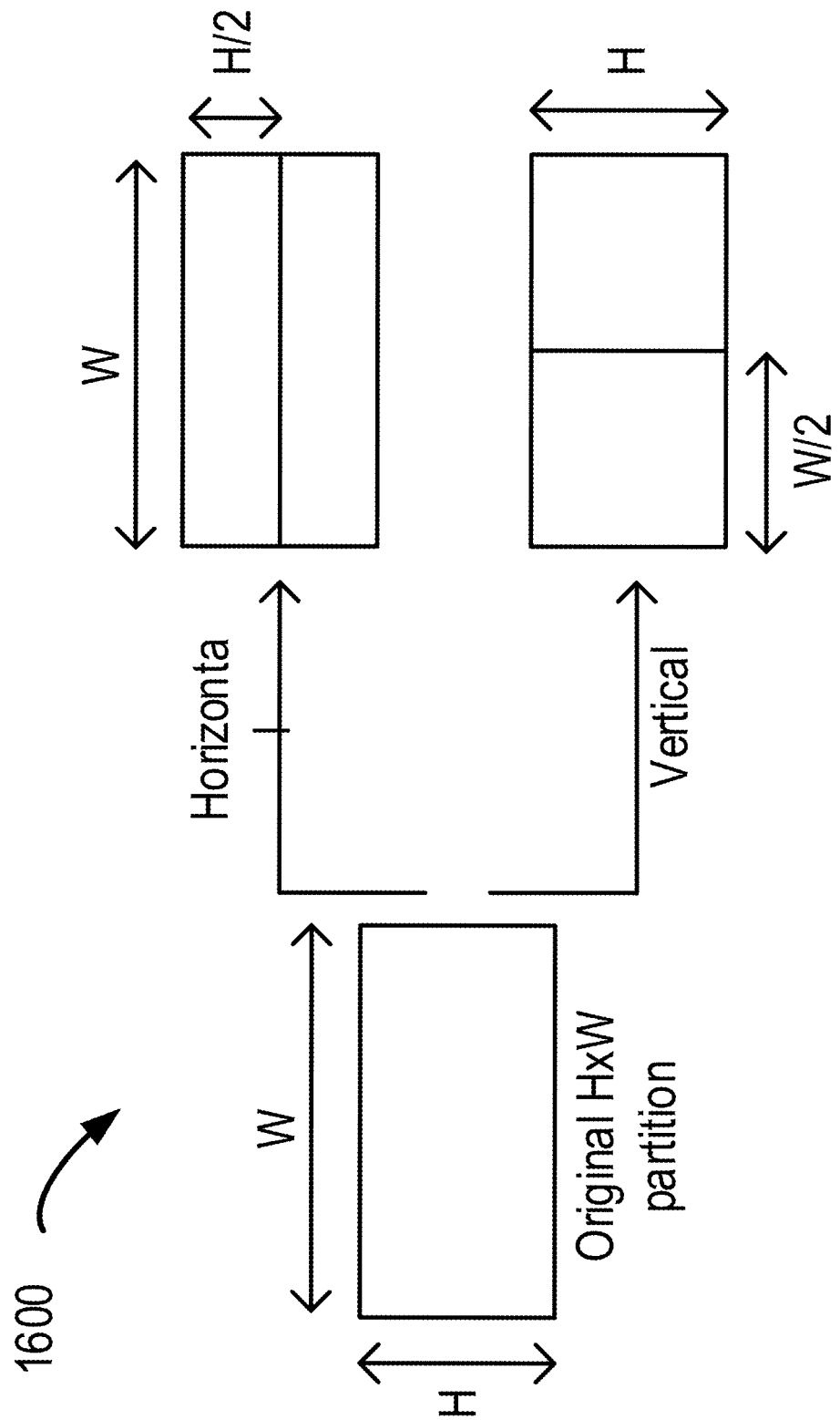

METHOD, DEVICE, AND MEDIUM FOR VIDEO PROCESSING

CROSS-REFERENCE TO RELATED APPLICATIONS

This is a national stage application filed under 37 U.S.C. 371 based on International Patent Application No. PCT/CN2022/093994, filed May 19, 2022, which claims priority to International Patent Application No. PCT/CN2021/094729 filed with the China National Intellectual Property Administration (CNIPA) on May 19, 2021, the disclosures of which are incorporated herein by reference in their entireties.

FIELD

Embodiments of the present disclosure relates generally to video coding techniques, and more particularly, to intra prediction based on decoder-side intra prediction mode derivation (DIMD) and intra prediction with subpartitions (ISP).

BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

SUMMARY

Embodiments of the present disclosure provide a solution for video processing.

In a first aspect, a method for video processing is proposed. The method comprises: processing, during a conversion between a picture of a video and a bitstream of the video, a first video block in the picture based on a combination of decoder-side intra prediction mode derivation (DIMD) and intra prediction with subpartitions (ISP), the DIMD being used for deriving at least one intra prediction mode (IPM); and performing the conversion based on the first video block. Compared with the conventional solution, in such a combined mode, which may be denoted as DIMD_ISP mode, the signaling overhead of intra prediction can be reduced, and the coding efficiency and performance are improved.

In a second aspect, an apparatus for video processing, comprising a processor and a non-transitory memory coupled to the processor and having instructions stored thereon, wherein the instructions upon execution by the processor, cause the processor to perform a method in accordance with the first aspect of the present disclosure.

In a third aspect, non-transitory computer-readable storage medium storing instructions that cause a processor to perform a method in accordance with the first aspect of the present disclosure.

In a fourth aspect, a non-transitory computer-readable recording medium storing a bitstream of a video which is generated by a method performed by a video processing apparatus, wherein the method comprises: processing a first video block in a picture of the video based on a combination of decoder-side intra prediction mode derivation (DIMD) and intra prediction with subpartitions (ISP), the DIMD being used for deriving at least one intra prediction mode (IPM); and generating the bitstream based on the first video block.

In a fifth aspect, a method for storing bitstream of a video, comprising: processing a first video block in a picture of the video based on a combination of decoder-side intra prediction mode derivation (DIMD) and intra prediction with subpartitions (ISP), the DIMD being used for deriving at least one intra prediction mode (IPM); generating the bitstream based on the first video block; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 9A shows the diagonal top-right mode, FIG. 9B shows the diagonal bottom-left mode, FIG. 9C shows the adjacent diagonal top-right mode, and FIG. 9D shows the adjacent diagonal bottom-left mode;

FIG. 11 is a schematic diagram that illustrates nScale values with respect to nTbH and mode number; for all nScale<0 cases gradient approach is used;

FIGS. 16A and 16B are schematic diagrams that illustrate the sub-partition depending on the block size, where examples of sub-partitions for 4×8 and 8×4 CUs are shown in FIG. 16A, and examples of sub-partitions for CUs other than 4×8, 8×4 and 4×4 are shown in FIG. 16B;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
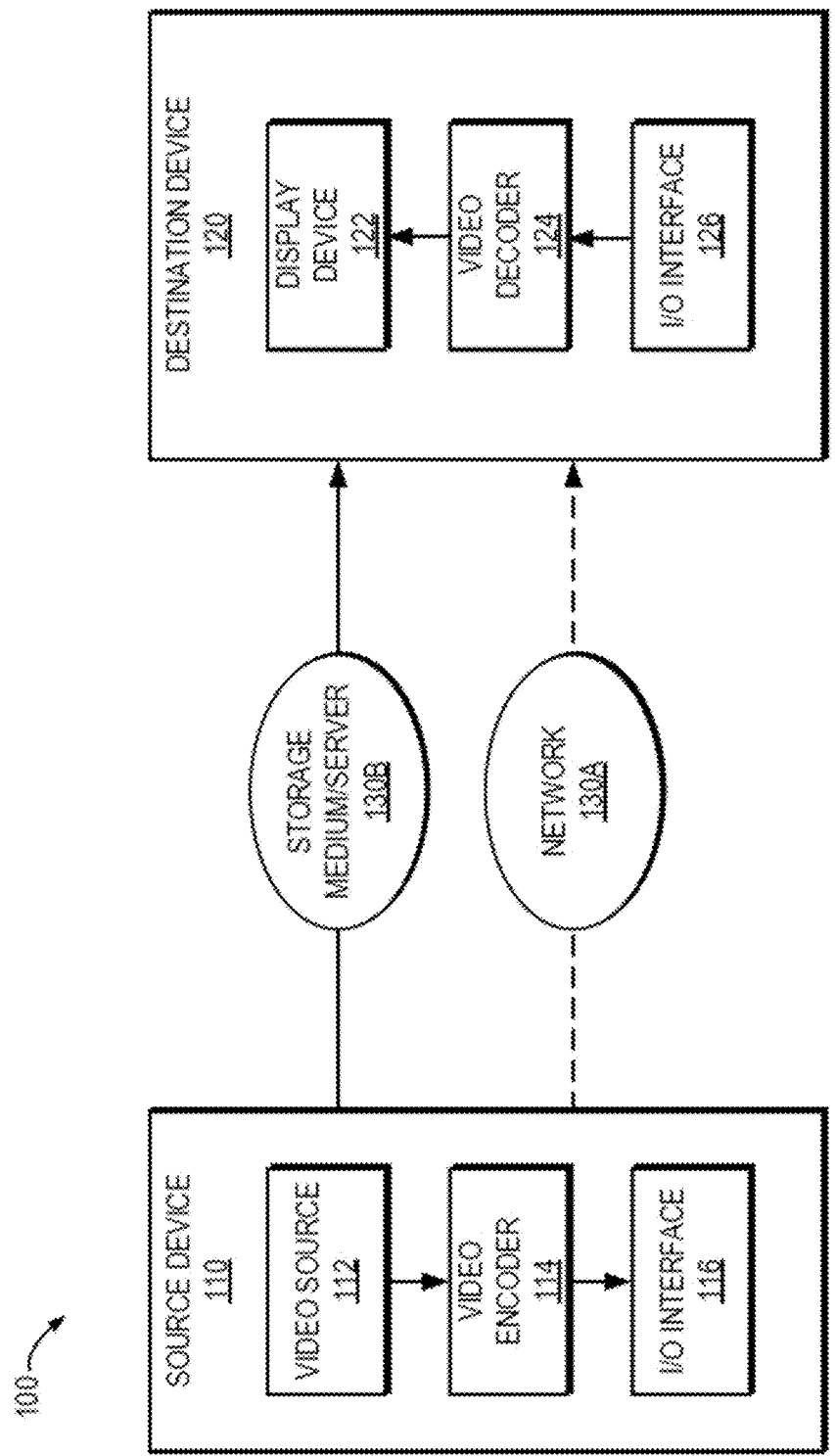
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
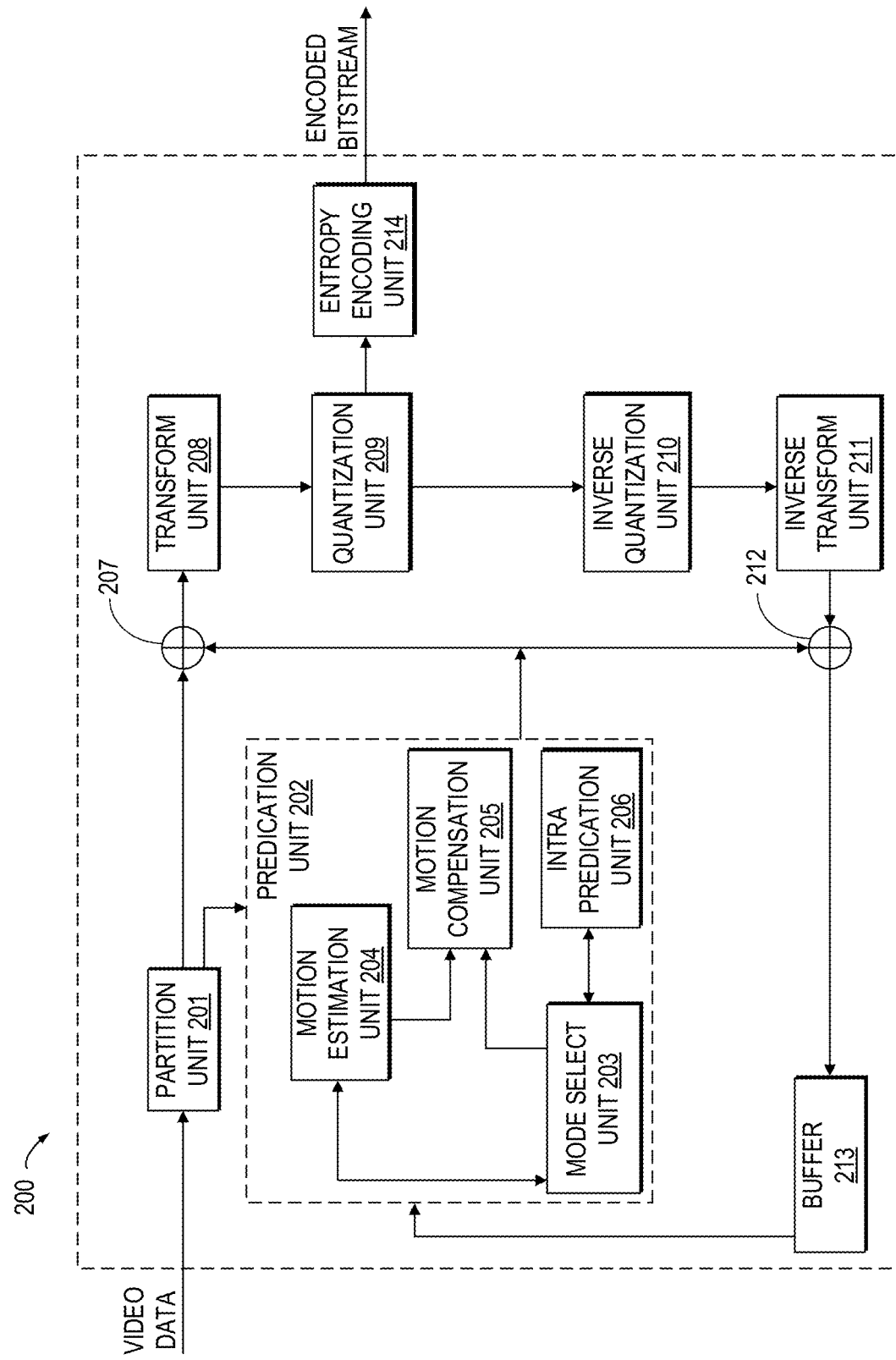
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may process a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
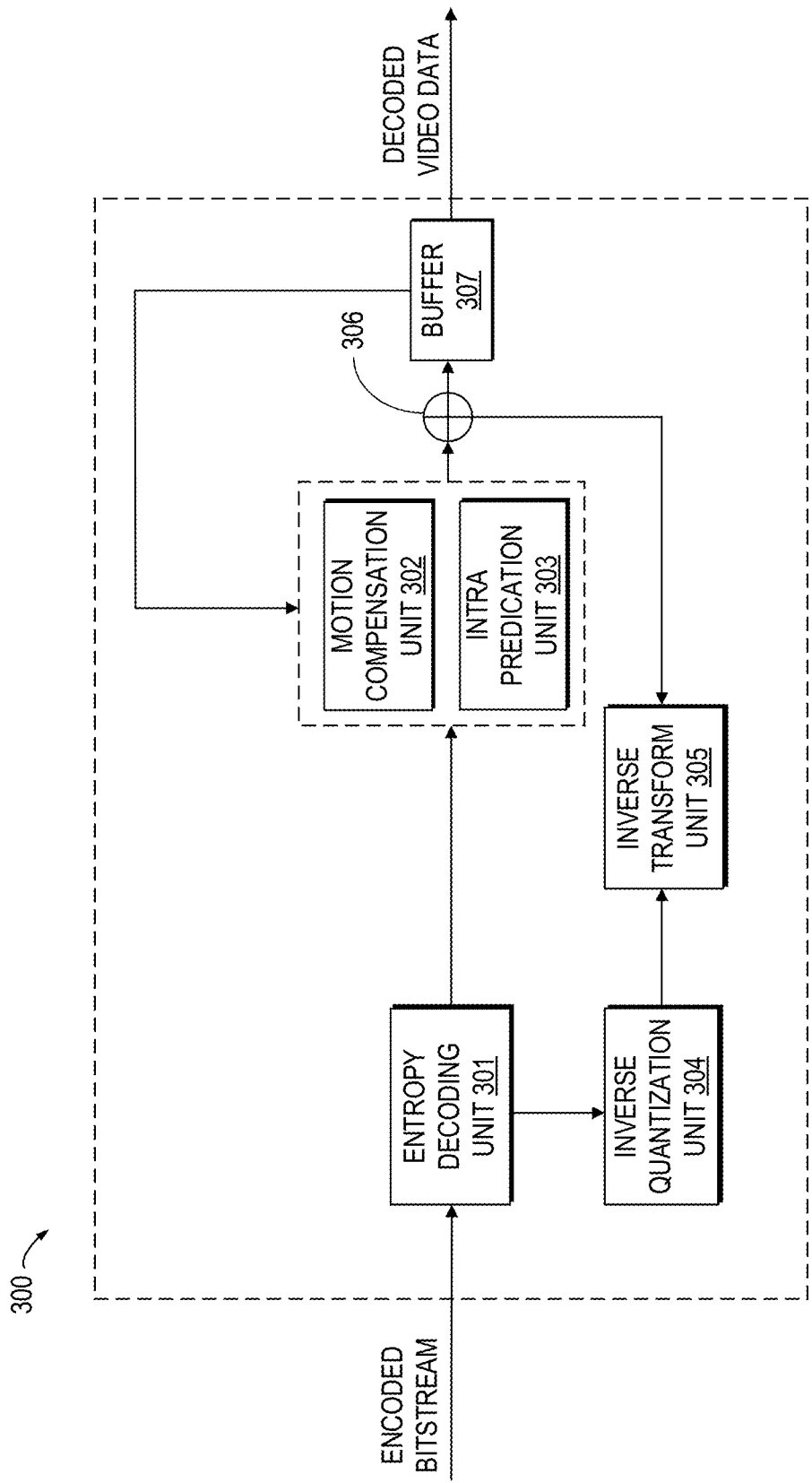
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is related a coding tool that derives intra prediction mode using previously decoded blocks, and intra prediction with subpartitions (ISP) and other coding tools in image/video coding. It may be applied to the existing video coding standard like HEVC, or Versatile Video Coding (VVC). It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 10) could be found at: http://phenix.it-sudparis.eu/jvet/doc_end_user/documents/20_Teleconference/wg11/JVET-T2001-v1.zip The latest reference software of VVC, named VTM, could be found at: https://vcgit.hhi.fraunhofer.de/jvet/VVCSoftware_VTM/-/tags/VTM-11.0

2.1. Coding Flow of a Typical Video Codec

Figure 4:
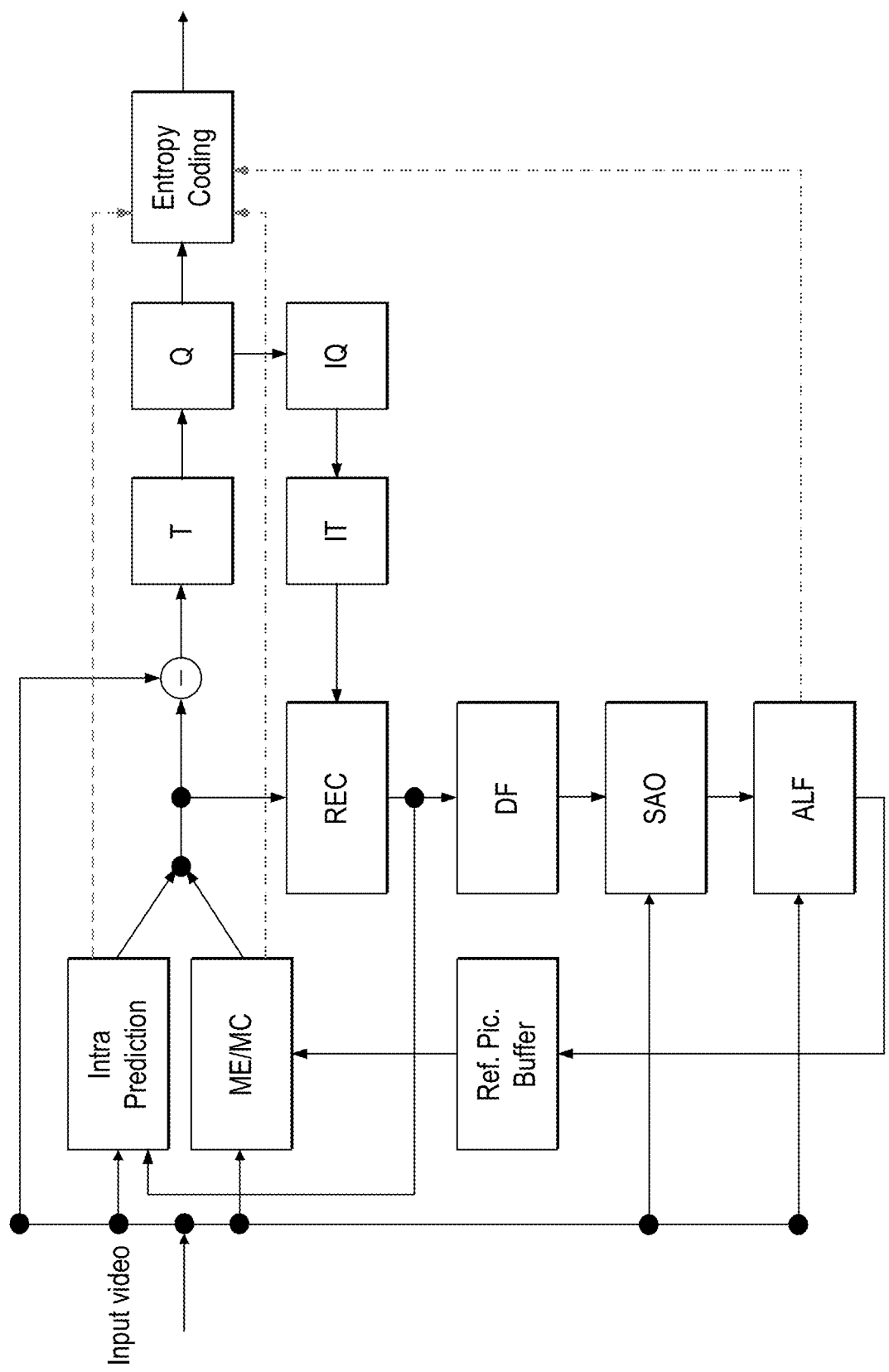
FIG. 4 is a schematic diagram that illustrates an example of encoder block diagram.

FIG. 4 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.2. Intra Mode Coding with 67 Intra Prediction Modes

Figure 5:
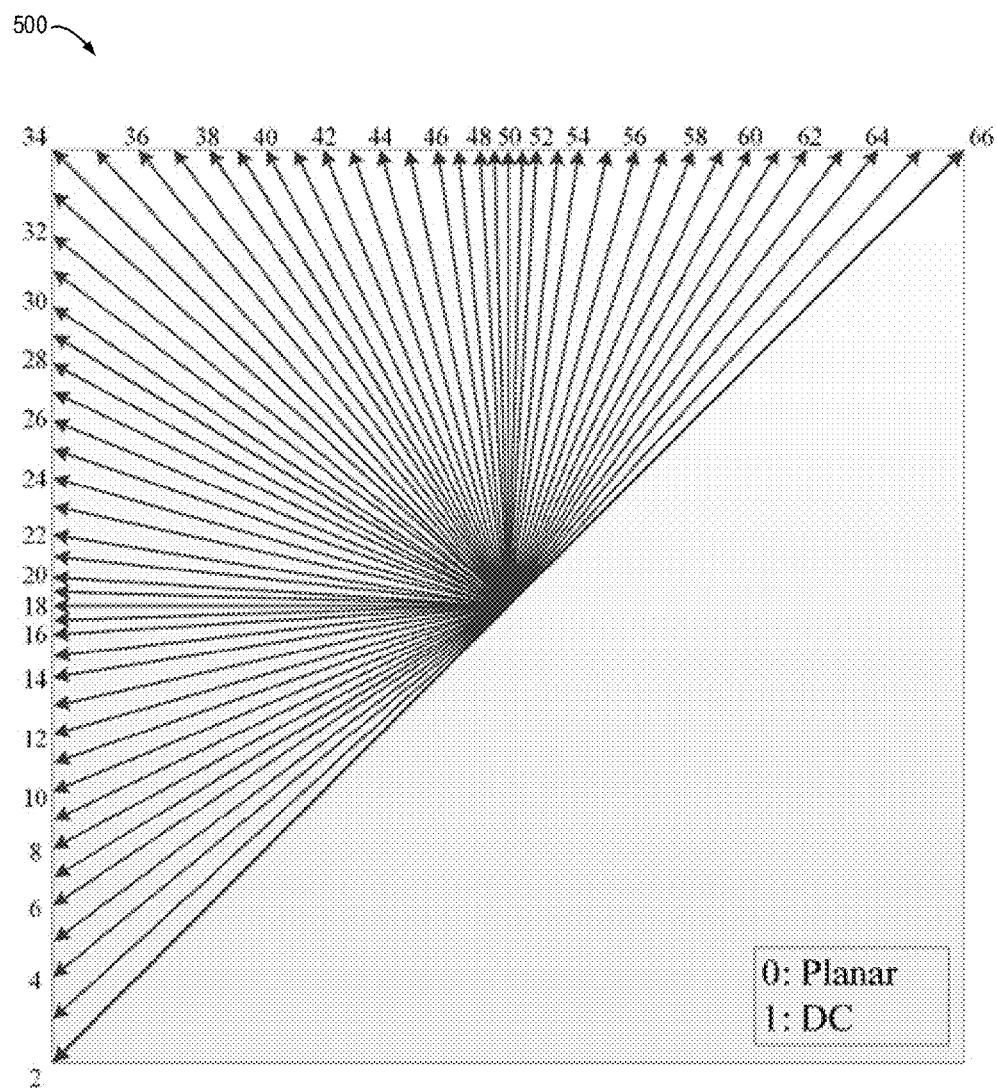
FIG. 5 is a schematic diagram that illustrates intra prediction modes.

To capture the arbitrary edge directions presented in natural video, the number of directional intra modes 500 is extended from 33, as used in HEVC, to 65, as shown in FIG. 5, and the planar and DC modes remain the same. These denser directional intra prediction modes apply for all block sizes and for both luma and chroma intra predictions.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.2.1. Wide Angle Intra Prediction

Although 67 modes are defined in the VVC, the exact prediction direction for a given intra prediction mode index is further dependent on the block shape. Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 6:
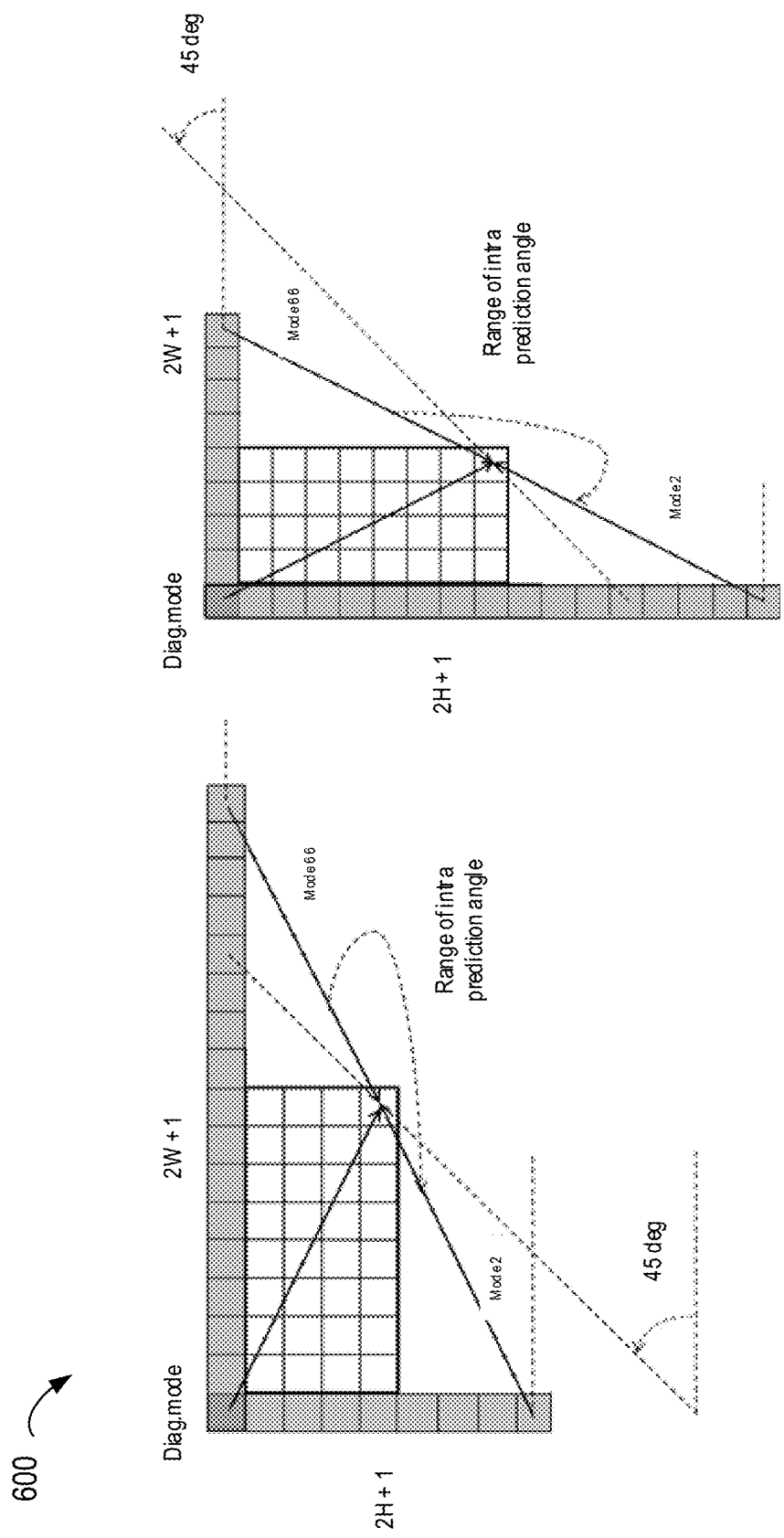
FIG. 6 is a schematic diagram that illustrates example reference samples for wide-angular intra prediction.

To support these prediction directions, the top reference with length 2W+1, and the left reference with length 2H+1, are defined as shown in FIG. 6. FIG. 6 is a schematic diagram that illustrates example reference samples 600 for wide-angular intra prediction.

The number of replaced modes in wide-angular direction mode depends on the aspect ratio of a block. The replaced intra prediction modes are illustrated in Table 2-1.

TABLE 2-1

Intra prediction modes replaced by wide-angular modes

| Aspect ratio | Replaced intra prediction modes |
| --- | --- |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == ½ | Modes 59, 60, 61, 62, 63, 64, 65, 66 |
| W/H == ¼ | Mode 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 7:
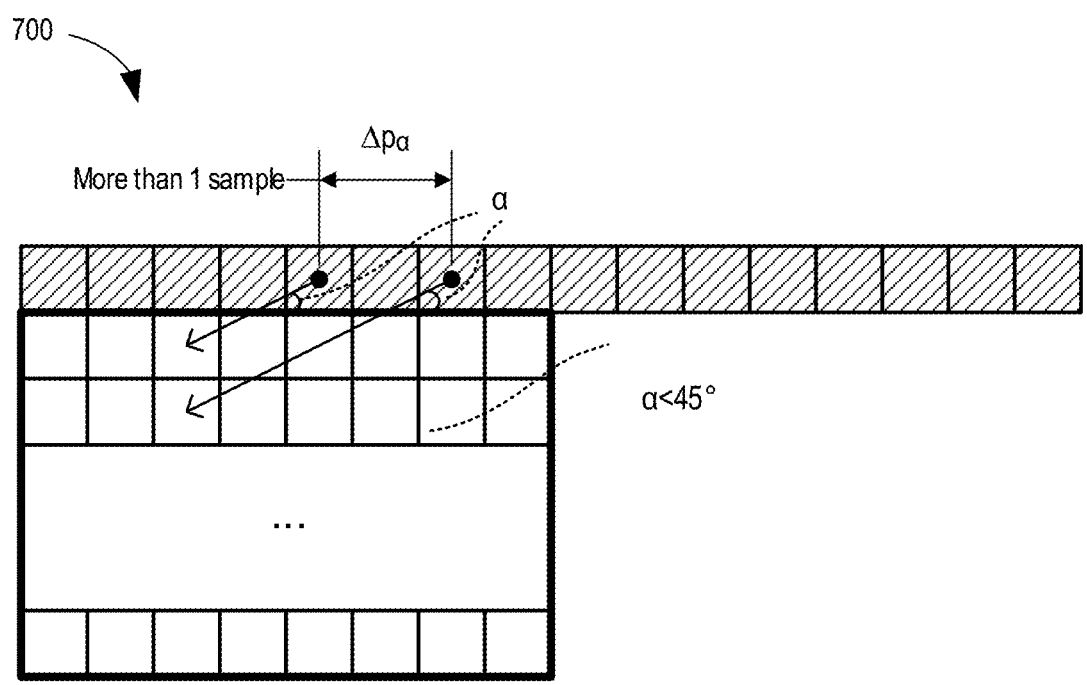
FIG. 7 is a schematic diagram that illustrates the problem of discontinuity in case of directions beyond 45°.

FIG. 7 is a schematic diagram that illustrates the problem 700 of discontinuity in case of directions beyond 45°. As shown in FIG. 7, two vertically adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes. In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

2.3. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.4. Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed. In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected. In block matching search, the search range is set to cover both the previous and current CTUs. At CU level, IBC mode is signalled with a flag and it can be signalled as IBC AMVP mode or IBC skip/merge mode as follows:

IBC skip/merge mode: a merge candidate index is used to indicate which of the block vectors in the list from neighbouring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.5. Cross-Component Linear Model Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, j) = \alpha \cdot rec'_L(i, j) + \beta \quad (2-1)$$

where $pred_c(i,j)$ represents the predicted chroma samples in a CU and $rec_L(i,j)$ represents the down-sampled reconstructed luma samples of the same CU.

The CCLM parameters ($\alpha$ and $\beta$) are derived with at most four neighbouring chroma samples and their corresponding down-sampled luma samples. Suppose the current chroma block dimensions are W×H, then W" and H' are set as $W' = W, H' = H$ when $LM$ mode is applied;

$W' = W + H' = H$ when $LM-T$ mode is applied;

$H' = H + W$ when $LM-L$ mode is applied;

The above neighbouring positions are denoted as $S[0, -1] \ldots S[W'-1, -1]$ and the left neighbouring positions are denoted as $S[-1, 0] \ldots S[-1, H'-1]$. Then the four samples are selected as $S[W'/4, -1]$, $S[3*W'/4, -1]$, $S[-1, H'/4]$, $S[-1, 3*H'/4]$ when LM mode is applied and both above and left neighbouring samples are available;

$S[W'/8, -1]$, $S[3*W'/8, -1]$, $S[5*W'/8, -1]$, $S[7*W'/8, -1]$ when LM-T mode is applied or only the above neighbouring samples are available;

$S[-1, H'/8]$, $S[-1, 3*H'/8]$, $S[-1, 5*H'/8]$, $S[-1, 7*H'/8]$ when LM-L mode is applied or only the left neighbouring samples are available;

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$X_a = (x^0_A + x^1_A + 1) \gg 1; X_b = (x^0_B + x^1_B + 1) \gg 1; \quad (2\text{-}2)$$

$$Y_a = (y^0_A + y^1_A + 1) \gg 1; Y_b = (y^0_B + y^1_B + 1) \gg 1$$

Finally, the linear model parameters α and β are obtained according to the following equations.

$$\alpha = \frac{Y_a - Y_b}{X_a - X_b} \quad (2\text{-}3)$$

$$\beta = Y_b - \alpha \cdot X_b \quad (2\text{-}4)$$

Figure 8:
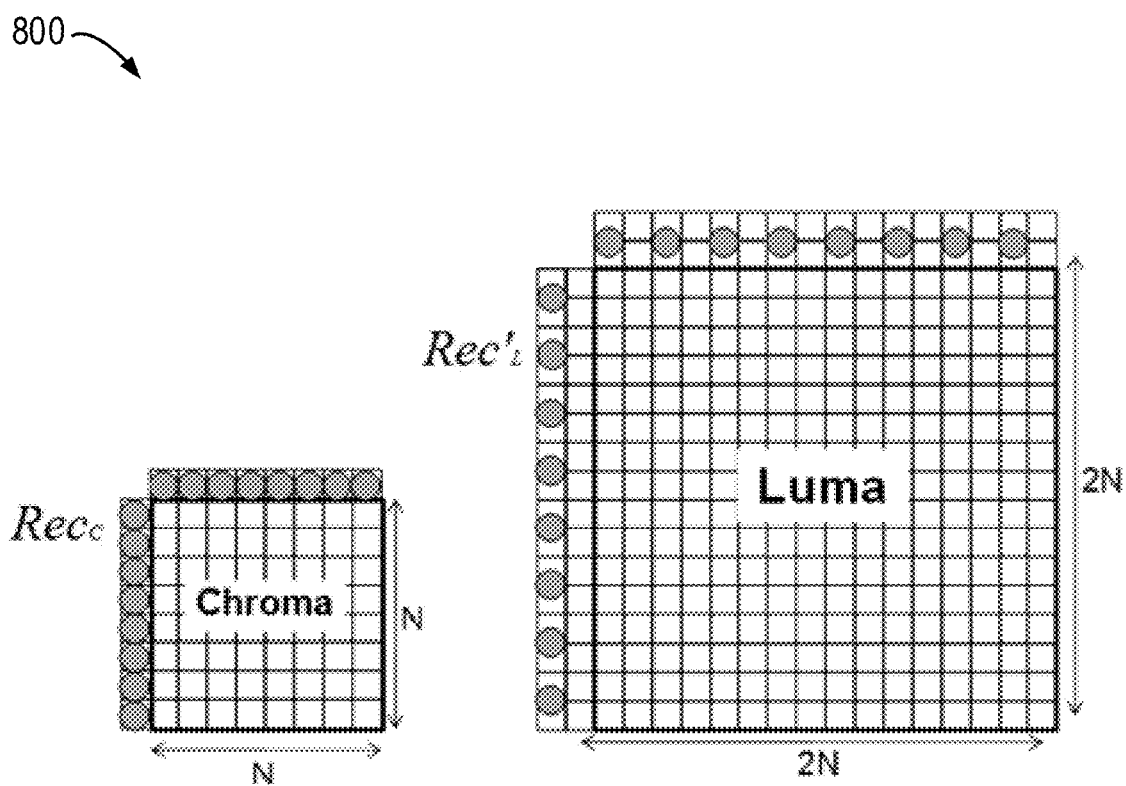
FIG. 8 is a schematic diagram that illustrates example locations of the samples used for the derivation of a and β.
Figure 9A:
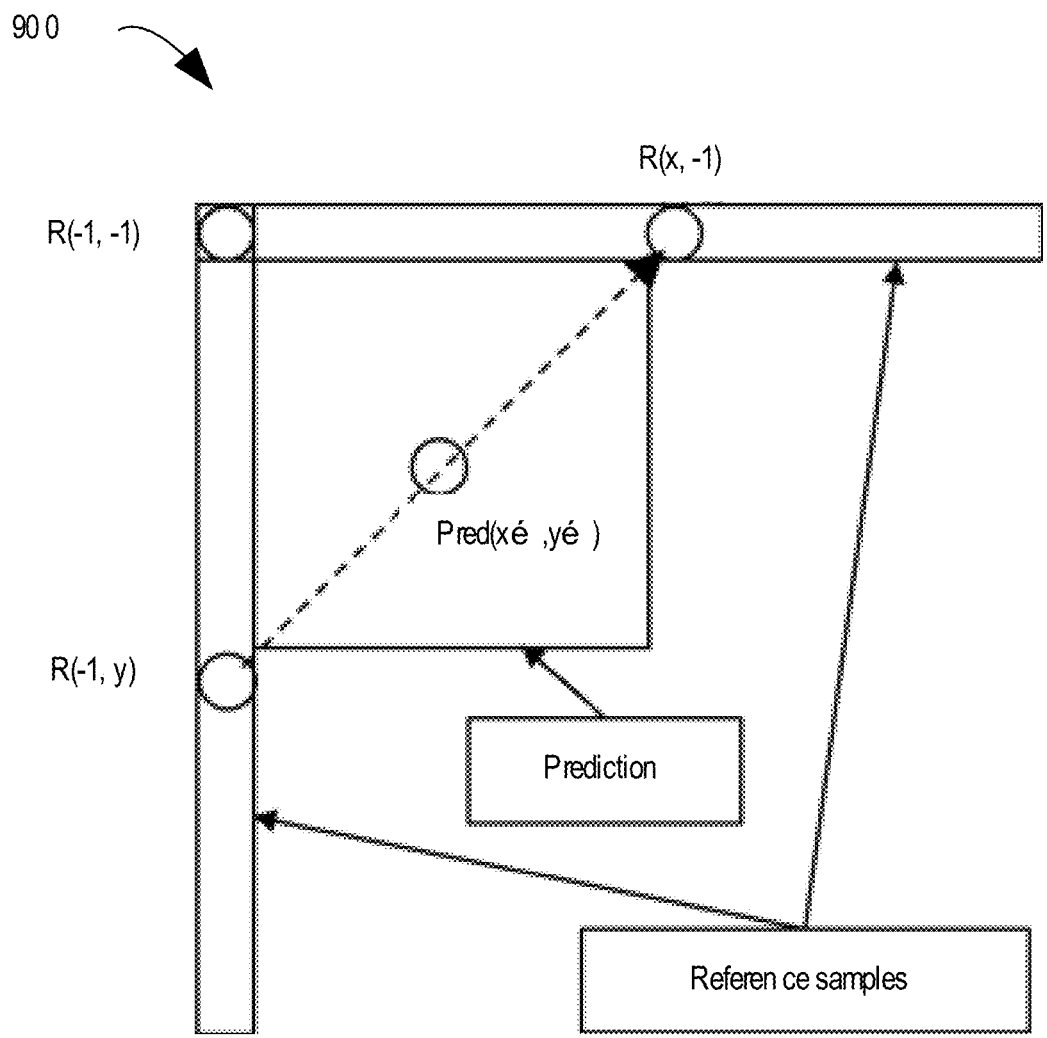
FIG. 9A to FIG. 9D are schematic diagrams that illustrate the definition of samples used by PDPC applied to diagonal and adjacent angular intra modes, where
Figure 9B:
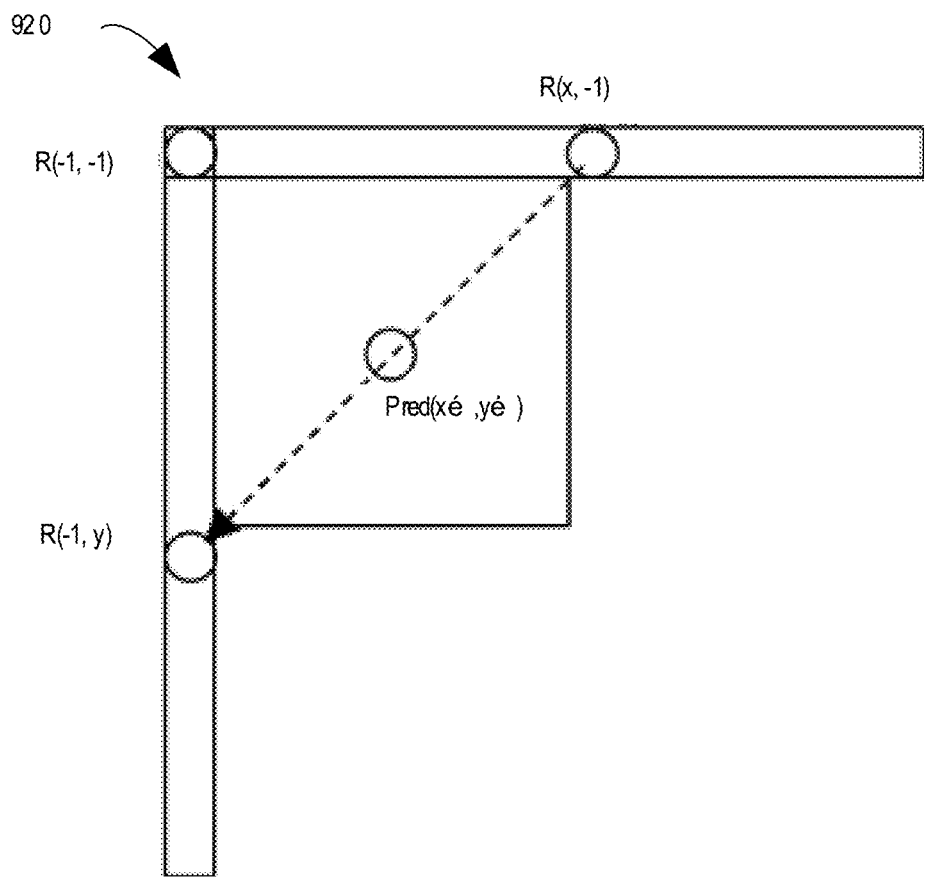
Figure 9C:
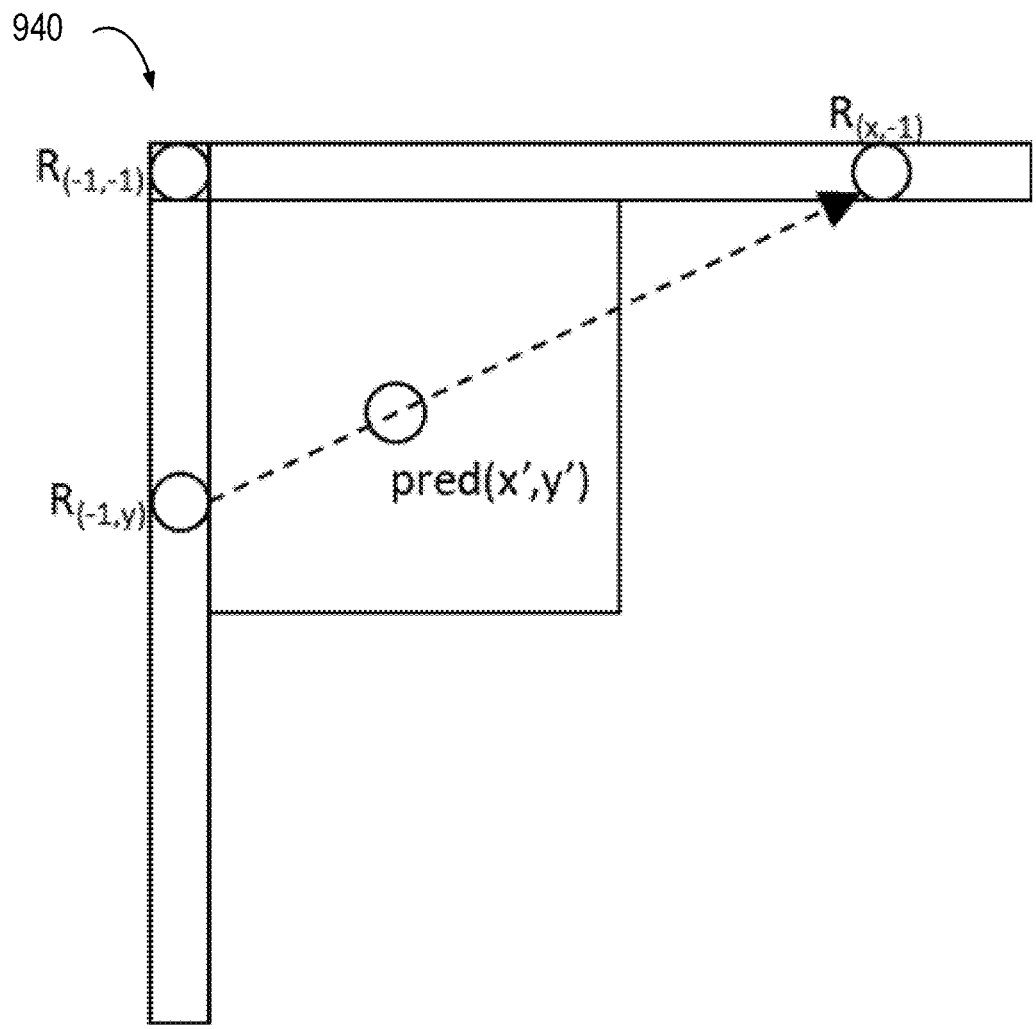
Figure 9D:
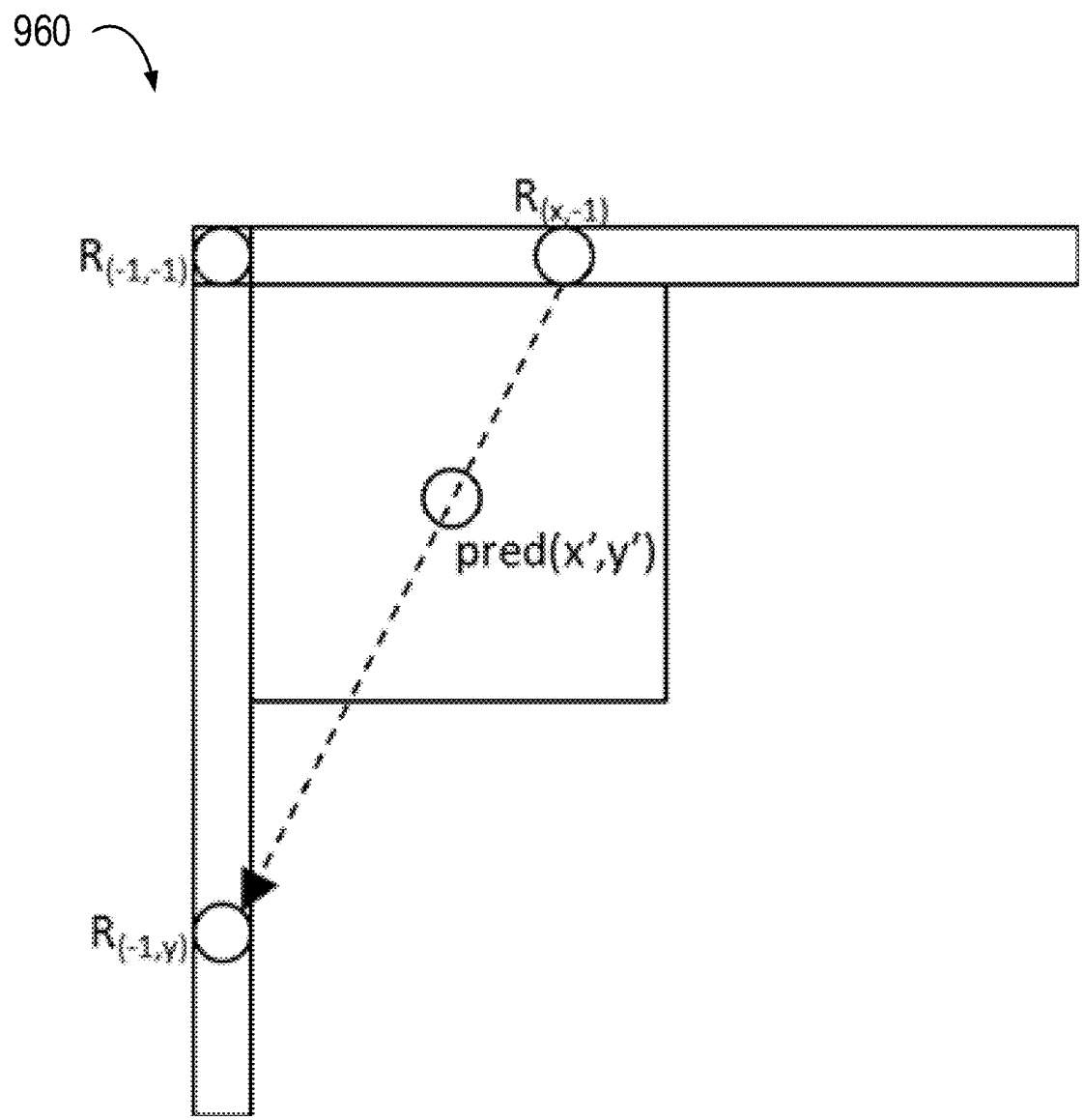

FIG. 8 shows an example 800 of the location of the left and above samples and the sample of the current block involved in the CCLM mode.

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

$$DivTable\ [] = \{0, 7, 6, 5, 5, 4, 4, 3, 3, 2, 2, 1, 1, 1, 1, 0\} \quad (2\text{-}5)$$

This would have a benefit of both reducing the complexity of the calculation as well as the memory size required for storing the needed tables Besides the above template and left template can be used to calculate the linear model coefficients together, they also can be used alternatively in the other 2 LM modes, called LM_T, and LM_L modes.

In LM_T mode, only the above template is used to calculate the linear model coefficients. To get more samples, the above template is extended to (W+H) samples. In LM_L mode, only left template is used to calculate the linear model coefficients. To get more samples, the left template is extended to (H+W) samples.

In LM mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the a and β values to the decoder.

For chroma intra mode coding, a total of 8 intra modes are allowed for chroma intra mode coding. Those modes include five traditional intra modes and three cross-component linear model modes (LM, LM_T, and LM_L). Chroma mode signalling and derivation process are shown in Table 2-2. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2-2

Derivation of chroma prediction mode from luma mode when CCLM is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2-3.

TABLE 2-3

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2-3, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_T (1). For this case, when sps_cclm_enabled_flag is 0, the first bin of the binarization table for the corresponding $$R'_L(i, j) = \left[ \begin{array}{c} rec_L(2i-1, 2j-1) + 2 \cdot rec_L(2i-1, 2j-1) + rec_L(2i+1, 2j-1) + \\ red_L(2i-1, 2j) + 2 \cdot rec_L(2i, 2j) + rec_L(2i+1, 2j) + 4 \end{array} \right] \gg 3 \quad (2\text{-}6)$$

$$rec'_L = \left[ \begin{array}{c} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{array} \right] \gg 3 \quad (2\text{-}7)$$

intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2-3 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node is allowed to use CCLM in the following way:

If the 32×32 chroma node is not split or partitioned QT split, all chroma Cus in the 32×32 node can use CCLM If the 32×32 chroma node is partitioned with Horizontal BT, and the 32×16 child node does not split or uses Vertical BT split, all chroma Cus in the 32×16 chroma node can use CCLM.

In all the other luma and chroma coding tree split conditions, CCLM is not allowed for chroma CU.

2.6. Position Dependent Intra Prediction Combination

In VVC, the results of intra prediction of DC, planar and several angular modes are further modified by a position dependent intra prediction combination (PDPC) method. PDPC is an intra prediction method which invokes a combination of the boundary reference samples and HEVC style intra prediction with filtered boundary reference samples. PDPC is applied to the following intra modes without signalling: planar, DC, intra angles less than or equal to horizontal, and intra angles greater than or equal to vertical and less than or equal to 80. If the current block is BDPCM mode or MRL index is larger than 0, PDPC is not applied.

The prediction sample pred(x'y') is predicted using an intra prediction mode (DC, planar, angular) and a linear combination of reference samples according to the Equation 2-8 as follows:

$$pred(x', y') = \text{Clip}(0, (1 \ll BitDepth) - 1, \qquad (2\text{-}8)$$
$$(wL \times R_{-1,y'} + wT \times R_{x',-1} + (64 - wL - wT) \times pred(x', y') + 32) \gg 6)$$

where $R_{x,-1}$, $R_{-1,y}$ represent the reference samples located at the top and left boundaries of current sample (x,y), respectively.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical. For angular modes, if the current angular mode is HOR_IDX or VER_IDX, left or top reference samples is not used, respectively. The PDPC weights and scale factors are dependent on prediction modes and the block sizes. PDPC is applied to the block with both width and height greater than or equal to 4.

FIGS. 9A to 9D illustrate the definition of reference samples ($R_{x,-1}$ and $R_{-1,y}$) for PDPC applied over various prediction modes. The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other angular mode, the reference samples $R_{x,-1}$ and $R_{-1,y}$ could be located in fractional sample position. In this case, the sample value of the nearest integer sample location is used.

2.7. Gradient PDPC

Figure 10:
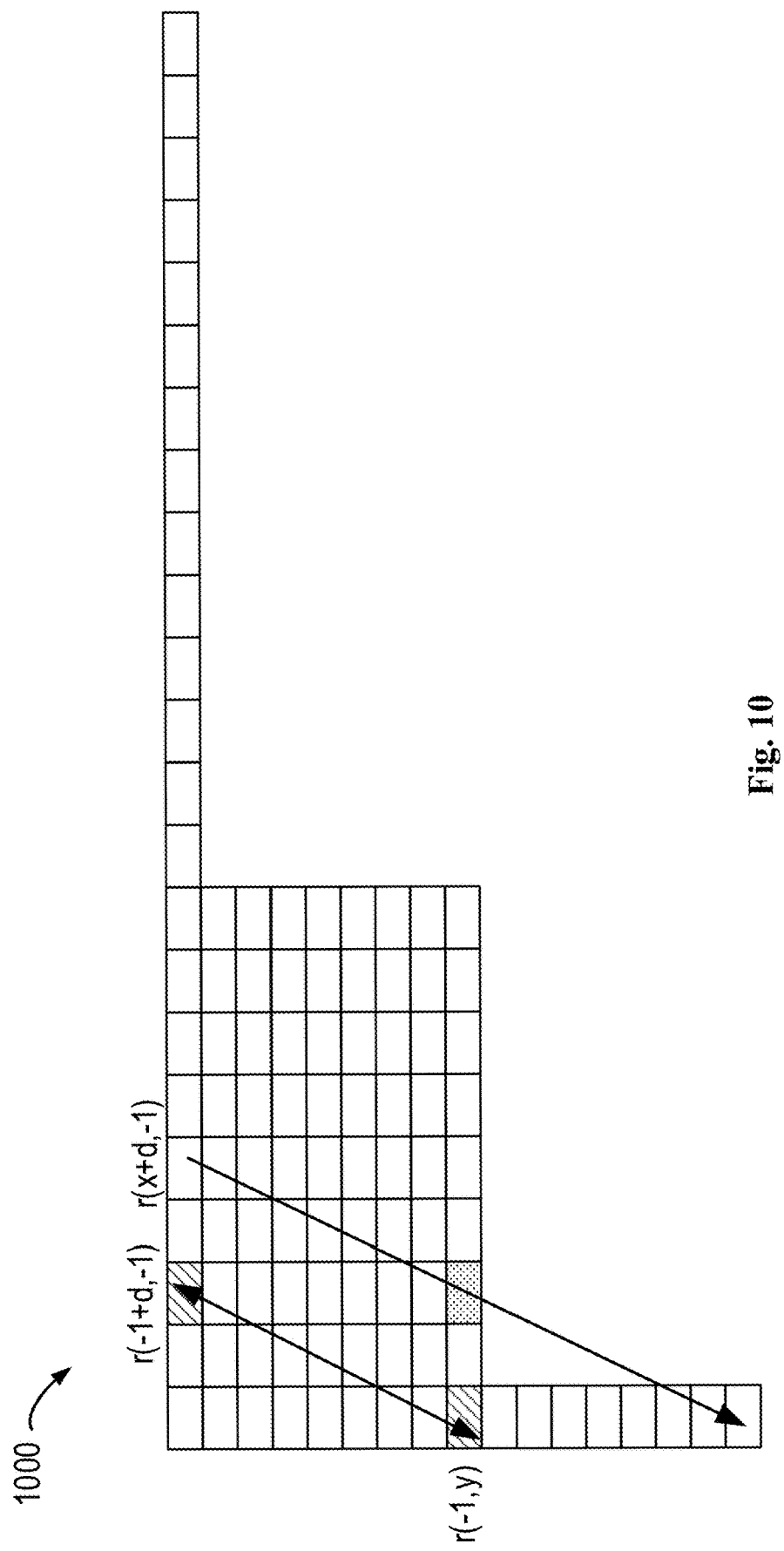
FIG. 10 is a schematic diagram that illustrates the Gradient approach for non-vertical/non-horizontal mode.

The gradient based approach 1000 is extended for non-vertical/non-horizontal mode, as shown in FIG. 10. Here, the gradient is computed as r(−1, y)−r(−1+d, −1), where d is the horizontal displacement depending on the angular direction. A few points to note here:

The gradient term r(−1, y)−r(−1+d, −1) is needed to be computed once for every row, as it does not depend on the x position.

The computation of d is already part of original intra prediction process which can be reused, so a separate computation of d is not needed. Accordingly, d is in 1/32 pixel accuracy Two tap (linear) filtering has been used when d is at fractional position, i.e., if dPos is the displacement in 1/32 pixel accuracy, dInt is the (floored) integer part (dPos>>5), and dFract is the fractional part in 1/32 pixel accuracy (dPos & 31), then r(−1+d) is computed as:

$$r(-1 + d) = (32 - dFrac) * r(-1 + dInt) + dFrac * r(-1 + dInt + 1)$$

This 2 tap filtering is performed once per row (if needed), as explained in a.

Figure 12:
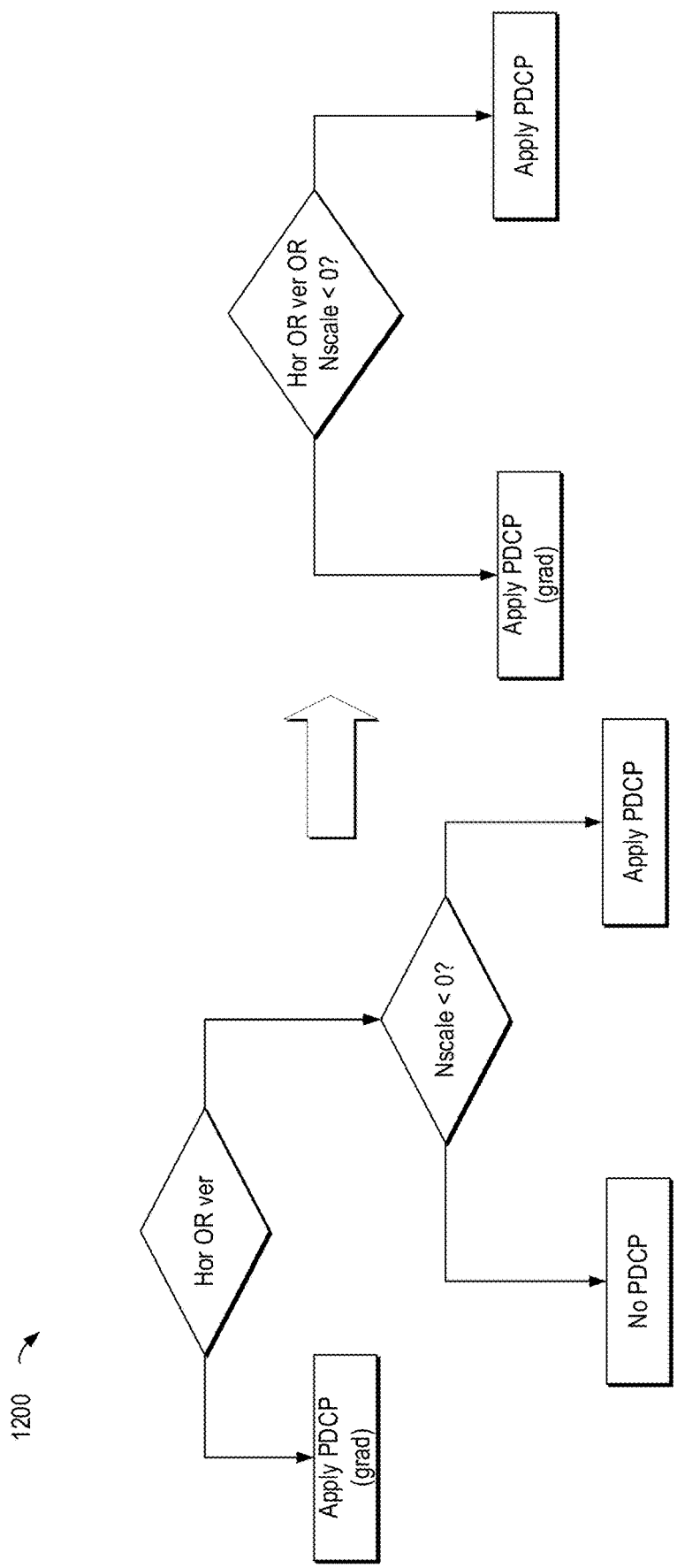
FIG. 12 illustrates a flowchart of current PDPC on the left, and proposed PDPC on the right.

Finally, the prediction signal is computed $$p(x, y) =$$
$$\text{Clip}(((64-wL(x)) * p(x, y) + wL(x) * (r(-1, y) - r(-1+d)) + 32) \gg 6)$$

Where $wL(x) = 32 \gg ((x \ll 1) \gg nScale2)$, and $nScale2 = (\log2(nTbH) + \log2(nTbW) - 2 \gg 2$, which are the same as vertical/horizontal mode. In a nutshell, the same process is applied compared to vertical/horizontal mode (in fact, d=0 indicates vertical/horizontal mode). Second, the gradient based approach for non-vertical/non-horizontal mode is activated when (nScale<0) or when PDPC can't be applied due to unavailability of secondary reference sample. The values of nScale are shown in FIG. 11, with respect to TB size and angular mode, to better visualize the cases where gradient approach is used. Additionally, the flowchart 1200 for current and proposed PDPC is shown in FIG. 12.

2.8. Secondary MPM

Figure 13:
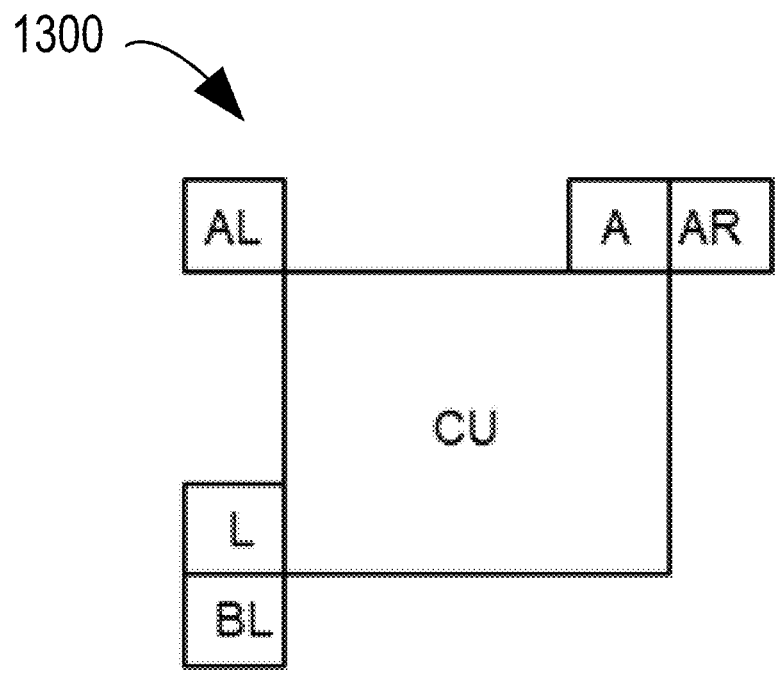
FIG. 13 is a schematic diagram that illustrates neighbouring blocks (L, A, BL, AR, AL) used in the derivation of a general MPM list.

The existing primary MPM (PMPM) list consists of 6 entries and the secondary MPM (SMPM) list includes 16 entries. A general MPM list with 22 entries is constructed first, and then the first 6 entries in this general MPM list are included into the PMPM list, and the rest of entries form the SMPM list. The first entry in the general MPM list is the Planar mode. The remaining entries are composed of the intra modes 1300 of the left (L), above (A), below-left (BL), above-right (AR), and above-left (AL) neighbouring blocks as shown in FIG. 13, the directional modes with added offset from the first two available directional modes of neighbouring blocks, and the default modes.

If a CU block is vertically oriented, the order of neighbouring blocks is A, L, BL, AR, AL; otherwise, it is L, A, BL, AR, AL.

A PMPM flag is parsed first, if equal to 1 then a PMPM index is parsed to determine which entry of the PMPM list is selected, otherwise the SPMPM flag is parsed to determine whether to parse the SMPM index or the remaining modes.

2.9. 6-Tap Intra Interpolation Filter

To improve prediction accuracy, it is proposed to replace 4-tap Cubic interpolation filter with 6-tap interpolation filter, the filter coefficients are derived based on the same polynomial regression model, but with polynomial order of 6.

Filter Coefficients are Listed Below,

```
{ 0, 0, 256, 0, 0, 0 },       // 0/32 position
{ 0, -4, 253, 9, -2, 0 },     // 1/32 position
{ 1, -7, 249, 17, -4, 0 },    // 2/32 position
{ 1, -10, 245, 25, -6, 1 },   // 3/32 position
{ 1, -13, 241, 34, -8, 1 },   // 4/32 position
{ 2, -16, 235, 44, -10, 1 },  // 5/32 position
{ 2, -18, 229, 53, -12, 2 },  // 6/32 position
{ 2, -20, 223, 63, -14, 2 },  // 7/32 position
{ 2, -22, 217, 72, -15, 2 },  // 8/32 position
{ 3, -23, 209, 82, -17, 2 },  // 9/32 position
{ 3, -24, 202, 92, -19, 2 },  // 10/32 position
{ 3, -25, 194, 101, -20, 3 }, // 11/32 position
{ 3, -25, 185, 111, -21, 3 }, // 12/32 position
{ 3, -26, 178, 121, -23, 3 }, // 13/32 position
{ 3, -25, 168, 131, -24, 3 }, // 14/32 position
{ 3, -25, 159, 141, -25, 3 }, // 15/32 position
{ 3, -25, 150, 150, -25, 3 }, // half-pel position
```

The reference samples used for interpolation come from reconstructed samples or padded as in HEVC, so that the conditional check on reference sample availability is not needed.

Figure 14:
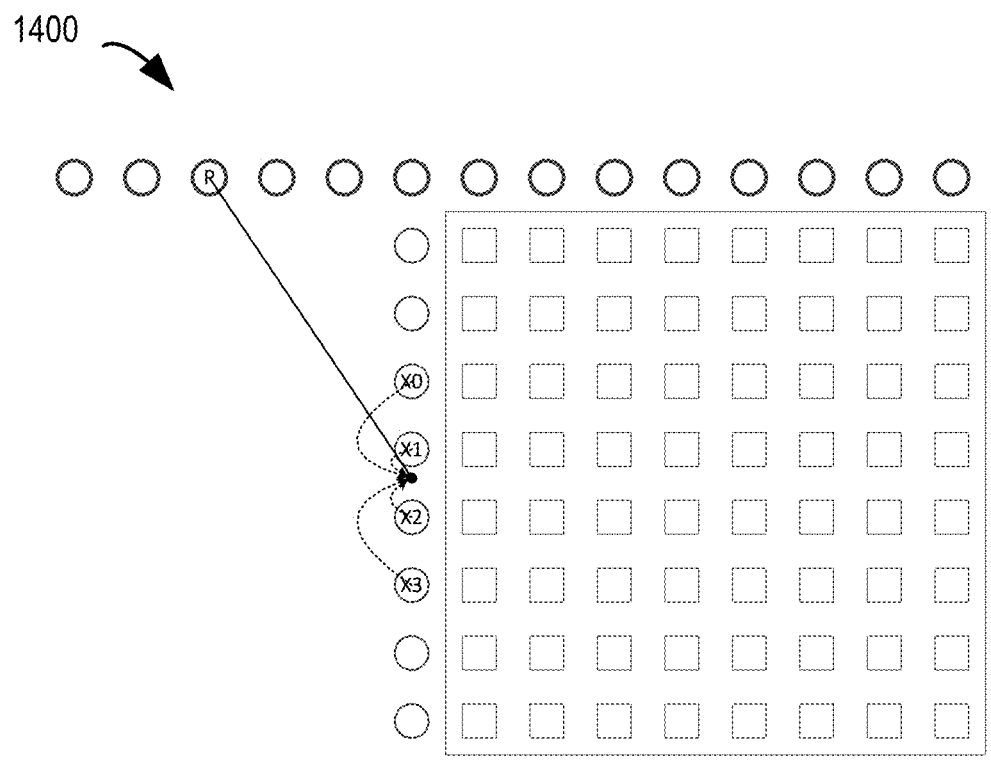
FIG. 14 is a schematic diagram that illustrates an example on proposed intra reference mapping.

Instead of using nearest rounding operation to derive the extended Intra reference sample, it is proposed to use 4-tap Cubic interpolation filter. As shown in an example 1400 in FIG. 14, to derive the value of reference sample P, a four tap interpolation filter is used, while in JEM-3.0 or HM, P is directly set as X1.

2.10. Multiple Reference Line (MRL) Intra Prediction

Figure 15:
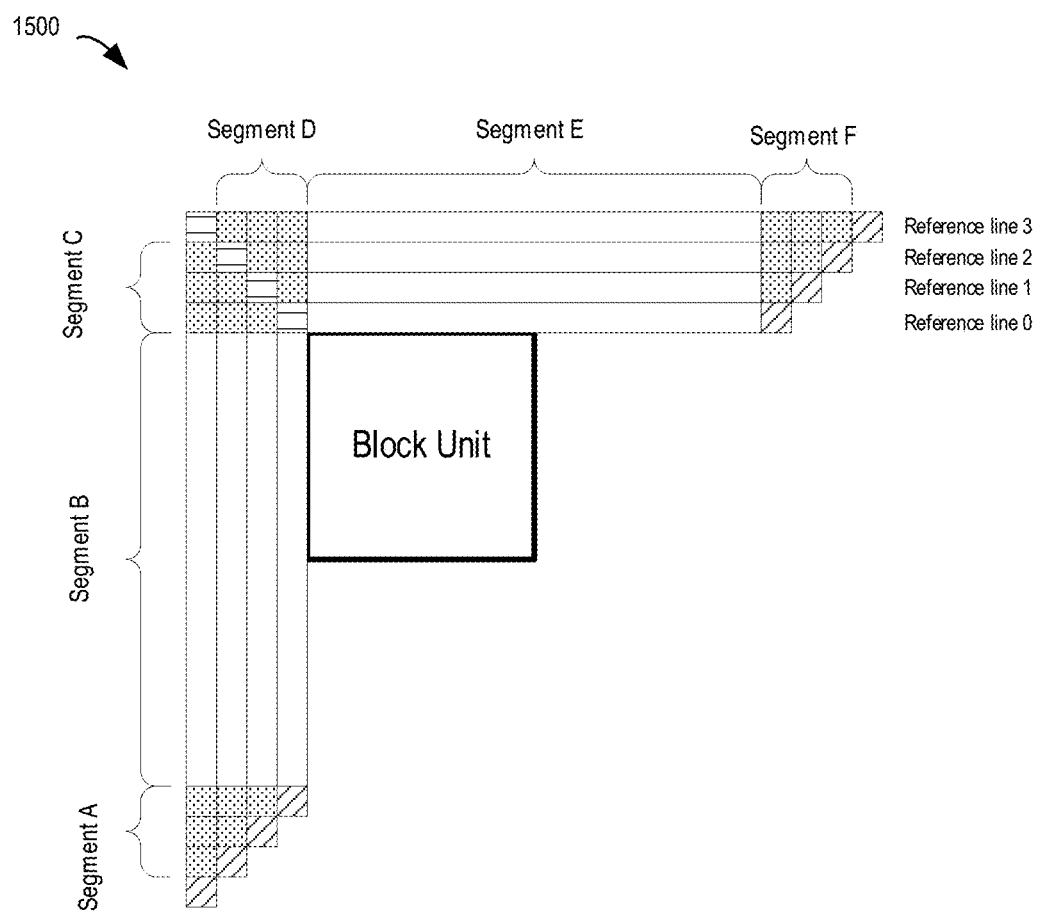
FIG. 15 is a schematic diagram that illustrates an example of four reference lines neighbouring to a prediction block.

Multiple reference line (MRL) intra prediction uses more reference lines for intra prediction. In FIG. 15, an example 1500 of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 2) are used.

The index of selected reference line (mrl_idx) is signalled and used to generate intra predictor. For reference line index, which is greater than 0, only include additional reference line modes in MPM list and only signal MPM index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices are aligned with that of reference line index 0. MRL requires the storage of 3 neighbouring luma reference lines with a CTU to generate predictions. The Cross-Component Linear Model (CCLM) tool also requires 3 neighbouring luma reference lines for its down-sampling filters. The definition of MRL to use the same 3 lines is aligned as CCLM to reduce the storage requirements for decoders.

2.11. Intra Sub-Partitions (ISP)

Figure 16B:
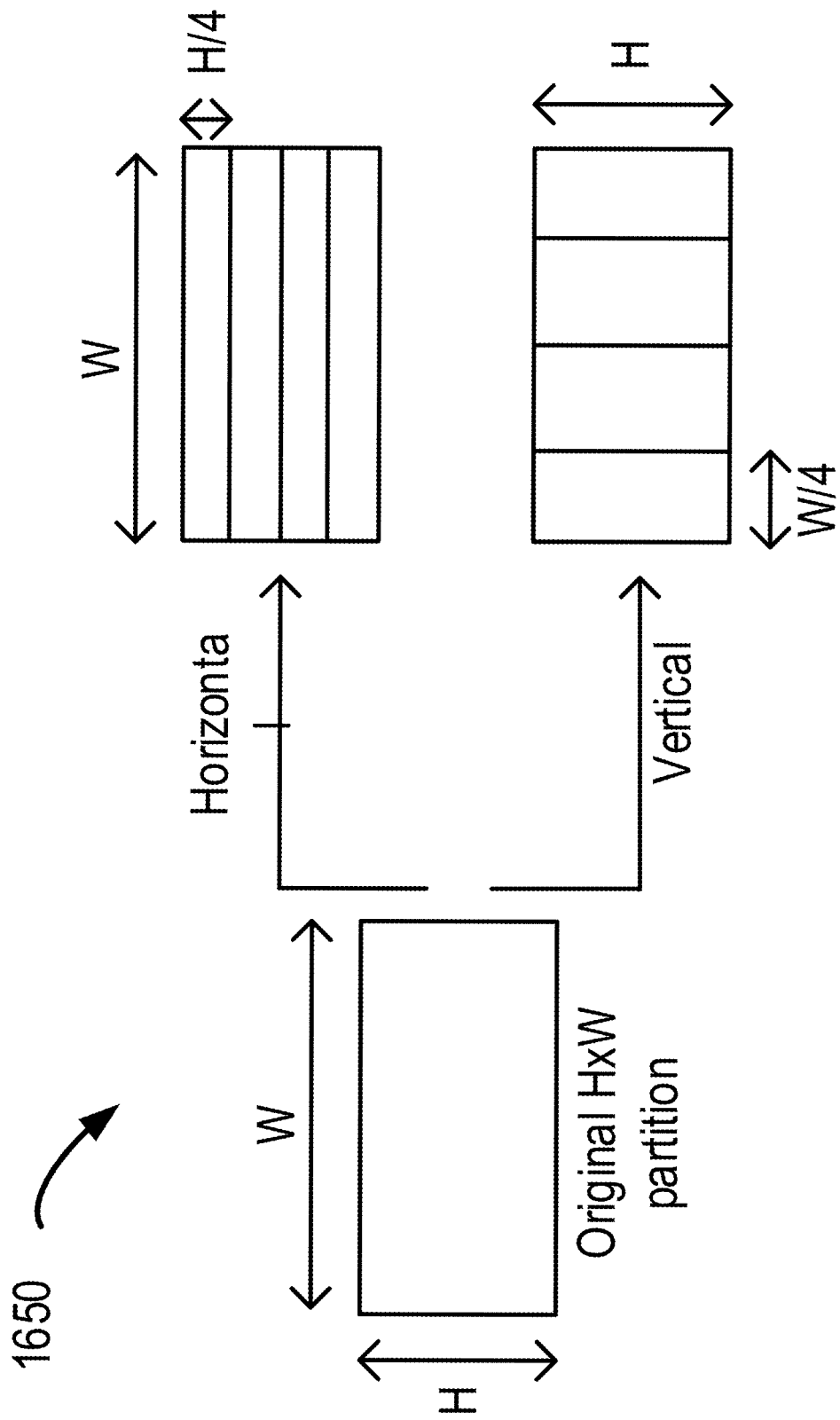

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding $$\frac{M}{2} \times 64$$

chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU sizes that can use ISP is restricted to a maximum of 64×64. FIGS. 16A and 16B show examples 1600 and 1650 of the two possibilities. All sub-partitions fulfill the condition of having at least 16 samples.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

TABLE 2-4

| Entropy coding coefficient group size | |
|---|---|
| Block Size | Coefficient group Size |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

- Multiple Reference Line (MRL): if a block has an MRL index other than 0, then the ISP coding mode will be inferred to be 0 and therefore ISP mode information will not be sent to the decoder.
- Entropy coding coefficient group size: the sizes of the entropy coding subblocks have been modified so that they have 16 samples in all possible cases, as shown in Table 2-4. Note that the new sizes only affect blocks produced by ISP in which one of the dimensions is less than 4 samples. In all other cases coefficient groups keep the 4×4 dimensions.
- CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.
- Transform size restriction: all ISP transforms with a length larger than 16 points uses the DCT-II.
- MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:
  - If w=1 or h=1, then there is no horizontal or vertical transform respectively.
  - If w≥4 and w≤16, $t_H$=DST-VII, otherwise, $t_H$=DCT-II
  - If h≥4 and h≤16, $t_V$=DST-VII, otherwise, $t_V$=DCT-II In ISP mode, all 67 intra prediction modes are allowed. PDPC is also applied if corresponding width and height is at least 4 samples long. In addition, the reference sample filtering process (reference smoothing) and the condition for intra interpolation filter selection doesn't exist anymore, and Cubic (DCT-IF) filter is always applied for fractional position interpolation in ISP mode.

2.12. Matrix Weighted Intra Prediction (MIP)

Figure 17:
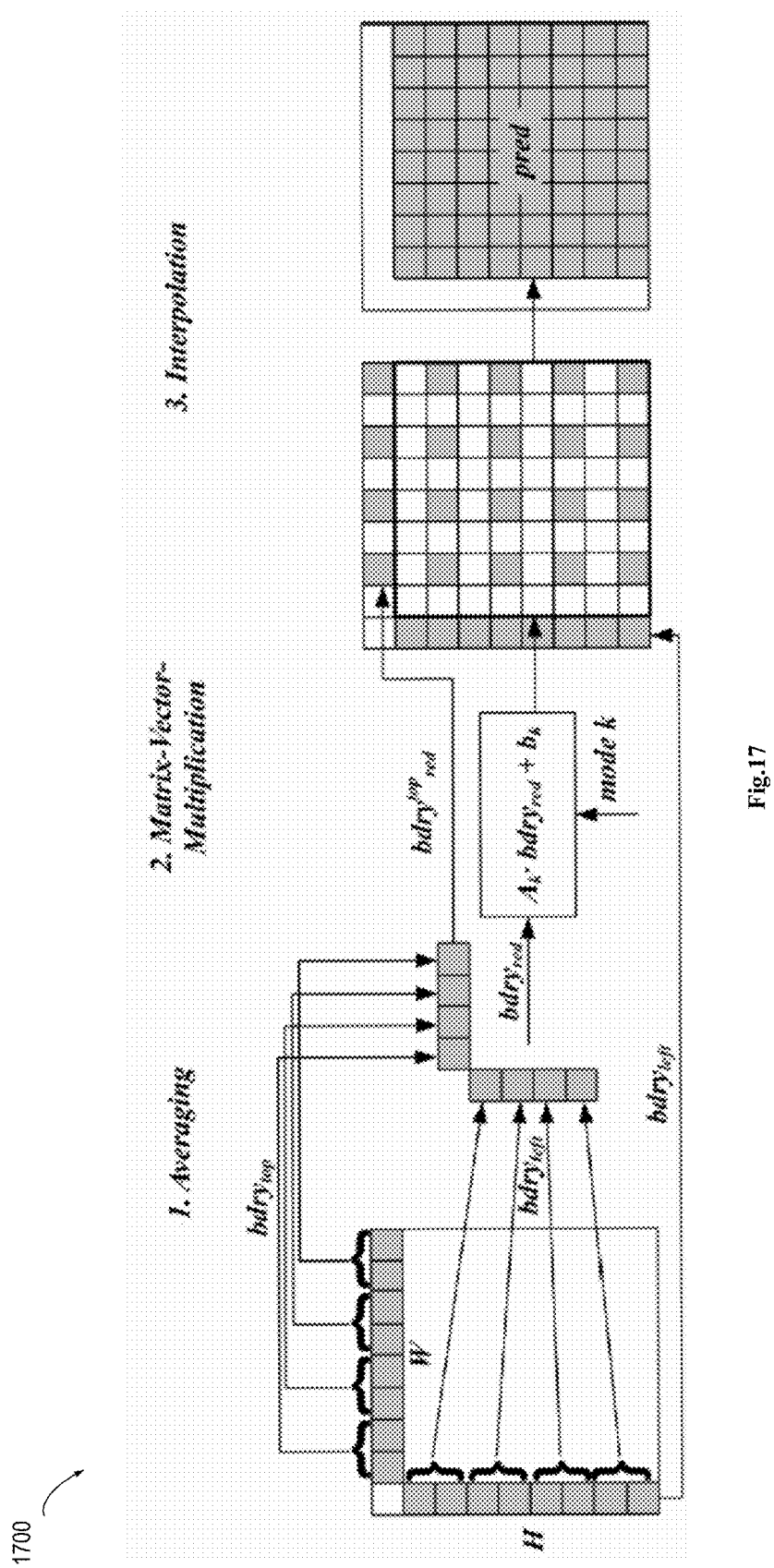
FIG. 17 is a schematic diagram that illustrates the Matrix weighted intra prediction process.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation 1700 of the prediction signal is based on the following three steps, which are averaging, matrix vector multiplication and linear interpolation as shown in FIG. 17.

2.12.1. Averaging Neighbouring Samples

Among the boundary samples, four samples or eight samples are selected by averaging based on block size and shape. Specifically, the input boundaries $bdry^{top}$ and $bdry^{left}$ are reduced left to smaller boundaries $bdry_{red}^{top}$ and $bdry_{red}^{left}$ by averaging neighbouring boundary samples according to predefined rule depends on block size. Then, the two reduced boundaries $bdry_{red}^{top}$ and $bdry_{red}^{left}$ are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, h) > 8 \text{ and mode} < 6 \\ [bdry_{red}^{left}, bdry_{red}^{top}] & \text{for } \max(W, H) > 8 \text{ and mode} \geq 6 \end{cases} \quad (2\text{-}9)$$

2.12.2. Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the down-sampled block of width $W_{red}$ and height $H_{red}$ is generated. Here, $W_{red}$ and $H_{red}$ are defined as:

$$W_{red} = \begin{cases} 4 & \text{for } \max(W, h) \leq 8 \\ \min(W, 8) & \text{for } \max(W, H) > 8 \end{cases} \quad (2\text{-}10)$$

$$H_{red} = \begin{cases} 4 & \text{for } \max(W, H) \leq 8 \\ \min(H, 8) & \text{for } \max(W, H) > 8 \end{cases} \quad (2\text{-}11)$$

The reduced prediction signal $pred_{red}$ is computed by calculating a matrix vector product and adding an offset:

$$pred_{red} = A \cdot bdry_{red} + b. \quad (2\text{-}12)$$

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$. One defines an index idx=idx(W,H) as follows:

$$idx(W, H) = \begin{cases} 0 & \text{for } W = H = 4 \\ 1 & \text{for } \max(W, H) = 8 \\ 2 & \text{for } \max(W, H) > 8 \end{cases} \quad (2\text{-}13)$$

Here, each coefficient of the matrix A is represented with 8 bit precision. The set $S_0$ consists of 16 matrices $A_0^i$, i∈{0, . . . , 15} each of which has 16 rows and 4 columns and 16 offset vectors $b_0^i$, i∈{0, . . . , 16} each of size 16. Matrices and offset vectors of that set are used for blocks of size 4×4. The set $S_1$ consists of 8 matrices $A_1^i$, i∈{0, . . . , 7}, each of which has 16 rows and 8 columns and 8 offset vectors $b_1^i$, i∈{0, . . . , 7} each of size 16. The set $S_2$ consists of 6 matrices $A_2^i$, i∈{0, . . . , 5}, each of which has 64 rows and 8 columns and of 6 offset vectors $b_2^i$, i∈{0, . . . , 5} of size 64.

2.12.3. Interpolation

The prediction signal at the remaining positions is generated from the prediction signal on the subsampled set by linear interpolation which is a single step linear interpolation in each direction. The interpolation is performed firstly in the horizontal direction and then in the vertical direction regardless of block shape or block size.

2.12.4. Signalling of MIP Mode and Harmonization with Other Coding Tools

For each Coding Unit (CU) in intra mode, a flag indicating whether an MIP mode is to be applied or not is sent. If an MIP mode is to be applied, MIP mode (predModeIntra) is signalled. For an MIP mode, a transposed flag (isTransposed), which determines whether the mode is transposed, and MIP mode Id (modeId), which determines which matrix is to be used for the given MIP mode is derived as follows $$isTransposed = predModeIntra \,\&\, 1 \qquad (2\text{-}14)$$
$$modeId = predModeIntra \gg 1$$

MIP coding mode is harmonized with other coding tools by considering following aspects:
  LFNST is enabled for MIP on large blocks. Here, the LFNST transforms of planar mode are used
  The reference sample derivation for MIP is performed exactly as for the conventional intra prediction modes
  For the up-sampling step used in the MIP-prediction, original reference samples are used instead of down-sampled ones
  Clipping is performed before up-sampling and not after up-sampling
  MIP is allowed up to 64×64 regardless of the maximum transform size
  The number of MIP modes is 32 for sizeId=0, 16 for sizeId=1 and 12 for sizeId=2

2.13. Decoder-Side Intra Mode Derivation in a First Example

The intra modes have been extended to 67 from 35 modes in HEVC, and they are derived at encoder and explicitly signalled to decoder. A significant amount of overhead is spent on intra mode coding in JEM-2.0. For example, the intra mode signalling overhead may be up to 5~10% of overall bitrate in all intra coding configuration. This contribution proposes the decoder-side intra mode derivation approach to reduce the intra mode coding overhead while keeping prediction accuracy.

To reduce the overhead of intra mode signalling, this contribution presents a decoder-side intra mode derivation (DIMD) approach. In the proposed approach, instead of signalling intra mode explicitly, the information is derived at both encoder and decoder from the neighbouring reconstructed samples of current block. The intra mode derived by DIMD is used in two ways:
  1) For 2N×2N CUs, the DIMD mode is used as the intra mode for intra prediction when the corresponding CU-level DIMD flag is turned on;
  2) For N×N CUs, the DIMD mode is used to replace one candidate of the existing MPM list to improve the efficiency of intra mode coding.

2.13.1. Templated Based Intra Mode Derivation

Figure 18:
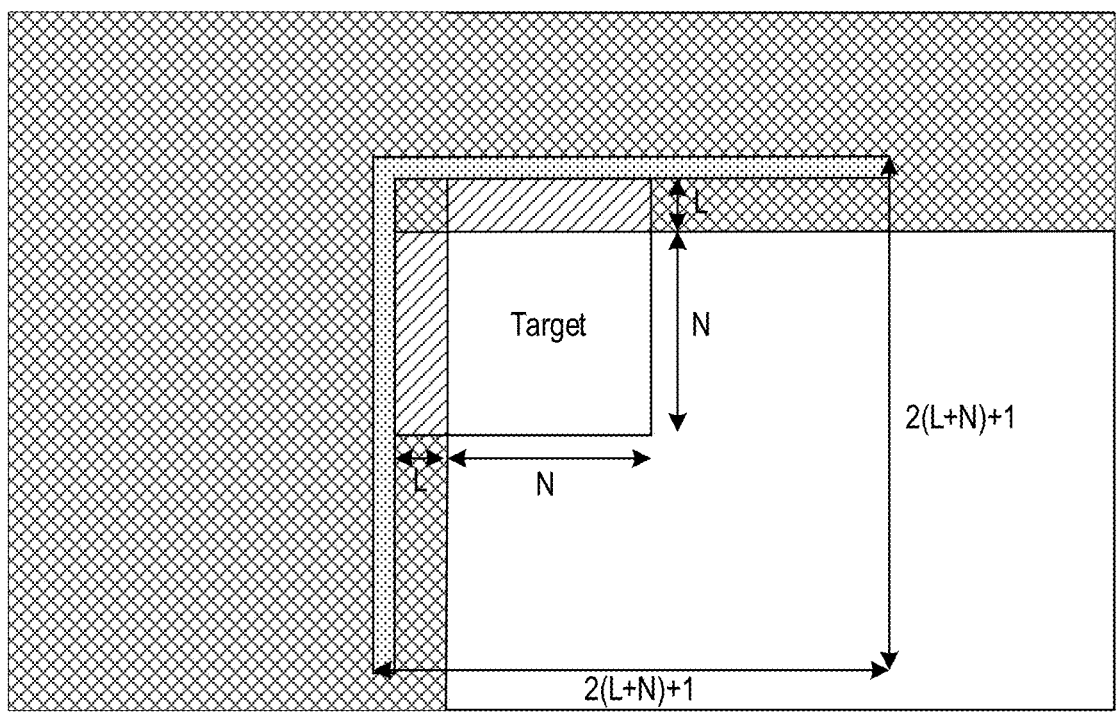
FIG. 18 is a schematic diagram that illustrates target samples, template samples and the reference samples of template used in the DIMD.

FIG. 18 is a schematic diagram 1800 that illustrates target samples, template samples and the reference samples of template used in the DIMD. As illustrated in FIG. 18, the target denotes the current block (of block size N) for which intra prediction mode is to be estimated. The template (indicated by the patterned region in FIG. 18) specifies a set of already reconstructed samples, which are used to derive the intra mode. The template size is denoted as the number of samples within the template that extends to the above and the left of the target block, i.e., L. In the current implementation, a template size of 2 (i.e., L=2) is used for 4×4 and 8×8 blocks and a template size of 4 (i.e., L=4) is used for 16×16 and larger blocks. The reference of template (indicated by the dotted region in FIG. 18) refers to a set of neighbouring samples from above and left of the template, as defined by JEM-2.0. Unlike the template samples which are always from reconstructed region, the reference samples of template may not be reconstructed yet when encoding/decoding the target block. In this case, the existing reference samples substitution algorithm of JEM-2.0 is utilized to substitute the unavailable reference samples with the available reference samples.

For each intra prediction mode, the DIMD calculates the absolute difference (SAD) between the reconstructed template samples and its prediction samples obtained from the reference samples of the template. The intra prediction mode that yields the minimum SAD is selected as the final intra prediction mode of the target block.

2.13.2. DIMD for Intra 2N×2N CUs

For intra 2N×2N CUs, the DIMD is used as one additional intra mode, which is adaptively selected by comparing the DIMD intra mode with the optimal normal intra mode (i.e., being explicitly signalled). One flag is signalled for each intra 2N×2N CU to indicate the usage of the DIMD. If the flag is one, then the CU is predicted using the intra mode derived by DIMD; otherwise, the DIMD is not applied and the CU is predicted using the intra mode explicitly signalled in the bit-stream. When the DIMD is enabled, chroma components always reuse the same intra mode as that derived for luma component, i.e., DM mode.

Additionally, for each DIMD-coded CU, the blocks in the CU can adaptively select to derive their intra modes at either PU-level or TU-level. Specifically, when the DIMD flag is one, another CU-level DIMD control flag is signalled to indicate the level at which the DIMD is performed. If this flag is zero, it means that the DIMD is performed at the PU level and all the TUs in the PU use the same derived intra mode for their intra prediction; otherwise (i.e., the DIMD control flag is one), it means that the DIMD is performed at the TU level and each TU in the PU derives its own intra mode.

Further, when the DIMD is enabled, the number of angular directions increases to 129, and the DC and planar modes still remain the same. To accommodate the increased granularity of angular intra modes, the precision of intra interpolation filtering for DIMD-coded CUs increases from 1/32-pel to 1/64-pel. Additionally, in order to use the derived intra mode of a DIMD coded CU as MPM candidate for neighbouring intra blocks, those 129 directions of the DIMD-coded CUs are converted to "normal" intra modes (i.e., 65 angular intra directions) before they are used as MPM.

2.13.3. DIMD for Intra N×N CUs

In the proposed method, intra modes of intra N×N CUs are always signalled. However, to improve the efficiency of intra mode coding, the intra modes derived from DIMD are used as MPM candidates for predicting the intra modes of four PUs in the CU. In order to not increase the overhead of MPM index signalling, the DIMD candidate is always placed at the first place in the MPM list and the last existing MPM candidate is removed. Also, pruning operation is performed such that the DIMD candidate will not be added to the MPM list if it is redundant.

2.13.4. Intra Mode Search Algorithm of DIMD

In order to reduce encoding/decoding complexity, one straightforward fast intra mode search algorithm is used for DIMD. Firstly, one initial estimation process is performed to provide a good starting point for intra mode search. Specifically, an initial candidate list is created by selecting N fixed modes from the allowed intra modes. Then, the SAD is calculated for all the candidate intra modes and the one that minimizes the SAD is selected as the starting intra mode. To achieve a good complexity/performance trade-off, the initial candidate list consists of 11 intra modes, including DC, planar and every 4-th mode of the 33 angular intra directions as defined in HEVC, i.e., intra modes 0, 1, 2, 6, 10 . . . 30, 34.

If the starting intra mode is either DC or planar, it is used as the DIMD mode. Otherwise, based on the starting intra mode, one refinement process is then applied where the optimal intra mode is identified through one iterative search. It works by comparing at each iteration the SAD values for three intra modes separated by a given search interval and maintain the intra mode that minimize the SAD. The search interval is then reduced to half, and the selected intra mode from the last iteration will serve as the center intra mode for the current iteration. For the current DIMD implementation with 129 angular intra directions, up to 4 iterations are used in the refinement process to find the optimal DIMD intra mode.

2.14. Decoder-Side Intra Mode Derivation in a Second Example

In a second example, a method is proposed to avoid transmitting the luma intra prediction mode in the bitstream. This is done by deriving the luma intra mode using previously encoded/decoded pixels, in an identical fashion at the encoder and at the decoder. This process defines a new coding mode called DIMD, whose selection is signalled in the bitstream for intra coded blocks using a simple flag. DIMD competes with other coding modes at the encoder, including the classical Intra coding mode (where the intra prediction mode is coded). Note that in this contribution, DIMD only applies to luma. For chroma, classical intra coding mode applies. As done for other coding modes (classical intra, inter, merge, etc.), a rate-distortion cost is computed for the DIMD mode, and is then compared to the coding costs of other modes to decide whether to select it as final coding mode for a current block.

At the decoder side, the DIMD flag is first parsed. If it is true, the intra prediction mode is derived in the reconstruction process using the same previously encoded neighbouring pixels. If not, the intra prediction mode is parsed from the bitstream as in classical intra coding mode.

2.14.1. Intra Prediction Mode Derivation 2.14.1.1. Gradient Analysis

Figure 19:
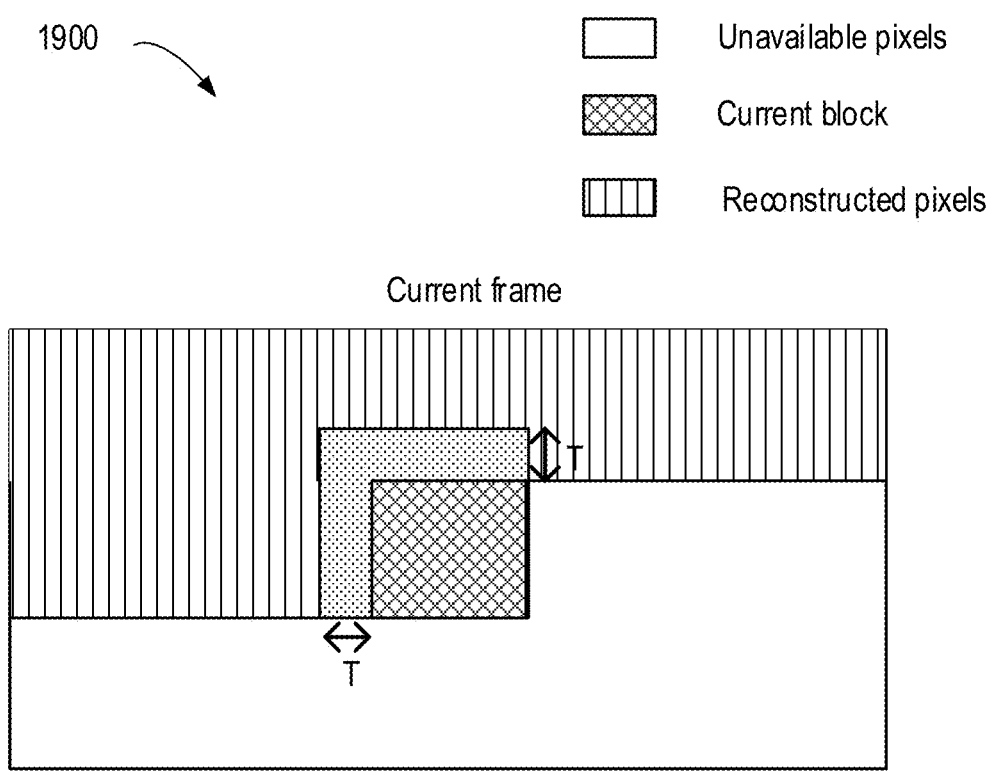
FIG. 19 is a schematic diagram that illustrates a set of chosen pixels on which a gradient analysis is performed.

To derive the intra prediction mode for a block, a set of neighbouring pixels are first selected on which a gradient analysis is performed. For normativity purposes, these pixels should be in the decoded/reconstructed pool of pixels. FIG. 19 is a schematic diagram 1900 that illustrates a set of chosen pixels on which a gradient analysis is performed. As shown in FIG. 19, a template surrounding the current block is chosen by T pixels to the left, and T pixels above. T=2 is set in the proposal.

Next, a gradient analysis is performed on the pixels of the template. This allows to determine a main angular direction for the template, which it is assumed (and that is the core premise of our method) has a high chance to be identical to the one of the current block. Thus, a simple 3×3 Sobel gradient filter is used, defined by the following matrices that will be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix} \quad (2\text{-}15)$$

For each pixel of the template, each of these two matrices with the 3×3 window centered around the current pixel is point-by-point multiplied and composed of its 8 direct neighbors, and the result is summed. Thus, two values $G_x$ (from the multiplication with $M_x$), and $G_y$ (from the multiplication with $M_y$) corresponding to the gradient at the current pixel are obtained, in the horizontal and vertical direction respectively.

Figure 20:
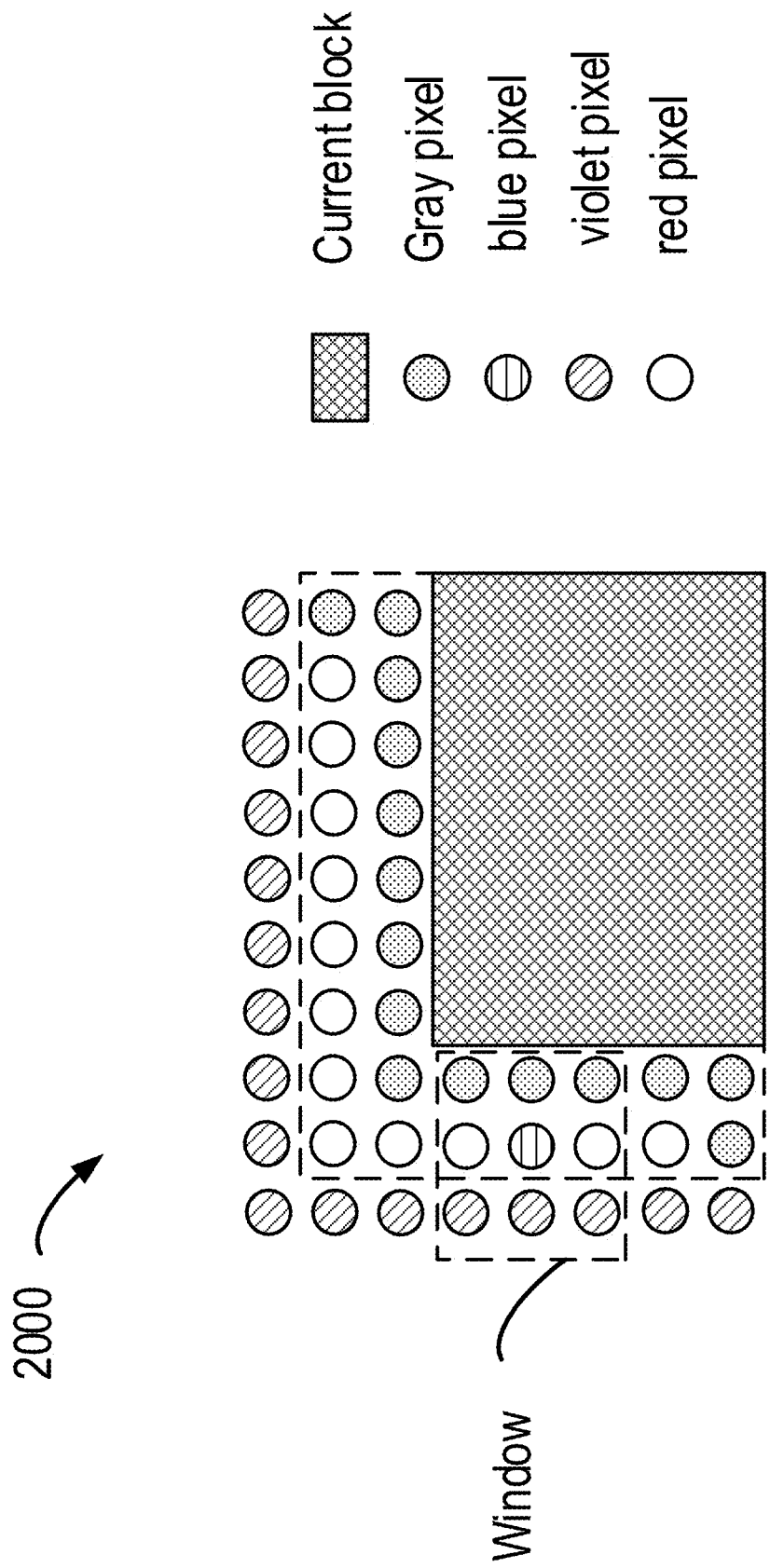
FIG. 20 is a schematic diagram that illustrates the convolution of the 3×3 Sobel gradient filter with the template.

FIG. 20 shows the convolution process 2000. The blue pixel is the current pixel. Red pixels (including the blue) are pixels on which the gradient analysis is possible. Gray pixels are pixels on which the gradient analysis is not possible due to lack of some neighbors. Violet pixels are available (reconstructed) pixels outside of the considered template, used in the gradient analysis of the red pixels. In case a violet pixel is not available (due to blocks being too close to the border of the picture for instance), the gradient analysis of all red pixels that use this violet pixel is not performed.

2.14.1.2. Histogram of Gradients and Mode Derivation

For each red pixel, the intensity (G) and the orientation (O) of the gradient using $G_x$ and $G_y$ are calculated as such:

$$G = |G_x| + |G_y| \text{ and } O = \text{atan}\left(\frac{G_y}{G_x}\right) \quad (2\text{-}16)$$

Note that a fast implementation of the atan function is proposed. The orientation of the gradient is then converted into an intra angular prediction mode, used to index a histogram (first initialized to zero). The histogram value at that intra angular mode is increased by G. Once all the red pixels in the template have been processed, the histogram will contain cumulative values of gradient intensities, for each intra angular mode. The mode that shows the highest peak in the histogram is selected as intra prediction mode for the current block. If the maximum value in the histogram is 0 (meaning no gradient analysis was able to be made, or the area composing the template is flat), then the DC mode is selected as intra prediction mode for the current block.

For blocks that are located at the top of CTUs, the gradient analysis of the pixels located in the top part of the template is not performed. The DIMD flag is coded using three possible contexts, depending on the left and above neighbouring blocks, similarly to the Skip flag coding. Context 0 corresponds to the case where none of the left and above neighbouring blocks are coded with DIMD mode, context 1 corresponds to the case where only one neighbouring block is coded with DIMD, and context 2 corresponds to the case where both neighbors are DIMD-coded. Initial symbol probabilities for each context are set to 0.5.

2.14.2. Prediction with 130 Intra Modes

One advantage that DIMD offers over classical intra mode coding is that the derived intra mode can have a higher precision, allowing more precise predictions at no additional cost since it is not transmitted in the bitstream. The derived intra mode spans 129 angular modes, hence a total of 130 modes including DC (the derived intra mode can never be planar in our contribution). The classical intra coding mode is unchanged, i.e., the prediction and mode coding still use 67 modes.

The required changes to Wide Angle Intra Prediction and simplified PDPC were performed to accommodate for prediction using 129 modes. Note that only the prediction process uses the extended intra modes, meaning that for any other purpose (deciding whether to filter the reference samples for instance), the mode is converted back to 67-mode precision.

2.14.3. Other Normative Changes

In the DIMD mode, the luma intra mode is derived during the reconstruction process, just prior to the block reconstruction. This is done to avoid a dependency on reconstructed pixels during parsing. However, by doing so, the luma intra mode of the block will be undefined for the chroma component of the block, and for the luma component of neighbouring blocks. This causes an issue because:

For chroma, a fixed mode candidate list is defined. Usually, if the luma mode equals one of the chroma candidates, that candidate will be replaced with the vertical diagonal (VDIA_IDX) intra mode. Since in DIMD, the luma mode is unavailable, the initial chroma mode candidate list is not modified.

In classical intra mode, where the luma intra prediction mode is to be parsed from the bitstream, an MPM list is constructed using the luma intra modes of neighbouring blocks, which can be unavailable if those blocks were coded using DIMD. In this case, in our contribution, DIMD-coded blocks are treated as inter blocks during MPM list construction, meaning they are effectively considered unavailable.

2.15. DIMD in a Third Example

Three angular modes are selected from a Histogram of Gradient (HoG) computed from the neighboring pixels of current block. Once the three modes are selected, their predictors are computed normally and then their weighted average is used as the final predictor of the block. To determine the weights, corresponding amplitudes in the HoG are used for each of the three modes. The DIMD mode is used as an alternative prediction mode and is always checked in the FullRD mode.

Current version of DIMD has modified some aspects in the signaling, HoG computation and the prediction fusion. The purpose of this modification is to improve the coding performance as well as addressing the complexity concerns raised during the last meeting (i.e. throughput of 4×4 blocks). The following sections describe the modifications for each aspect.

2.15.1. Signalling

Figure 21:
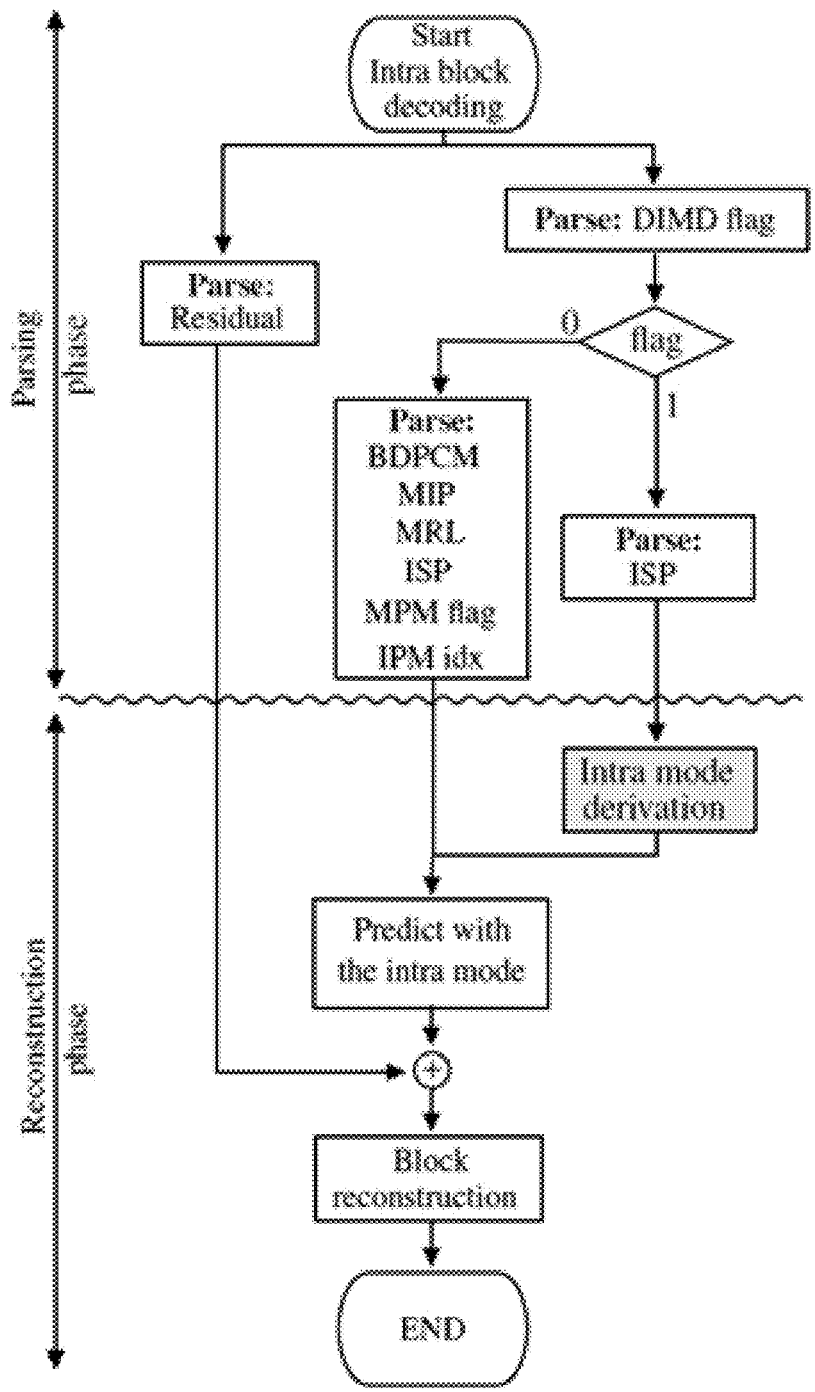
FIG. 21 is a schematic diagram that illustrates the proposed intra block decoding process in accordance with some embodiments of the present disclosure.

FIG. 21 is a schematic diagram that illustrates the proposed intra block decoding process 2100 in accordance with some embodiments of the present disclosure. FIG. 21 shows the order of parsing flags/indices in VTM5, integrated with the proposed DIMD.

As can be seen, the DIMD flag of the block is parsed first using a single CABAC context, which is initialized to the default value of 154.

If flag==0, then the parsing continues normally.

Else (if flag==1), only the ISP index is parsed and the following flags/indices are inferred to be zero: BDPCM flag, MIP flag, MRL index. In this case, the entire IPM parsing is also skipped.

During the parsing phase, when a regular non-DIMD block inquires the IPM of its DIMD neighbor, the mode PLANAR_IDX is used as the virtual IPM of the DIMD block.

2.15.2. Texture Analysis

Figure 22:
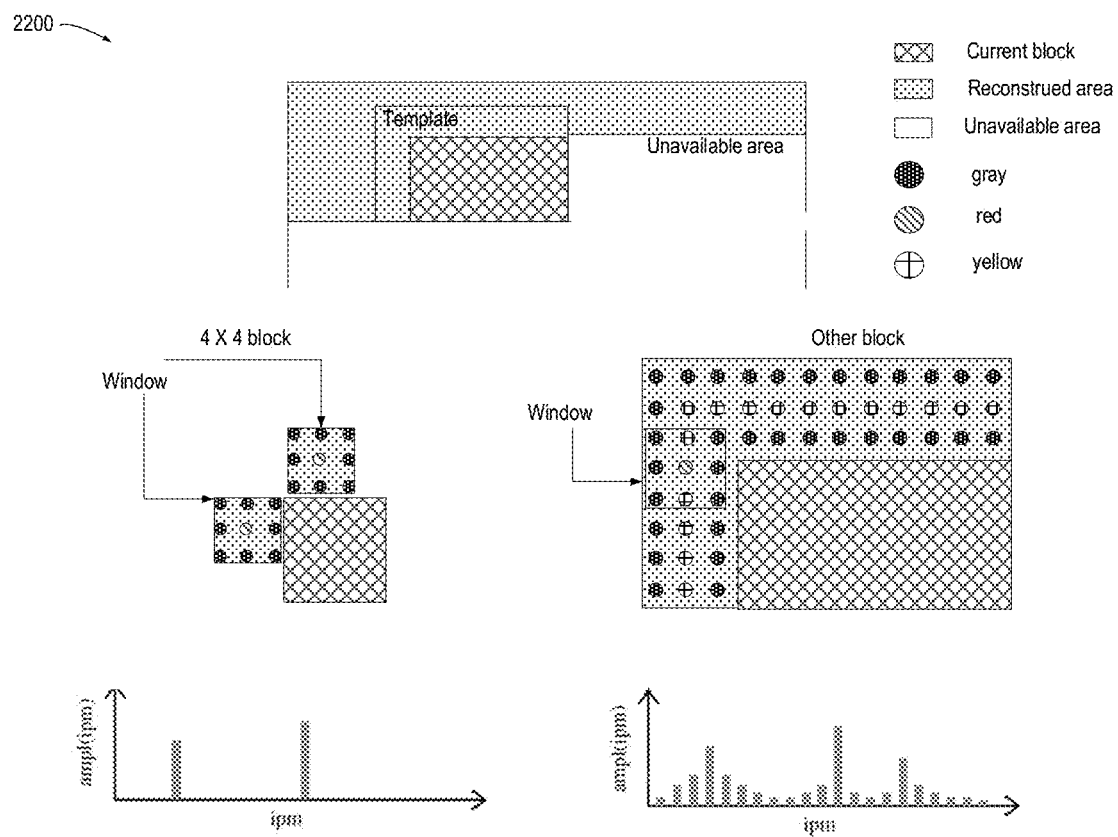
FIG. 22 is a schematic diagram that illustrates the HoG computation from a template of width 3 pixels.

The texture analysis of DIMD includes a Histogram of Gradient (HoG) computation 2200, for example, as shown in FIG. 22. The HoG computation is carried out by applying horizontal and vertical Sobel filters on pixels in a template of width 3 around the block. Except, if above template pixels fall into a different CTU, then they will not be used in the texture analysis. Once computed, the IPMs corresponding to two tallest histogram bars are selected for the block.

In previous versions, all pixels in the middle line of the template were involved in the HoG computation (X. Xiu, Y. He, and Y. Ye, "Decoder-side intra mode derivation," Document of Joint Video Experts Team, JVET-C0061, Geneva, Jun. 2016). However, the current version improves the throughput of this process by applying the Sobel filter more sparsely on 4×4 blocks. To this aim, only one pixel from left and one pixel from above are used. This is shown in FIG. 22.

In addition to reduction in the number of operations for gradient computation, this property also simplifies the selection of best 2 modes from the HoG, as the resulting HoG cannot have more than two non-zero amplitudes.

2.15.3. Prediction Fusion

Like the previous version (X. Xiu, Y. He, and Y. Ye, "Decoder-side intra mode derivation," Document of Joint Video Experts Team, JVET-C0061, Geneva, Jun. 2016), the current version of the method also uses a fusion of three predictors for each block. However, the choice of prediction modes is different and makes use of the combined hypothesis intra-prediction method proposed in "E. Mora, A. Nasrallah, and M. Raulet, "CE3-related: Decoder-side Intra Mode Derivation," Document of Joint Video Experts Team, JVET-L0164, Macao, October 2018", where the Planar mode is considered to be used in combination with other modes when computing an intra-predicted candidate. In the current version, the two IPMs corresponding to two tallest HoG bars are combined with the Planar mode.

Figure 23:
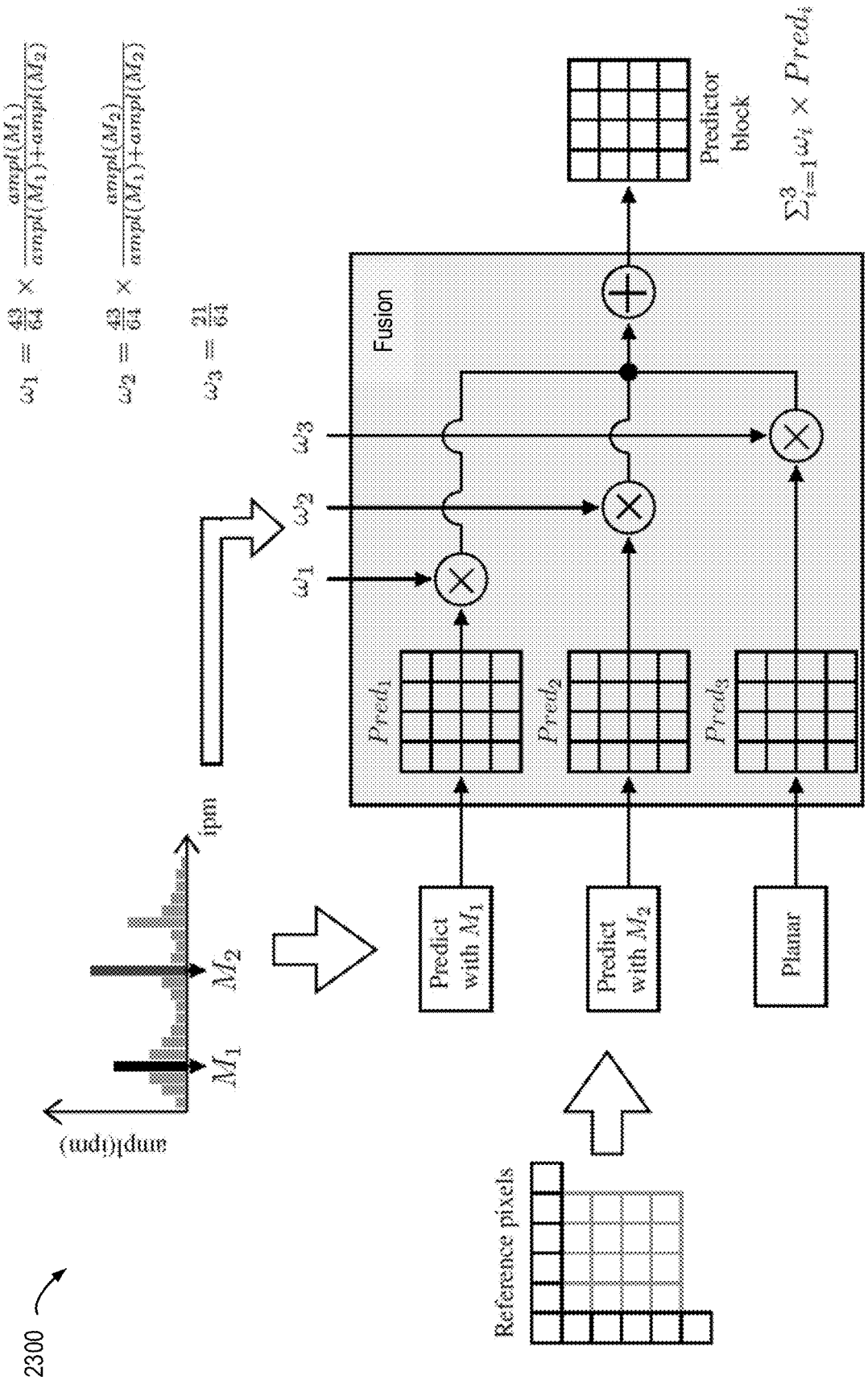
FIG. 23 is a schematic diagram that illustrates the prediction fusion by weighted averaging of two HoG modes and planar.

The prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 23 visualizes this process 2300.

2.16. DIMD in a Fourth Example

When DIMD is applied, two intra modes are derived from the reconstructed neighbor samples, and those two predictors are combined with the planar mode predictor with the weights derived from the gradients as described in the third example.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

2.17. Template-Based Intra Mode Derivation (TIMD)

This contribution proposes a template-based intra mode derivation (TIMD) method using MPMs, in which a TIMD mode is derived from MPMs using the neighbouring template. The TIMD mode is used as an additional intra prediction method for a CU.

2.17.1. TIMD Mode Derivation

For each intra prediction mode in MPMs, The SATD between the prediction and reconstruction samples of the template is calculated. The intra prediction mode with the minimum SATD is selected as the TIMD mode and used for intra prediction of current CU.

Position dependent intra prediction combination (PDPC) is included in the derivation of the TIMD mode.

2.17.2. TIMD Signalling

A flag is signalled in sequence parameter set (SPS) to enable/disable the proposed method. When the flag is true, a CU level flag is signalled to indicate whether the proposed TIMD method is used. The TIMD flag is signalled right after the MIP flag. If the TIMD flag is equal to true, the remaining syntax elements related to luma intra prediction mode, including MRL, ISP, and normal parsing stage for luma intra prediction modes, are all skipped.

2.17.3. Interaction with New Coding Tools

A DIMD method with prediction fusion using Planar was integrated in EE2. When EE2 DIMD flag is equal to true, the proposed TIMD flag is not signalled and set equal to false. Similar to PDPC, Gradient PDPC is also included in the derivation of the TIMD mode. When secondary MPM is enabled, both the primary MPMs and the secondary MPMs are used to derive the TIMD mode.

6-tap interpolation filter is not used in the derivation of the TIMD mode.

2.17.4. Modification of MPM List Construction in the Derivation of TIMD Mode

During the construction of MPM list, intra prediction mode of a neighbouring block is derived as Planar when it is inter-coded. To improve the accuracy of MPM list, when a neighbouring block is inter-coded, a propagated intra prediction mode is derived using the motion vector and reference picture and used in the construction of MPM list. This modification is only applied to the derivation of the TIMD mode.

3. Problems

In decoder-side intra prediction mode derivation (DIMD), the intra prediction mode is derived using previously decoded blocks and used in normal intra prediction of current block. However, the combination of DIMD and intra prediction with subpartitions (ISP) need to be further explored.

4. Detailed Descriptions

The detailed embodiments below should be considered as examples to explain general concepts. These embodiments should not be interpreted in a narrow way. Furthermore, these embodiments can be combined in any manner.

In this disclosure, the term decoder-side intra mode derivation (DIMD) represents a coding tool that derives intra prediction mode using previously decoded blocks/samples. In one example, the DIMD could also be interpreted to a template-based intra prediction mode (TIMD) method.

The term 'block' may represent a coding block (CB), or a coding unit (CU), or a prediction block (PB), or a prediction unit (PU), or a transform block (TB), or a transform unit (TU), or a coding tree block (CTB), or a coding tree unit (CTU), or a rectangular region of samples/pixels.

Combined Mode of DIMD and ISP

1. It is proposed to derive an intra prediction mode at decoder side and the derived mode is used to reconstruct one or multiple subpartitions within a current block (e.g., to derive the prediction block for one or multiple subpartitions within the current block). Such a combined mode is denoted as DIMD_ISP mode.
   a. In current design of intra prediction with subpartitions (ISP), the intra prediction of current block is generated using the normal intra prediction mode, which is signalled from encoder to decoder. It is proposed to generate the intra prediction of the block coded with ISP using the derived intra prediction mode in DIMD. The coding mode of a block is denoted as DIMD_ISP mode, when the block is coded with ISP mode and the intra prediction mode is derived from DIMD (e.g., the block is coded with DIMD), wherein the block contains more than one subpartitions.
   b. In one example, one or more intra prediction modes may be used in intra prediction of the block coded with DIMD_ISP mode.
      i. In one example, only one intra prediction mode may be derived from DIMD and used in intra prediction of the block.
         1) In one example, the derived intra prediction mode may be used in intra prediction for one or more subpartitions of the block.
            a) In one example, the derived intra prediction mode may be used in intra prediction of all subpartitions of the block.
            b) In one example, the derived intra prediction mode may be used for a first set of one or more subpartitions of the block, and one or more intra prediction modes which may not be the derived intra prediction mode may be used for the remaining subpartitions of the block.
               i. In one example, the derived intra prediction mode may be used for the first, and/or the first two, and/or the last, and/or the last two subpartitions, and X intra prediction modes may be used for the remaining subpartitions of the block wherein X is equal to the number of the remaining subpartitions.
               ii. In one example, the one or more intra prediction modes used for the remaining subpartitions may be pre-defined, such as PLANAR, and/or DC, and/or horizontal mode, and/or vertical mode.
               iii. In one example, the one or more intra prediction modes used for the remaining subpartitions may be generated using the derived intra prediction mode (denoted the mode number as M), such as M−m, and/or M+m may be used for the remaining subpartitions wherein M and m are integers.
      ii. In one example, a first intra prediction mode may be derived for a first subpartition of the block, a second intra prediction mode may be derived for a second subpartition of the block, and the first intra prediction mode may be different from the second one.
         1) For example, DIMD procedure may be applied for each subpartition of the block one by one.
   c. In one example, whether horizontal and/or vertical ISP split is allowed for the block coded with DIMD_ISP mode may be the same as the block coded with ISP mode.
      i. In one example, only horizontal split may be allowed for the block coded with DIMD_ISP mode.
      ii. In one example, only vertical split may be allowed for the block coded with DIMD_ISP mode.
      iii. In one example, which split (horizontal or vertical) is used for the block coded with DIMD_ISP mode may be derived using the coded information.
         1) In one example, the coded information may refer to the block dimensions and/or block size. Denote block width and block height as W and H.

a) In one example, only horizontal split may be enabled when H is larger than W.
b) In one example, only vertical split may be enabled when W is larger than H.
c) In one example, both horizontal and vertical split may be enabled when W is equal to H.
iv. In one example, when only horizontal or vertical split is allowed for the block coded with DIMD_ISP mode, the syntax element indicating the type of ISP split may be not signalled.
d. In one example, the determination of the number of subpartitions in the block coded with DIMD_ISP mode may be same as the block coded with ISP mode.
i. Alternatively, the determination of the number of subpartitions in the block coded with DIMD_ISP mode may be different from the block coded with ISP mode.
ii. Alternatively, the number of subpartitions in the block coded with DIMD_ISP mode may be equal to T, such as T=2 or T=4.
e. In one example, the determination of whether a block is allowed be coded with DIMD_ISP mode may depend on coded information.
i. In one example, the coded information may refer to whether DIMD and/or ISP is allowed.
1) In one example, when DIMD or ISP is not allowed for current block, the current block is disallowed to be coded with DIMD_ISP mode.
ii. In one example, the coded information may refer to block dimensions and/or block size.
iii. In one example, the coded information may refer to block depth.
iv. In one example, the coded information may refer to slice/picture type.
v. In one example, the coded information may refer to the information of temporal layer (e.g., temporal layer index).
vi. In one example, the coded information may refer to ISP types (such as horizontal or vertical, the number of sub-partitions, etc.).
vii. In one example, the coded information may refer to the information of colour component.
viii.
2. For example, more than one intra-prediction modes may be used by an ISP-coded or a DIMD_ISP-coded block.
a. In one example, more than one intra prediction modes may be used in the intra prediction of a subpartition of the block.
i. In one example, the predicted samples of each subpartition may be generated using more than one intra prediction modes.
1) In one example, different predicted samples may be generated using different intra prediction modes, and the predicted samples may be weighted blending to generate the final predicted samples of a subpartition.
a) In one example, different sets of weighted blending may be used and an index of the set used for all subpartitions of the block may be signalled, and/or derived using the coded information.
b) In one example, different sets of weighted blending may be used for different subpartitions of the block.

2) In one example, the more than one intra prediction modes may be all derived from DIMD.
3) In one example, at least one intra prediction mode may be not derived from DIMD but pre-defined.
a) In one example, the pre-defined mode may be PLANAR, and/or DC, and/or horizontal mode, and/or vertical mode.
b. In one example, one intra prediction modes may be used for one or more of the subpartitions, and more than one intra prediction modes may be used for the remaining subpartitions.

On Interaction with Other Coding Tools

3. In one example, for a block coded with DIMD_ISP mode, the determination of whether to use one or more transform, and/or using which type of transform may be same as the block coded with ISP mode.
i. In one example, implicit MTS may be used for the block coded with DIMD_ISP mode, and the same condition of using which type of transform as the ISP mode is used (i.e., for horizontal transform, DCT7 is used when block width is equal to and larger than 4, and is equal to and less than 16, otherwise, DCT2 is used; For vertical transform, DCT7 is used when block height is equal to and larger than 4, and is equal to and less than 16, otherwise, DCT2 is used).
ii. Alternatively, implicit MTS may be used for the block coded with DIMD_ISP mode using a different determination of the transform type from the block coded with ISP mode.
iii. Alternatively, explicit MTS may be used for the block coded with DIMD_ISP mode, and the MTS index is signalled.
iv. Alternatively, one or more sets of MTS may be used for the block coded with DIMD_ISP mode.
1) In one example, when only one set of MTS is used for the block coded with DIMD_ISP mode, the MTS index may be not signalled.
4. In one example, for a block coded with DIMD_ISP mode, the determination of whether to use secondary transform (e.g., LFNST), and/or using which set of secondary transform (e.g., LFNST) may be same as or different to a block coded with ISP mode.
i. In one example, index of secondary transform (e.g., LFNST) may be signalled to indicate the set of secondary transform (e.g., LFNST) for the block coded with DIMD_ISP mode.
ii. In one example, secondary transform (e.g., LFNST) may be disabled for the block coded with DIMD_ISP mode, and the secondary transform (e.g., LFNST) index is not signalled.
iii. In one example, one or more sets of secondary transform (e.g., LFNST) may be used for the block coded with DIMD_ISP mode.
1) In one example, when only one set of secondary transform (e.g., LFNST) is used for the block coded with DIMD_ISP mode, the secondary transform (e.g., LFNST) index may be not signalled.

On Enabling of the Combined Mode

5. In one example, whether a coding tool is used, and/or how the coding tool is used for a block coded with DIMD_ISP mode may be same as or different to a block coded with ISP mode.
i. In one example, the coding tool may refer to whether to filtering the reference samples, and/or using which interpolation filter, and/or position dependent intra prediction combination (PDPC), and/or gradient PDPC.

ii. Alternatively, one or more coding tools may be not used for the block coded with DIMD_ISP mode.

iii. Alternatively, whether a coding tool is used, and/or how the coding tool is used for the block coded with DIMD_ISP mode may be different from the block coded with ISP mode.

Signalling for Combination of DIMD and ISP

6. Indication of the combined mode may be conditionally signalled wherein the condition may include:
   a. whether DIMD and/or ISP is allowed
   b. block dimensions and/or block size
   c. block depth
   d. slice/picture type and/or partition tree type (single, or dual tree, or local dual tree)
   e. block location
   f. colour component
   g. colour component 7. Whether current block is coded with DIMD_ISP mode may be signalled using one or more syntax elements.
   h. In one example, the determination of current block coded with DIMD_ISP mode may depend on two syntax elements wherein the first syntax element indicates whether current block is coded with DIMD mode (e.g., SE_DIMD being equal to X1 indicates current block is coded with DIMD mode and SE_DIMD being equal to X2 indicates current block is coded with non-DIMD mode) and the second syntax element indicates whether current block is coded with ISP mode (e.g., SE_ISP being equal to X3 indicates current block is coded with ISP mode and SE_ISP being equal to X4 indicates current block is coded with ISP mode).
     i. In one example, X1=1 and X2=0, or X1=0 and X2=1.
     ii. In one example, X1 is an integer larger than 0 and X2=0.
     iii. In one example, X3=1 and X4=0, or X3=0 and X4=1.
     iv. In one example, X3 is an integer larger than 0 and X4=0.
     v. In one example, the current block is coded with DIMD_ISP mode when SE_DIMD is equal to X1 and SE_ISP is equal to X3.
     vi. In one example, SE_DIMD is signalled before SE_ISP.
       1) In one example, when current block is not allowed to be coded with DIMD_ISP mode and current block is coded with DIMD mode (i.e., SE_DIMD is equal to X1), SE_ISP may be not signalled and inferred to be X4.
         a) Alternatively, when current block is not allowed to be coded with DIMD_ISP mode and current block is coded with DIMD mode (i.e., SE_DIMD is equal to X1), SE_ISP is always signalled as X4.
       2) In one example, when SE_ISP is context coded, the context of SE_ISP may depend on SE_DIMD.
         a) In one example, N1 contexts are used for SE_ISP when SE_DIMD is equal to X1 and N2 contexts are used for SE_ISP when SE_DIMD is equal to X2. N1 may be equal to N2 and none of N1 contexts is equal to any of N2 contexts.
         b) Alternatively, one or more of N1 contexts may be equal to one or more of N2 contexts.
       3) Alternatively, the context of SE_ISP may not depend on SE_DIMD.
       4) In one example, the context of a syntax element indicating the type of ISP split (horizontal or vertical) may depend on SE_DIMD when the syntax element is context coded.
         a) In one example, N3 contexts are used for the syntax element when SE_DIMD is equal to X1 and N4 contexts are used for the syntax element when SE_DIMD is equal to X2. N3 may be equal to N4 and none of N3 contexts is equal to any of N4 contexts.
         b) Alternatively, one or more of N3 contexts may be equal to one or more of N4 contexts.
     vii. In one example, SE_ISP is signalled before SE_DIMD.
       1) In one example, when current block is not allowed to be coded with DIMD_ISP mode and current block is coded with ISP mode (i.e., SE_ISP is equal to X3), SE_DIMD may be not signalled and inferred to be X2.
         a) Alternatively, when current block is not allowed to be coded with DIMD_ISP mode and current block is coded with ISP mode (i.e., SE_ISP is equal to X3), SE_DIMD is always signalled as X2.
       2) In one example, when SE_DIMD is context coded, the context of SE_DIMD may depend on SE_ISP.
         a) In one example, N1 contexts are used for SE_DIMD when SE_ISP is equal to X3 and N2 contexts are used for SE_DIMD when SE_ISP is equal to X4. N1 may be equal to N2 and none of N1 contexts is equal to any of N2 contexts.
         b) Alternatively, one or more of N1 contexts may be equal to one or more of N2 contexts.
       3) Alternatively, the context of SE_DIMD may not depend on SE_ISP.
       4) In one example, when multiple modes and/or multiple sets of modes are used in DIMD and a syntax element (e.g., the DIMD index) is signalled to indicate using which mode and/or which set of modes and context coded, the context of the syntax element may depend on SE_ISP.
         a) In one example, N3 contexts are used for the syntax element when SE_ISP is equal to X3 and N4 contexts are used for the syntax element when SE_ISP is equal to X4. N3 may be equal to N4 and none of N3 contexts is equal to any of N4 contexts.
         b) Alternatively, one or more of N3 contexts may be equal to one or more of N4 contexts.
   i. In one example, the determination of current block coded with DIMD_ISP mode may depend on one syntax element.
     i. In one example, the syntax element being equal to X5 indicates current block is coded with DIMD_ISP mode and he syntax element being equal to X6 indicates current block is coded with non DIMD_ISP mode.
       1) In one example, X5=1 and X6=0, or X5=0 and X6=1.
       2) In one example, X5 is an integer larger than 0 and X6=0.

3) In one example, the syntax element may be signalled before SE_DIMD and/or SE_ISP.
4) In one example, SE_DIMD and/or SE_ISP may be not signalled when the syntax element is equal to X5.
ii. In one example, the syntax element may be binarized with fixed length coding, or truncated unary coding, or unary coding, or EG coding, or coded a flag.
iii. In one example, the syntax element may be bypass coded.
iv. Alternatively, the syntax element may be context coded.
1) The context may depend on coded information, such as block dimensions, and/or block size, and/or slice/picture types, and/or the information of neighbouring blocks (adjacent or non-adjacent), and/or the information of other coding tools used for current block, and/or the information of temporal layer.
j. In one example, whether a block is allowed to be coded with DIMD_ISP mode may depend on one or more syntax elements.
i. In one example, the one or more syntax elements may be signalled as general constraints information.
1) In one example, when a syntax element (e.g., gci_no_dimd_isp_constraint_flag) indicating general constraint on DIMD_ISP is equal to X7 (e.g., X7=0 or X7=1), DIMD_ISP shall be not allowed.
2) In one example, when either a syntax element (e.g., gci_no_dimd_constraint_flag) indicating general constraint on DIMD is equal to X8 (e.g., X8=0 or X8=1), or a syntax element (e.g., gci_no_isp_constraint_flag) indicating general constraint on ISP is equal to X9 (e.g., X9=0 or X9=1), DIMD_ISP shall be not allowed.
ii. In one example, the one or more syntax elements may be signalled at sequence header/picture header/SPS/VPS/DPS/DCI/PPS/APS/slice header/tile group header.

General Claims

8. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.
9. Whether to and/or how to apply the disclosed methods above may be signalled at PB/TB/CB/PU/TU/CU/VPDU/CTU/CTU row/slice/tile/sub-picture/other kinds of region contains more than one sample or pixel.
10. Whether to and/or how to apply the disclosed methods above may be dependent on coded information, such as block size, colour format, single/dual tree partitioning, colour component, slice/picture type.

5. Embodiment 5.1. Embodiment 1

The working draft may be changed as below.

|  | Descriptor |
|---|---|
| seq_parameter_set_rbsp( ) { |  |
|   sps_seq_parameter_set_id | u(4) |
|   sps_video_parameter_set_id | u(4) |
|   ... |  |
|   sps_dimd_enabled_flag | u(1) |
|   ... |  |
|   rbsp_trailing_bits( ) |  |
| } |  |
| coding_unit( x0, y0, cbWidth, cbHeight, cqtDepth, treeType, modeType ) { |  |
|   if( sh_slice_type = = I && ( cbWidth > 64 \|\| cbHeight > 64 ) ) |  |
|     modeType = MODE_TYPE_INTRA |  |
|   chType = treeType = = DUAL_TREE_CHROMA ? 1 : 0 |  |
|   if( sh_slice_type != I \|\| sps_ibc_enabled_flag ) { |  |
|     if( treeType != DUAL_TREE_CHROMA && |  |
|       ( ( !( cbWidth = = 4 && cbHeight = = 4 ) && |  |
|       modeType != MODE_TYPE_INTRA ) \|\| |  |
|       ( sps_ibc_enabled_flag && cbWidth <= 64 && cbHeight <= 64 ) ) ) |  |
|       cu_skip_flag[ x0 ][ y0 ] | ae(v) |
|     if( cu_skip_flag[ x0 ][ y0 ] = = 0 && sh_slice_type != I && |  |
|       !( cbWidth = = 4 && cbHeight = = 4 ) && modeType = = MODE_TYPE_ALL ) |  |
|       pred_mode_flag | ae(v) |
|     if( ( ( sh_slice_type = = I && cu_skip_flag[ x0 ][ y0 ] = =0 ) \|\| |  |
|       ( sh_slice_type != I && ( CuPredMode[ chType ][ x0 ][ y0 ] != MODE_INTRA \|\| |  |
|       ( ( ( cbWidth = = 4 && cbHeight = = 4 ) \|\| modeType = = MODE_TYPE_INTRA ) |  |
|       && cu_skip_flag[ x0 ][ y0 ] = = 0 ) ) ) ) && |  |
|       cbWidth <= 64 && cbHeight <= 64 && modeType != MODE_TYPE_INTER && |  |
|       sps_ibc_enabled_flag && treeType != DUAL_TREE_CHROMA ) |  |
|       pred_mode_ibc_flag | ae(v) |
|   } |  |
|   if( CuPredMode[ chType ][ x0 ][ y0 ] = = MODE_INTRA && sps_palette_enabled_flag && |  |
|     cbWidth <= 64 && cbHeight <= 64 && cu_skip_flag[ x0 ][ y0 ] = = 0 && |  |
|     modeType != MODE_TYPE_INTER && ( ( cbWidth * cbHeight ) > |  |
|     ( treeType != DUAL_TREE_CHROMA ? 16 : 16 * SubWidthC * SubHeightC ) ) |  |
|     && |  |

|  | Descriptor |
|---|---|
|     ( modeType != MODE_TYPE_INTRA || treeType != DUAL_TREE_CHROMA ) ) | |
|       pred_mode_plt_flag | ae(v) |
|   if( treeType != DUAL_TREE_CHROMA && modeType != MODE_TYPE_INTER | |
|     && sps_dimd_enabled_flag ) | |
|     cu_dimd_flag | ae(v) |
|   if( CuPredMode[ chType ][ x0 ][ y0 ] = = MODE_INTRA && sps_act_enabled_flag && | |
|     treeType = = SINGLE_TREE ) | |
|     cu_act_enabled_flag | ae(v) |
|   if( CuPredMode[ chType ][ x0 ][ y0 ] = = MODE_INTRA || | |
|     CuPredMode[ chType ][ x0 ][ y0 ] = = MODE_PLT ) { | |
|     if( treeType = = SINGLE_TREE || treeType = = DUAL_TREE_LUMA ) { | |
|       if( pred_mode_plt_flag ) | |
|         palette_coding( x0, y0, cbWidth, cbHeight, treeType ) | |
|       else { | |
|         if( sps_bdpcm_enabled_flag && | |
|           cbWidth <= MaxTsSize && cbHeight <= MaxTsSize ) | |
|           intra_bdpcm_luma_flag | ae(v) |
|         if( intra_bdpcm_luma_flag ) | |
|           intra_bdpcm_luma_dir_flag | ae(v) |
|         else { | |
|           if( sps_mip_enabled_flag ) | |
|             intra_mip_flag | ae(v) |
|           if( intra_mip_flag ) { | |
|             intra_mip_transposed_flag[ x0 ][ y0 ] | ae(v) |
|             intra_mip_mode[ x0 ][ y0 ] | ae(v) |
|           } else { | |
|             if( sps_mrl_enabled_flag && ( ( y0 % CtbSizeY ) > 0 ) ) | |
|               intra_luma_ref_idx | ae(v) |
|             if( sps_isp_enabled_flag && intra_luma_ref_idx = = 0 && | |
|               ( cbWidth <= MaxTbSizeY && cbHeight <= MaxTbSizeY ) && | |
|               ( cb Width * cbHeight > MinTbSizeY * MinTbSizeY ) && | |
|               !cu_act_enabled_flag && !( cu_dimd_flag && !DimdIspEnabled ) ) | |
|               intra_subpartitions_mode_flag | ae(v) |
|             if( intra_subpartitions_mode_flag = = 1 ) | |
|               intra_subpartitions_split_flag | ae(v) |
|             if ( !cu_dimd_flag ) { | |
|             if( intra_luma_ref_idx = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx = = 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|             } | |
|           } | |
|         } | |
|       } | |
|     } | |
|   } | |
| } | | sps_dimd_enabled_flag equal to 1 specifies that the decoder-side intra prediction mode derivation is enabled for the CLVS. sps_dimd_enabled_flag equal to 0 specifies that the decoder-side intra prediction mode derivation is disabled for the CLVS.

cu_dimd_flag equal to 1 specifies that the luma intra prediction mode is derived at decoder-side. cu_dimd_flag equal to 0 specifies that the luma intra prediction mode is not derived at decoder-side.

When cu_dimd_flag is not present, it is inferred to be equal to 0.

When treeType is not equal to DUAL_TREE_CHROMA, the variable CuDimdFlag[x][y] is set equal to cu_dimd_flag for x=x0 . . . x0+cbWidth−1 and y=y0 . . . y0+cbHeight−1.

intra_subpartitions_mode_flag equal to 1 specifies that the current intra coding unit is partitioned into NumIntraSubPartitions[x0][y0] transform block subpartitions. intra_subpartitions_mode_flag equal to 0 specifies that the current intra coding unit is not partitioned into transform block subpartitions.

When intra_subpartitions_mode_flag is not present, it is inferred to be equal to 0.

When tree Type is not equal to DUAL_TREE_CHROMA, the variable IntraSubPartitionsModeFlag[x][y] is set equal to intra_subpartitions_mode_flag for x=x0 . . . x0+cbWidth−1 and y=y0 . . . y0+cbHeight−1.

intra_subpartitions_split_flag specifies whether the intra subpartitions split type is horizontal or vertical.

The variable IntraSubPartitionsSplitType specifies the type of split used for the current luma coding block as illustrated in Table 13. IntraSubPartitionsSplitType is derived as follows:

If intra_subpartitions_mode_flag is equal to 0, IntraSubPartitionsSplitType is set equal to 0.

Otherwise, the IntraSubPartitionsSplitType is set equal to 1+intra_subpartitions_split_flag.

TABLE 13

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to 2:
    cbWidth is equal to 4 and cbHeight is equal to 8,
    cbWidth is equal to 8 and cbHeight is equal to 4.
  Otherwise, NumIntraSubPartitions is set equal to 4.
  a variable DimdIspEnabled specifying if a combined mode of DIMD and ISP is enabled (TRUE) or not enabled (FALSE) for the current coding block.

5.2. Embodiment 2

The working draft may be changed as below.

| | Descriptor |
|---|---|
| seq_parameter_set_rbsp( ) { | |
|   sps_seq_parameter_set_id | u(4) |
|   sps_video_parameter_set_id | u(4) |
|   ... | |
|   sps_dimd_enabled_flag | u(1) |
|   ... | |
|   rbsp_trailing_bits( ) | |
| } | |

| | Descriptor |
|---|---|
| coding_unit( x0, y0, cbWidth, cbHeight, cqtDepth, treeType, modeType ) { | |
|   if( sh_slice_type = = I && ( cbWidth > 64 \|\| cbHeight > 64 ) ) | |
|     modeType = MODE_TYPE_INTRA | |
|   chType = treeType = = DUAL_TREE_CHROMA ? 1 : 0 | |
|   if( sh_slice_type != I \|\| sps_ibc_enabled_flag ) { | |
|     if( treeType != DUAL_TREE_CHROMA && | |
|       ( ( !( cbWidth = = 4 && cbHeight = = 4 ) && | |
|       modeType != MODE_TYPE_INTRA ) \|\| | |
|       ( sps_ibc_enabled_flag && cbWidth <= 64 && cbHeight <= 64 ) ) ) | q |
|       cu_skip_flag[ x0 ][ y0 ] | ae(v) |
|     if( cu_skip_flag[ x0 ][ y0 ] = = 0 && sh_slice_type != I && | |
|       !( cbWidth = = 4 && cbHeight = = 4 ) && modeType = = MODE_TYPE_ALL ) | |
|       pred_mode_flag | ae(v) |
|     if( ( ( sh_slice_type = = I && cu_skip_flag[ x0 ][ y0 ] = =0 ) \|\| | |
|       ( sh_slice_type != I && ( CuPredMode[ chType ][ x0 ][ y0 ] != MODE_INTRA \|\| | |
|       ( ( ( cbWidth = = 4 && cbHeight = = 4 ) \|\| modeType = = MODE_TYPE_INTRA ) | |
|       && cu_skip_flag[ x0 ][ y0 ] = = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|   } | |
|   if( CuPredMode[ chType ][ x0 ][ y0 ] = = MODE_INTRA && sps_palette_enabled_flag && | |
|     cbWidth <= 64 && cbHeight <= 64 && cu_skip_flag[ x0 ][ y0 ] = = 0 && | |
|     modeType != MODE_TYPE_INTER && ( ( cbWidth * cbHeight ) > | |
|     ( treeType != DUAL_TREE_CHROMA ? 16 : 16 * SubWidthC * SubHeightC ) ) && | |
|     ( modeType != MODE_TYPE_INTRA \|\| treeType != DUAL_TREE_CHROMA ) ) | |
|     pred_mode_plt_flag | ae(v) |
|   if( CuPredMode[ chType ][ x0 ][ y0 ] = = MODE_INTRA && sps_act_enabled_flag && | |
|     treeType = = SINGLE_TREE ) | |
|     cu_act_enabled_flag | ae(v) |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) | |
|         palette_coding( x0, y0, cbWidth, cbHeight, treeType ) | |
|       else { | |
|         if( sps_bdpcm_enabled_flag && | |
|           cbWidth <= MaxTsSize && cbHeight <= MaxTsSize ) | |
|           intra_bdpcm_luma_flag | ae(v) |
|         if( intra_bdpcm_luma_flag ) | |
|           intra_bdpcm_luma_dir_flag | |
|         else { | |
|           if( sps_mip_enabled_flag ) | |
|             intra_mip_flag | ae(v) |
|           if( intra_mip_flag ) { | |
|             intra_mip_transposed_flag[ x0 ][ y0 ] | ae(v) |
|             intra_mip_mode[ x0 ][ y0 ] | ae(v) |
|           } else { | |
|             if( treeType != DUAL_TREE_CHROMA && modeType != | |
|               MODE_TYPE_INTER && sps_dimd_enabled_flag ) | |
|               cu_dimd_flag | ae(v) |
|             if( sps_mrl_enabled_flag && ( ( y0 % CtbSizeY ) > 0 ) ) | |
|               intra_luma_ref_idx | ae(v) |

| | Descriptor |
|---|---|
| ```
if( sps_isp_enabled_flag && intra luma_ref_idx = = 0 &&
    ( cbWidth <= MaxTbSizeY && cbHeight <= MaxTbSizeY ) &&
    ( cbWidth * cbHeight > MinTbSizeY * MinTbSizeY ) &&
    !cu_act_enabled_flag && !( cu_dimd_flag && !DimdIspEnabled ) )
   intra_subpartitions_mode_flag
``` | ae(v) |
| ```
if( intra_subpartitions_mode_flag = = 1 )
   intra_subpartitions_split_flag
``` | ae(v) |
| ```
if ( !cu_dimd_flag ) {
  if( intra_luma_ref_idx = = 0 )
    intra_luma_mpm_flag[ x0 ][ y0 ]
``` | ae(v) |
| ```
  if( intra_luma_mpm_flag[ x0 ][ y0 ] ) {
    if( intra_luma_ref_idx = = 0 )
      intra_luma_not_planar_flag[ x0 ][ y0 ]
``` | ae(v) |
| ```
    if( intra_luma_not_planar_flag[ x0 ][ y0 ] )
      intra_luma_mpm_idx[ x0 ][ y0 ]
``` | ae(v) |
| ```
  } else
    intra_luma_mpm_remainder[ x0 ][ y0 ]
      }
     }
    }
   }
  }
 }
}
``` | ae(v) | sps_dimd_enabled_flag equal to 1 specifies that the decoder-side intra prediction mode derivation is enabled for the CLVS. sps_dimd_enabled_flag equal to 0 specifies that the decoder-side intra prediction mode derivation is disabled for the CLVS.

cu_dimd_flag equal to 1 specifies that the luma intra prediction mode is derived at decoder-side. cu_dimd_flag equal to 0 specifies that the luma intra prediction mode is not derived at decoder-side.

When cu_dimd_flag is not present, it is inferred to be equal to 0.

When treeType is not equal to DUAL_TREE_CHROMA, the variable CuDimdFlag[x][y] is set equal to cu_dimd_flag for x=x0 . . . x0+cbWidth−1 and y=y0 . . . y0+cbHeight−1.

intra_subpartitions_mode_flag equal to 1 specifies that the current intra coding unit is partitioned into NumIntraSubPartitions[x0][y0] transform block subpartitions. intra_subpartitions_mode_flag equal to 0 specifies that the current intra coding unit is not partitioned into transform block subpartitions.

When intra_subpartitions_mode_flag is not present, it is inferred to be equal to 0.

When treeType is not equal to DUAL_TREE_CHROMA, the variable IntraSubPartitionsModeFlag[x][y] is set equal to intra_subpartitions_mode_flag for x=x0 . . . x0+cbWidth−1 and y=y0 . . . y0+cbHeight−1.

intra_subpartitions_split_flag specifies whether the intra subpartitions split type is horizontal or vertical.

The variable IntraSubPartitionsSplitType specifies the type of split used for the current luma coding block as illustrated in Table 13. IntraSubPartitionsSplitType is derived as follows:

If intra_subpartitions_mode_flag is equal to 0, IntraSubPartitionsSplitType is set equal to 0.

Otherwise, the IntraSubPartitionsSplitType is set equal to 1+intra_subpartitions_split_flag.

TABLE 13

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:

cbWidth is equal to 4 and cbHeight is equal to 8, cbWidth is equal to 8 and cbHeight is equal to 4.

Otherwise, NumIntraSubPartitions is set equal to 4.

a variable DimdIspEnabled specifying if a combined mode of DIMD and ISP is enabled (TRUE) or not enabled (FALSE) for the current coding block.

5.3. Embodiment 3

The working draft may be changed as below.

| | Descriptor |
|---|---|
| ```
seq_parameter_set_rbsp( ) {
  sps_seq_parameter_set_id
``` | u(4) |
| ```
  sps_video_parameter_set_id
``` | u(4) |
| ```
  ...
  sps_dimd_enabled_flag
``` | u(1) |
| ```
  ...
  rbsp_trailing_bits( )
}
``` | |

|                                                                                                                                             | Descriptor |
|---|---|
| ```
coding_unit( x0, y0, cbWidth, cbHeight, cqtDepth, treeType, modeType ) {
    if( sh_slice_type = = I && ( cbWidth > 64 | | cbHeight > 64 ) )
        modeType = MODE_TYPE_INTRA
    chType = treeType = = DUAL_TREE_CHROMA ? 1 : 0
    if( sh_slice_type != I | | sps_ibc_enabled_flag ) {
        if( treeType != DUAL_TREE_CHROMA &&
            ( ( !( cbWidth = = 4 && cbHeight = = 4 ) &&
                modeType != MODE_TYPE_INTRA ) | |
            ( sps_ibc_enabled_flag && cbWidth <= 64 && cbHeight <= 64 ) ) )
            cu_skip_flag[ x0 ][ y0 ]
        if( cu_skip_flag[ x0 ][ y0 ] = = 0 && sh_slice_type != I &&
            !( cbWidth = = 4 && cbHeight = = 4 ) && modeType = = MODE_TYPE_ALL )
            pred_mode_flag
        if( ( ( sh_slice_type = = I && cu_skip_flag[ x0 ][ y0 ] = =0 ) | |
            ( sh_slice_type != I && ( CuPredMode[ chType ][ x0 ][ y0 ] != MODE_INTRA | |
            ( ( ( cbWidth = = 4 && cbHeight = = 4 ) | | modeType = = MODE_TYPE_INTRA )
            && cu_skip_flag[ x0 ][ y0 ] = = 0 ) ) ) ) &&
            cbWidth <= 64 && cbHeight <= 64 && modeType != MODE_TYPE_INTER &&
            sps_ibc_enabled_flag && treeType != DUAL_TREE_CHROMA )
            pred_mode_ibc_flag
    }
    if( CuPredMode[ chType ][ x0 ][ y0 ] = = MODE_INTRA && sps_palette_enabled_flag &&
        cbWidth <= 64 && cbHeight <= 64 && cu_skip_flag[ x0 ][ y0 ] = = 0 &&
        modeType != MODE_TYPE_INTER && ( ( cbWidth * cbHeight ) >
        ( treeType != DUAL_TREE_CHROMA ? 16 : 16 * SubWidthC * SubHeightC ) ) &&
        ( modeType != MODE_TYPE_INTRA | | treeType != DUAL_TREE_CHROMA ) )
        pred_mode_plt_flag
    if( CuPredMode[ chType ][ x0 ][ y0 ] = = MODE_INTRA && sps_act_enabled_flag &&
        treeType = = SINGLE_TREE )
        cu_act_enabled_flag
    if( CuPredMode[ chType ][ x0 ][ y0 ] = = MODE_INTRA | |
        CuPredMode[ chType ][ x0 ][ y0 ] = = MODE_PLT ) {
        if( treeType = = SINGLE_TREE | | treeType = = DUAL_TREE_LUMA ) {
            if( pred_mode_plt_flag )
                palette_coding( x0, y0, cbWidth, cbHeight, treeType )
            else {
                if( sps_bdpcm_enabled_flag &&
                    cbWidth <= MaxTsSize && cbHeight <= MaxTsSize )
                    intra_bdpcm_luma_flag
                if( intra_bdpcm_luma_flag )
                    intra_bdpcm_luma_dir_flag
                else {
                    if( sps_mip_enabled_flag )
                        intra_mip_flag
                    if( intra_mip_flag ) {
                        intra_mip_transposed_flag[ x0 ][ y0 ]
                        intra_mip_mode[ x0 ][ y0 ]
                    } else {
                        if( treeType != DUAL_TREE_CHROMA && modeType !=
                            MODE_TYPE_INTER && sps_dimd_enabled_flag )
                            cu_dimd_flag
                        if( sps_mrl_enabled_flag && ( ( y0 % CtbSizeY ) > 0 ) )
                            intra_luma_ref_idx
                        if( sps_isp_enabled_flag && intra_luma_ref_idx = = 0 &&
                            ( cbWidth <= MaxTbSizeY && cbHeight <= MaxTbSizeY ) &&
                            ( cbWidth * cbHeight > MinTbSizeY * MinTbSizeY ) &&
                            !cu_act_enabled_flag && !( cu_dimd_flag && !DimdIspEnabled ) )
                            intra_subpartitions_mode_flag
                        if( intra_subpartitions_mode_flag = = 1 )
                            intra_subpartitions_split_flag
                        If ( !cu_dimd_flag ) {
                            if( intra_luma_ref_idx = = 0 )
                                intra_luma_mpm_flag[ x0 ][ y0 ]
                            if( intra_luma_mpm_flag[ x0 ][ y0 ] ) {
                                if( intra_luma_ref_idx = = 0 )
                                    intra_luma_not_planar_flag[ x0 ][ y0 ]
                                if( intra_luma_not_planar_flag[ x0 ][ y0 ] )
                                    intra_luma_mpm_idx[ x0 ][ y0 ]
                            } else
                                intra_luma_mpm_remainder[ x0 ][ y0 ]
                        }
                    }
                }
            }
        }
        if( ( treeType = = SINGLE_TREE | | treeType = = DUAL_TREE_CHROMA ) &&
            sps_chroma_format_idc != 0 ) {
            if( pred_mode_plt_flag && treeType = = DUAL_TREE_CHROMA )
                palette_coding( x0, y0, cbWidth / SubWidthC, cbHeight / SubHeightC, treeType )
``` | ae(v)<br><br><br>ae(v)<br><br><br><br><br><br><br>ae(v)<br><br><br><br><br><br>ae(v)<br><br>ae(v)<br><br><br><br>ae(v)<br>ae(v)<br><br><br>ae(v)<br><br>ae(v)<br>ae(v)<br><br><br><br><br>ae(v)<br><br>ae(v)<br><br><br><br><br>ae(v)<br><br>ae(v)<br><br><br>ae(v)<br><br><br>ae(v)<br>ae(v)<br><br>ae(v) |

-continued

| | Descriptor |
|---|---|
|     else if( !pred_mode_plt_flag ) { | |
|       if( !cu_act_enabled_flag ) { | |
|         if( cbWidth / SubWidthC <= MaxTsSize && cbHeight / SubHeightC <= MaxTsSize | |
|           && sps_bdpcm_enabled_flag ) | |
|           intra_bdpcm_chroma_flag | ae(v) |
|         if( intra_bdpcm_chroma_flag ) | |
|           intra_bdpcm_chroma_dir_flag | ae(v) |
|         else { | |
|           if( CclmEnabled ) | |
|             cclm_mode_flag | ae(v) |
|           if( cclm_mode_flag ) | |
|             cclm_mode_idx | ae(v) |
|           else | |
|             intra_chroma_pred_mode | ae(v) |
|         } | |
|       } | |
|     } | |
|   } | |
| } else if( treeType != DUAL_TREE_CHROMA ) { /* MODE_INTER or MODE_IBC */ | |
|   if( cu_skip_flag[ x0 ][ y0 ] == 0 ) | |
|     general_merge_flag[ x0 ][ y0 ] | ae(v) |
|   if( general_merge_flag[ x0 ][ y0 ] ) | |
|     merge_data( x0, y0, cbWidth, cbHeight, chType ) | |
|   else if( CuPredMode[ chType ][ x0 ][ y0 ] == MODE_IBC ) { | |
|     mvd_coding( x0, y0, 0, 0 ) | |
|     if( MaxNumIbcMergeCand > 1 ) | |
|       mvp_L0_flag[ x0 ][ y0 ] | ae(v) |
|     if( sps_amvr_enabled_flag && | |
|       ( MvdL0[ x0 ][ y0 ][ 0 ] != 0 || MvdL0[ x0 ][ y0 ][ 1 ] != 0 ) ) | |
|       amvr_precision_idx[ x0 ][ y0 ] | ae(v) |
|   } else { | |
|     if( sh_slice_type == B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_6param_affine_enabled_flag && inter_affine_flag[ x0 ][ y0 ] ) | |
|         cu_affine_type_flag[ x0 ][ y0 ] | ae(v) |
|     } | |
|     if( sps_smvd_enabled_flag && !ph_mvd_L1_zero_flag && | |
|       inter_pred_idc[ x0 ][ y0 ] == PRED_BI && | |
|       !inter_affine_flag[ x0 ][ y0 ] && RefIdxSymL0 > −1 && RefIdxSymL1 > −1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( NumRefIdxActive[ 1 ] > 1 && !sym_mvd_flag[ x0 ][ y0 ] ) | |
|         ref_idx_l1[ x0 ][ y0 ] | ae(v) |
|       if( ph_mvd_l1_zero_flag && inter_pred_idc[ x0 ][ y0 ] == PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         if( sym_mvd_flag[ x0 ][ y0 ] ) { | |
|           MvdL1[ x0 ][ y0 ][ 0 ] = −MvdL0[ x0 ][ y0 ][ 0 ] | |
|           MvdL1[ x0 ][ y0 ][ 1 ] = −MvdL0[ x0 ][ y0 ][ 1 ] | |
|         } else | |
|           mvd_coding( x0, y0, 1, 0 ) | |
|         if( MotionModelIdc[ x0 ][ y0 ] > 0 ) | |
|           mvd_coding( x0, y0, 1, 1 ) | |

|  | Descriptor |
|---|---|
| ``` 
                    if(MotionModelIdc[ x0 ][ y0 ] > 1 )
                        mvd_coding( x0, y0, 1, 2 )
                }
                mvp_l1_flag[ x0 ][ y0 ]
            } else {
                MvdL1[ x0 ][ y0 ][ 0 ] = 0
                MvdL1[ x0 ][ y0 ][ 1 ] = 0
            }
            if( ( sps_amvr_enabled_flag && inter_affine_flag[ x0 ][ y0 ] = = 0 &&
                    ( MvdL0[ x0 ][ y0 ][ 0 ] != 0 | | MvdL0[ x0 ][ y0 ][ 1 ] != 0 | |
                    MvdL1[ x0 ][ y0 ][ 0 ] != 0 | | MvdL1[ x0 ][ y0 ][ 1 ] != 0) ) | |
                    ( sps_affine_amvr_enabled_flag && inter_affine_flag[ x0 ][ y0 ] = = 1 &&
                    ( MvdCpL0[ x0 ][ y0 ][ 0 ][ 0 ] != 0 | | MvdCpL0[ x0 ][ y0 ][ 0 ][ 1 ] != 0 | |
                    MvdCpL1[ x0 ][ y0 ][ 0 ][ 0 ] != 0 | | MvdCpL1[ x0 ][ y0 ][ 0 ][ 1 ] != 0 | |
                    MvdCpL0[ x0 ][ y0 ][ 1 ][ 0 ] != 0 | | MvdCpL0[ x0 ][ y0 ][ 1 ][ 1 ] != 0 | |
                    MvdCpL1[ x0 ][ y0 ][ 1 ][ 0 ] != 0 | | MvdCpL1[ x0 ][ y0 ][ 1 ][ 1 ] != 0 | |
                    MvdCpL0[ x0 ][ y0 ][ 2 ][ 0 ] != 0 | | MvdCpL0[ x0 ][ y0 ][ 2 ][ 1 ] != 0 | |
                    MvdCpL1[ x0 ][ y0 ][ 2 ][ 0 ] != 0 | | MvdCpL1[ x0 ][ y0 ][ 2 ][ 1 ] != 0 ) ) ) {
                amvr_flag[ x0 ][ y0 ]
                if( amvr_flag[ x0 ][ y0 ] )
                    amvr_precision_idx[ x0 ][ y0 ]
            }
            if( sps_bcw_enabled_flag && inter_pred_idc[ x0 ][ y0 ] = = PRED_BI &&
                    luma_weight_l0_flag[ ref_idx_l0 [ x0 ][ y0 ] ] = = 0 &&
                    luma_weight_l1_flag[ ref_idx_l1 [ x0 ][ y0 ] ] = = 0 &&
                    chroma_weight_l0_flag[ ref_idx_l0 [ x0 ][ y0 ] ] = = 0 &&
                    chroma_weight_l1_flag[ ref_idx_l1 [ x0 ][ y0 ] ] = = 0 &&
                    cbWidth * cbHeight >= 256 )
                bcw_idx[ x0 ][ y0 ]
        }
    }
    if( CuPredMode[ chType ][ x0 ][ y0 ] != MODE_INTRA && !pred_mode_plt_flag &&
            general_merge_flag[ x0 ][ y0 ] = = 0 )
        cu_coded_flag
    if( cu_coded_flag ) {
        if( CuPredMode[ chType ][ x0 ][ y0 ] = = MODE_INTER && sps_sbt_enabled_flag &&
                !ciip_flag[ x0 ][ y0 ] && cbWidth <= MaxTbSizeY && cbHeight <= MaxTbSizeY ) {
            allowSbtVerH = cbWidth >= 8
            allowSbtVerQ = cbWidth >= 16
            allowSbtHorH = cbHeight >= 8
            allowSbtHorQ = cbHeight >= 16
            if( allowSbtVerH | | allowSbtHorH )
                cu_sbt_flag
            if( cu_sbt_flag ) {
                if( ( allowSbtVerH | | allowSbtHorH ) && ( allowSbtVerQ | | allowSbtHorQ ) )
                    cu_sbt_quad_flag
                if( ( cu_sbt_quad_flag && allowSbtVerQ && allowSbtHorQ ) | |
                        ( !cu_sbt_quad_flag && allowSbtVerH && allowSbtHorH ) )
                    cu_sbt_horizontal_flag
                cu_sbt_pos_flag
            }
        }
        if( sps_act_enabled_flag && CuPredMode[ chType ][ x0 ][ y0 ] != MODE_INTRA &&
                treeType = = SINGLE_TREE )
            cu_act_enabled_flag
        LfnstDcOnly = 1
        LfnstZeroOutSigCoeffFlag = 1
        MtsDcOnly = 1
        MtsZeroOutSigCoeffFlag = 1
        transform_tree( x0, y0, cbWidth, cbHeight, treeType, chType )
        lfnstWidth = ( treeType = = DUAL_TREE_CHROMA ) ? cbWidth / SubWidthC :
                        ( ( IntraSubPartitionsSplitType = = ISP_VER_SPLIT ) ?
                            cbWidth / NumIntraSubPartitions : cbWidth )
        lfnstHeight = ( treeType = = DUAL_TREE_CHROMA ) ? cbHeight / SubHeightC :
                        ( ( IntraSubPartitionsSplitType = = ISP_HOR_SPLIT) ?
                            cbHeight / NumIntraSubPartitions : cbHeight )
        lfnstNotTsFlag = ( treeType = = DUAL_TREE_CHROMA | |
                            !tu_y_coded_flag[ x0 ][ y0 ] | |
                            transform_skip_flag[ x0 ][ y0 ][ 0 ] = = 0 ) &&
                        ( treeType = = DUAL_TREE_LUMA | |
                            ( ( !tu_cb_coded_flag[ x0 ][ y0 ] | |
                            transform_skip_flag[ x0 ][ y0 ][ 1 ] = = 0 ) &&
                            ( !tu_cr_coded_flag[ x0 ][ y0 ] | |
                            transform_skip_flag[ x0 ][ y0 ][ 2 ] = = 0 ) ) )
        if( Min( lfnstWidth, lfnstHeight ) >= 4 && sps_lfnst_enabled_flag = = 1 &&
                CuPredMode[ chType ][ x0 ][ y0 ] = = MODE_INTRA && lfnstNotTsFlag = = 1 &&
                ( treeType = = DUAL_TREE_CHROMA | | !IntraMipFlag[ x0 ][ y0 ] | |
``` | ae(v)<br><br><br><br><br><br><br><br><br><br><br><br><br><br>ae(v)<br>ae(v)<br><br><br><br><br><br>ae(v)<br><br>ae(v)<br><br><br><br><br><br>ae(v)<br><br>ae(v)<br><br><br>ae(v)<br>ae(v)<br><br><br>ae(v) |

|  | Descriptor |
|---|---|
| ```
            Min( lfnstWidth, lfnstHeight ) >= 16 ) &&
            Max( cbWidth, cbHeight ) <= MaxTbSizeY ) {
        if( ( intraSubPartitionsSplitType != ISP_NO_SPLIT | | LfnstDcOnly = = 0 ) &&
            LfnstZeroOutSigCoeffFlag = = 1 && !(cu_dimd_flag &&
            IntraSubPartitionsSplitType != ISP_NO_SPLIT) )
            lfnst_idx
    }
    if( treeType != DUAL_TREE_CHROMA && lfnst_idx = = 0 &&
        transform_skip_flag[ x0 ][ y0 ][ 0 ] = = 0 && Max( cbWidth, cbHeight ) <= 32 &&
        IntraSubPartitionsSplitType = = ISP_NO_SPLIT && cu_sbt_flag = = 0 &&
        MtsZeroOutSigCoeffFlag = = 1 && MtsDcOnly = = 0 ) {
        if( ( ( CuPredMode[ chType ][ x0 ][ y0 ] = = MODE_INTER &&
            sps_explicit_mts_inter_enabled_flag ) | |
            ( CuPredMode[ chType ][ x0 ][ y0 ] = = MODE_INTRA &&
            sps_explicit_mts_intra_enabled_flag ) ) &&
            !(cu_dimd_flag && IntraSubPartitionsSplitType != ISP_NO_SPLIT) )
            mts_idx
    }
  }
}
``` | ae(v)<br><br><br><br><br><br><br><br><br><br><br><br>ae(v) | sps_dimd_enabled_flag equal to 1 specifies that the decoder-side intra prediction mode derivation is enabled for the CLVS. sps_dimd_enabled_flag equal to 0 specifies that the decoder-side intra prediction mode derivation is disabled for the CLVS.

cu_dimd_flag equal to 1 specifies that the luma intra prediction mode is derived at decoder-side. cu_dimd_flag equal to 0 specifies that the luma intra prediction mode is not derived at decoder-side.

When cu_dimd_flag is not present, it is inferred to be equal to 0.

When treeType is not equal to DUAL_TREE_CHROMA, the variable CuDimdFlag[x][y] is set equal to cu_dimd_flag for x=x0 . . . x0+cbWidth−1 and y=y0 . . . y0+cbHeight−1.

intra_subpartitions_mode_flag equal to 1 specifies that the current intra coding unit is partitioned into NumIntraSubPartitions[x0][y0] transform block subpartitions. intra_subpartitions_mode_flag equal to 0 specifies that the current intra coding unit is not partitioned into transform block subpartitions.

When intra_subpartitions_mode_flag is not present, it is inferred to be equal to 0.

When tree Type is not equal to DUAL_TREE_CHROMA, the variable IntraSubPartitionsModeFlag[x][y] is set equal to intra_subpartitions_mode_flag for x=x0 . . . x0+cbWidth−1 and y=y0 . . . y0+cbHeight−1.

intra_subpartitions_split_flag specifies whether the intra subpartitions split type is horizontal or vertical.

The variable IntraSubPartitionsSplitType specifies the type of split used for the current luma coding block as illustrated in Table 13. IntraSubPartitionsSplitType is derived as follows:

If intra_subpartitions_mode_flag is equal to 0, IntraSubPartitionsSplitType is set equal to 0.

Otherwise, the IntraSubPartitionsSplitType is set equal to 1+intra_subpartitions_split_flag.

TABLE 13

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:

cbWidth is equal to 4 and cbHeight is equal to 8, cbWidth is equal to 8 and cbHeight is equal to 4.

Otherwise, NumIntraSubPartitions is set equal to 4.

a variable DimdIspEnabled specifying if a combined mode of DIMD and ISP is enabled (TRUE) or not enabled (FALSE) for the current coding block.

5.4. Embodiment 4

The working draft may be changed as below.

|  | Descriptor |
|---|---|
| seq_parameter_set_rbsp( ) {<br>  sps_seq_parameter_set_id<br>  sps_video_parameter_set_id<br>...<br>  sps_dimd_enabled_flag<br>  sps_isp_enabled_flag<br>  if ( sps_dimd_enabled_flag && sps_isp_enabled_flag )<br>    sps_dimd_isp_enabled_flag<br>...<br>  rbsp_trailing_bits( )<br>} | <br>u(4)<br>u(4)<br><br>u(1)<br>u(1)<br><br>u(1) |

|  | Descriptor |
|---|---|
| ```
coding_unit( x0, y0, cbWidth, cbHeight, cqtDepth, treeType, modeType ) {
  if( sh_slice_type = = I && ( cbWidth > 64 cbHeight > 64 ) )
    modeType = MODE_TYPE_INTRA
  chType = treeType = = DUAL_TREE_CHROMA ? 1 : 0
  if( sh_slice_type != I | | sps_ibc_enabled_flag ) {
    if( treeType != DUAL_TREE_CHROMA &&
        ( ( !( cbWidth = = 4 && cbHeight = = 4 ) &&
        modeType != MODE_TYPE_INTRA )
        ( sps_ibc_enabled_flag && cbWidth <= 64 && cbHeight <= 64 ) ) )
      cu_skip_flag[ x0 ][ y0 ]
    if( cu_skip_flag[ x0 ][ y0] = = 0 && sh_slice_type != I &&
        !( cbWidth = = 4 && cbHeight = = 4 ) && modeType = = MODE_TYPE_ALL )
      pred_mode_flag
    if( ( ( sh_slice_type = = I && cu_skip_flag[ x0 ][ y0 ] = =0 ) | |
        ( sh_slice_type != I && ( CuPredMode[ chType ][ x0 ][ y0 ] != MODE_INTRA
        ( ( ( cbWidth = = 4 && cbHeight = = 4 ) | | modeType = = MODE_TYPE_INTRA )
        && cu_skip_flag[ x0 ][ y0 ] = = 0 ) ) ) ) &&
        cbWidth <= 64 && cbHeight <= 64 && modeType != MODE_TYPE_INTER &&
        sps_ibc_enabled_flag && treeType != DUAL_TREE_CHROMA )
      pred_mode_ibc_flag
  }
  if( CuPredMode[ chType ][ x0 ][ y0 ] = = MODE_INTRA && sps_palette_enabled_flag &&
      cbWidth <= 64 && cbHeight <= 64 && cu_skip_flag[ x0 ][ y0 ] = = 0 &&
      modeType != MODE_TYPE_INTER && ( ( cbWidth * cbHeight ) >
      ( treeType != DUAL_TREE_CHROMA ? 16 : 16 * SubWidthC * SubHeightC ) ) &&
      ( modeType != MODE_TYPE_INTRA | | treeType != DUAL_TREE_CHROMA ) )
    pred_mode_plt_flag
  if( treeType != DUAL_TREE_CHROMA && modeType != MODE_TYPE_INTER
      && sps_dimd_enabled_flag )
    cu_dimd_flag
  if( CuPredMode[ chType ][ x0 ][ y0 ] = = MODE_INTRA && sps_act_enabled_flag &&
      treeType = = SINGLE_TREE )
    cu_act_enabled_flag
  if( CuPredMode[ chType ][ x0 ][ y0 ] = = MODE_INTRA | |
      CuPredMode[ chType ][ x0 ][ y0 ] = = MODE_PLT ) {
    if( treeType = = SINGLE_TREE | | treeType = = DUAL_TREE_LUMA ) {
      if( pred_mode_plt_flag )
        palette_coding( x0, y0, cbWidth, cbHeight, treeType )
      else {
        if( sps_bdpcm_enabled_flag &&
            cbWidth <= MaxTsSize && cbHeight <= MaxTsSize )
          intra_bdpcm_luma_flag
        if( intra_bdpcm_luma_flag )
          intra_bdpcm_luma_dir_flag
        else {
          if( sps_mip_enabled_flag )
            intra_mip_flag
          if( intra_mip_flag ) {
            intra_mip_transposed_flag[ x0 ][ y0 ]
            intra_mip_mode[ x0 ][ y0 ]
          } else {
            if( sps_mrl_enabled_flag && ( ( y0 % CtbSizeY ) > 0 ) )
              intra_luma_ref_idx
            if( sps_isp_enabled_flag && intra_luma_ref_idx = = 0 &&
                ( cbWidth <= MaxTbSizeY && cbHeight <= MaxTbSizeY ) &&
                ( cbWidth * cbHeight > MinTbSizeY * MinTbSizeY ) &&
                !cu_act_enabled_flag && !( cu_dimd_flag && !DimdIspEnabled ) )
              intra_subpartitions_mode_flag
            if( intra_subpartitions_mode_flag = = 1 )
              intra_subpartitions_split_flag
            if ( !cu_dimd_flag ) {
              if( intra_luma_ref_idx = = 0 )
                intra_luma_mpm_flag[ x0 ][ y0 ]
              if( intra_luma_mpm_flag[ x0 ][ y0 ] ) {
                if( intra_luma_ref_idx = = 0 )
                  intra_luma_not_planar_flag[ x0 ][ y0 ]
                if( intra_luma_not_planar_flag[ x0 ][ y0 ] )
                  intra_luma_mpm_idx[ x0 ][ y0 ]
              } else
                intra_luma_mpm_remainder[ x0 ][ y0 ]
            }
          }
        }
      }
    }
  }
}
``` | ae(v)<br><br><br>ae(v)<br><br><br><br><br><br>ae(v)<br><br><br><br><br><br>ae(v)<br><br>ae(v)<br><br>ae(v)<br><br><br><br><br>ae(v)<br><br>ae(v)<br><br>ae(v)<br>ae(v)<br>ae(v)<br><br><br><br><br>ae(v)<br><br>ae(v)<br><br><br>ae(v)<br><br>ae(v)<br><br>ae(v)<br><br>ae(v) | sps_dimd_enabled_flag equal to 1 specifies that the decoder-side intra prediction mode derivation is enabled for the CLVS. sps_dimd_enabled_flag equal to 0 specifies that the decoder-side intra prediction mode derivation is disabled for the CLVS.

sps_dimd_isp_enabled_flag equal to 1 specifies that the combined mode of decoder-side intra prediction mode derivation and intra prediction with subpartitions is enabled for the CLVS. sps_dimd_isp_enabled_flag equal to 0 specifies that the combined mode of decoder-side intra prediction mode derivation and intra prediction with subpartitions is disabled for the CLVS.

cu_dimd_flag equal to 1 specifies that the luma intra prediction mode is derived at decoder-side. cu_dimd_flag equal to 0 specifies that the luma intra prediction mode is not derived at decoder-side.

When cu_dimd_flag is not present, it is inferred to be equal to 0.

When treeType is not equal to DUAL_TREE_CHROMA, the variable CuDimdFlag[x][y] is set equal to cu_dimd_flag for x=x0 . . . x0+cbWidth−1 and y=y0 . . . y0+cbHeight−1.

intra_subpartitions_mode_flag equal to 1 specifies that the current intra coding unit is partitioned into NumIntraSubPartitions[x0][y0] transform block subpartitions. intra_subpartitions_mode_flag equal to 0 specifies that the current intra coding unit is not partitioned into transform block subpartitions.

When intra_subpartitions_mode_flag is not present, it is inferred to be equal to 0.

When treeType is not equal to DUAL_TREE_CHROMA, the variable IntraSubPartitionsModeFlag[x][y] is set equal to intra_subpartitions_mode_flag for x=x0 . . . x0+cbWidth−1 and y=y0 . . . y0+cbHeight−1.

intra_subpartitions_split_flag specifies whether the intra subpartitions split type is horizontal or vertical.

The variable IntraSubPartitionsSplitType specifies the type of split used for the current luma coding block as illustrated in Table 13. IntraSubPartitionsSplitType is derived as follows:
If intra_subpartitions_mode_flag is equal to 0, IntraSubPartitionsSplitType is set equal to 0
Otherwise, the IntraSubPartitionsSplitType is set equal to 1+intra_subpartitions_split_flag.

TABLE 13

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:
If IntraSubPartitionsSplitType is equal to ISP_NO_SPLIT, NumIntraSubPartitions is set equal to 1.
Otherwise, if one of the following conditions is true, NumIntraSubPartitions is set equal to 2:
cbWidth is equal to 4 and cbHeight is equal to 8,
cbWidth is equal to 8 and cbHeight is equal to 4.
Otherwise, NumIntraSubPartitions is set equal to 4.
a variable DimdIspEnabled specifying if a combined mode of DIMD and ISP is enabled (TRUE) or not enabled (FALSE) for the current coding block. When sps_dimd_isp_enabled_flag is equal to 0, DimdIspEnabled is set equal to false.

5.5. Embodiment 5

The working draft may be changed as below.

| | Descriptor |
|---|---|
| seq_parameter_set_rbsp( ) { | |
|   sps_seq_parameter_set_id | u(4) |
|   sps_video_parameter_set_id | u(4) |
|   ... | |
|   sps_dimd_enabled_flag | u(1) |
|   ... | |
|   rbsp_trailing_bits( ) | |
| } | |

| | Descriptor |
|---|---|
| coding_unit( x0, y0, cbWidth, cbHeight, cqtDepth, treeType, modeType ) { | |
|   if( sh_slice_type = = I && ( cbWidth > 64 cbHeight > 64 ) ) | |
|     modeType = MODE_TYPE_INTRA | |
|   chType = treeType = = DUAL_TREE_CHROMA ? 1 : 0 | |
|   if( sh_slice_type != I \| \| sps_ibc_enabled_flag ) { | |
|     if( treeType != DUAL_TREE_CHROMA && | |
|       ( ( !( cbWidth = = 4 && cbHeight = = 4 ) && | |
|       modeType != MODE_TYPE_INTRA ) \| \| | |
|       ( sps_ibc_enabled_flag && cbWidth <= 64 && cbHeight <= 64 ) ) ) | |
|       cu_skip_flag[ x0 ][ y0 ] | ae(v) |
|     if( cu_skip_flag[ x0 ][ y0 ] = = 0 && sh_slice_type != I && | |
|       !( cbWidth = = 4 && cbHeight = = 4 ) && modeType = = MODE_TYPE_ALL ) | |
|       pred_mode_flag | ae(v) |
|     if( ( ( sh_slice_type = = I && cu_skip_flag[ x0 ][ y0 ] = =0 ) \| \| | |
|       ( sh_slice_type != I && ( CuPredMode[ chType ][ x0 ][ y0 ] != MODE_INTRA \| \| | |
|       ( ( ( cbWidth = = 4 && cbHeight = = 4 ) \| \| modeType = = MODE_TYPE_INTRA ) | |
|       && cu_skip_flag[ x0 ][ y0 ] = = 0 ) ) ) ) && | |
|       cbWidth <= 64 && chHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|   } | |
|   if( CuPredMode[ chType ][ x0 ][ y0 ] = = MODE_INTRA && sps_palette_enabled_flag && | |
|     cbWidth <= 64 && chHeight <= 64 && cu_skip_flag[ x0 ][ y0 ] = = 0 && | |
|     modeType != MODE_TYPE_INTER && ( ( cbWidth * cbHeight ) > | |

|  | Descriptor |
|---|---|
|     ( treeType != DUAL_TREE_CHROMA ? 16 : 16 * SubWidthC * SubHeightC ) ) && <br>    ( modeType != MODE_TYPE_INTRA \|\| treeType != DUAL_TREE_CHROMA ) )<br>   pred_mode_plt_flag | ae(v) |
| if( treeType != DUAL_TREE_CHROMA && modeType != MODE_TYPE_INTER<br>   && sps_dimd_enabled_flag )<br>   cu_dimd_flag | ae(v) |
| if( CuPredMode[ chType ][ x0 ][ y0 ] = = MODE_INTRA && sps_act_enabled_flag &&<br>   treeType = = SINGLE_TREE )<br>   cu_act_enabled_flag | ae(v) |
| if( CuPredMode[ chType ][ x0 ][ y0 ] = = MODE_INTRA \|\|<br>   CuPredMode[ chType ][ x0 ][ y0 ] = = MODE_PLT ) {<br>  if( treeType = = SINGLE_TREE \|\| treeType = = DUAL_TREE_LUMA ) {<br>   if( pred_mode_plt_flag )<br>    palette_coding( x0, y0, cbWidth, cbHeight, treeType )<br>   else {<br>    if( sps_bdpcm_enabled flag &&<br>      cbWidth <= MaxTsSize && cbHeight <= MaxTsSize )<br>     intra_bdpcm_luma_flag | ae(v) |
|     if( intra_bdpcm_luma_flag )<br>     intra_bdpcm_luma_dir_flag | ae(v) |
|     else {<br>     if( sps_mip_enabled_flag )<br>      intra_mip_flag | ae(v) |
|      if( intra_mip_flag ) {<br>      intra_mip_transposed_flag[ x0 ][ y0 ] | ae(v) |
|       intra_mip_mode[ x0 ][ y0 ] | ae(v) |
|      } else {<br>      if( sps_mrl_enabled_flag && ( ( y0 % CtbSizeY ) > 0 ) )<br>       intra_luma_ref_idx | ae(v) |
|       if( sps_isp_enabled_flag && intra_luma_ref_idx = = 0 &&<br>       ( cbWidth <= MaxTbSizeY && cbHeight <= MaxTbSizeY ) &&<br>       ( cbWidth * cbHeight > MinTbSizeY * MinTbSizeY ) &&<br>       !cu_act_enabled_flag && !( cu_dimd_flag && !DimdIspEnabled ) )<br>       intra_subpartitions_mode_flag | ae(v) |
|       if( intra_subpartitions_mode_flag = = 1 && !cu_dimd_flag )<br>       intra_subpartitions_split_flag | ae(v) |
|       if ( !cu_dimd_flag ) {<br>       if( intra_luma_ref_idx = = 0 )<br>        intra_luma_mpm_flag[ x0 ][ y0 ] | ae(v) |
|        if( intra_luma_mpm_flag[ x0 ][ y0 ] ) {<br>        if( intra_luma_ref_idx = = 0 )<br>         intra_luma_not_planar_flag[ x0 ][ y0 ] | ae(v) |
|         if( intra_luma_not_planar_flag[ x0 ][ y0 ] )<br>         intra_luma_mpm_idx[ x0 ][ y0 ] | ae(v) |
|        } else<br>        intra_luma_mpm_remainder[ x0 ][ y0 ] | ae(v) |
|       }<br>     }<br>    }<br>   }<br>  }<br> }<br>} | | sps_dimd_enabled_flag equal to 1 specifies that the decoder-side intra prediction mode derivation is enabled for the CLVS. sps_dimd_enabled_flag equal to 0 specifies that the decoder-side intra prediction mode derivation is disabled for the CLVS.

cu_dimd_flag equal to 1 specifies that the luma intra prediction mode is derived at decoder-side. cu_dimd_flag equal to 0 specifies that the luma intra prediction mode is not derived at decoder-side.

When cu_dimd_flag is not present, it is inferred to be equal to 0.

When treeType is not equal to DUAL_TREE_CHROMA, the variable CuDimdFlag[x][y] is set equal to cu_dimd_flag for x=x0 . . . x0+cbWidth−1 and y=y0 . . . y0+cbHeight−1.

intra_subpartitions_mode_flag equal to 1 specifies that the current intra coding unit is partitioned into NumIntra-SubPartitions[x0][y0] transform block subpartitions. intra_subpartitions_mode_flag equal to 0 specifies that the current intra coding unit is not partitioned into transform block subpartitions.

When intra_subpartitions_mode_flag is not present, it is inferred to be equal to 0.

When treeType is not equal to DUAL_TREE_CHROMA, the variable IntraSubPartitionsModeFlag[x][y] is set equal to intra_subpartitions_mode_flag for x=x0 . . . x0+cb-Width−1 and y=y0 . . . y0+cbHeight−1.

intra_subpartitions_split_flag specifies whether the intra subpartitions split type is horizontal or vertical.

The variable IntraSubPartitionsSplitType specifies the type of split used for the current luma coding block as illustrated in Table 13. IntraSubPartitionsSplitType is derived as follows:

If intra_subpartitions_mode_flag is equal to 0, IntraSubPartitionsSplitType is set equal to 0

Otherwise, the IntraSubPartitionsSplitType is set equal to 1+intra_subpartitions_split_flag.

TABLE 13

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to
    cbWidth is equal to 4 and cbHeight is equal to 8,
    cbWidth is equal to 8 and cbHeight is equal to 4.
  Otherwise, NumIntraSubPartitions is set equal to 4.
  a variable DimdIspEnabled specifying if a combined mode of DIMD and ISP is enabled (TRUE) or not enabled (FALSE) for the current coding block.

Figure 24:
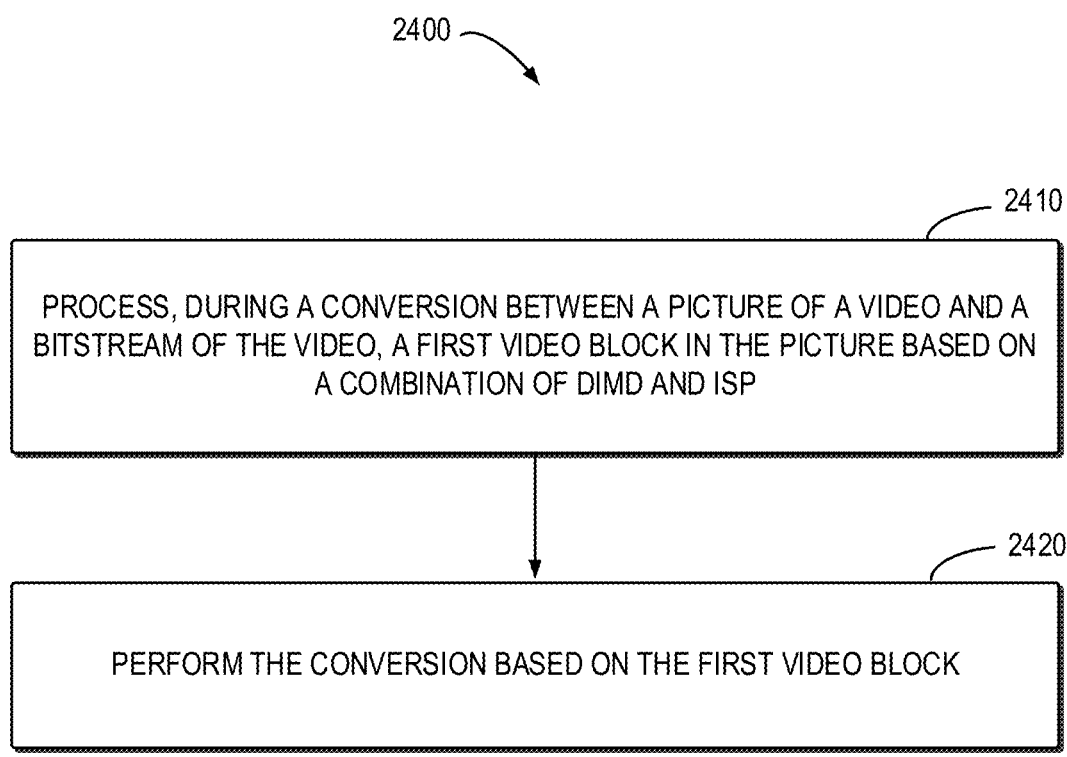
FIG. 24 illustrates a flowchart of a method for video processing in accordance with some embodiments of the present disclosure.

FIG. 24 illustrates a flowchart of a method 2400 for video processing in accordance with some embodiments of the present disclosure. The method 2400 may be implemented during a conversion between a picture of a video and a bitstream of the video. As shown in FIG. 24, the method 2400 starts at 2410, where a first video block in the picture is determined based on a combination of decoder-side intra prediction mode derivation (DIMD) and intra prediction with subpartitions (ISP). The DIMD is used for deriving at least one intra prediction mode (IPM). At 2420, the conversion is performed based on the first video block.

In the context of the embodiments, the terms "a combination of the DIMD and ISP", "a combined mode of DIMD and ISP", or "a DIMD_ISP mode" may refer to intra prediction of a current video block based on at least one IPM derived from DIMD and the ISP mode.

The method 2400 enables the utilization of an IPM derived at the decoder side to reconstruct one or more subpartitions in the current video block. In this way, the intra prediction of the subpartitions is derived based on a combination of DIMD and ISP. Such a combined mode may be denoted as DIMD_ISP mode. Compared with the conventional solution, the signaling overhead of intra prediction can be reduced, and the coding efficiency and performance are improved.

In some embodiments, the first video block may comprise a plurality of subpartitions, and the at least one IPM may comprise a single first IPM. In these embodiments, at 2410, processing the first video block may comprise: processing at least one target subpartition of the plurality of subpartitions based on the first IPM.

In some embodiments, at 2410, processing the first video block may comprise: processing the plurality of subpartitions in the first video block based on the first IPM.

In some embodiments, at 2410, processing the first video block may comprise: processing a rest of the plurality of subpartitions based on at least one second IPM, the first IPM is different from the at least one second IPM.

In the above embodiments, the at least one target subpartition may comprise at least one of the first subpartition, the first two subpartitions, the last subpartition, or the last two subpartitions of the at least one target subpartition, and a number of the at least one second IPM is equal to a number of the rest of the plurality of subpartitions.

In the above embodiments, the at least one second IPM may be predefined and comprise at least one of a Planar mode, a DC mode, a horizontal mode, or a vertical mode.

In the above embodiments, the at least one second IPM may be determined based on the first IPM.

In some embodiments, a mode number of the first IPM may be a first number, and at least one mode number of the at least one second IPM may be at least one of a sum of the first number and a second number or a difference between the first number and the second number, the first number and the second number are integers.

By way of example, the mode number of the first IPM is denoted by M, and the second number is denoted by m, wherein M and m are integers. In this example, the mode number for the at least one second IPM may be, for example, and/or M+m.

In some embodiments, the first video block may comprise a plurality of subpartitions, and the at least one IPM may comprise at least a third IPM and a fourth IPM. In these embodiments, at 2410, processing the first video block may comprise: processing a first subpartition of the plurality of subpartitions based on the third IPM; and processing a second subpartition of the plurality of subpartitions based on the fourth IPM, the third IPM being different from the fourth IPM.

In some embodiments, the DIMD may be applied per subpartition of the first video block. In other words, a DIMD procedure may be applied for each subpartition of the current video block one by one.

In some embodiments, whether at least one of horizontal or vertical ISP split may be allowed for the first video block coded with the combination of the DIMD and the ISP is the same as for a second video block coded with an ISP mode.

In some embodiments, only one type of ISP split may be allowed for the current video block coded with the DIMD_ISP mode. ISP split may include horizontal ISP split or vertical ISP split. In these embodiments, one of the horizontal ISP split and the vertical ISP split may be allowed for the first video block coded with the combination of the DIMD and the ISP.

In some embodiments, which type of ISP split is used for the current video block coded with the DIMD_ISP mode may be derived by using coded information. In these embodiments, the coding information of the first video block may be used for deriving whether the horizontal ISP split or the vertical ISP split is used for the first video block coded with the combination of the DIMD and the ISP.

In some embodiments, the coded information may comprise at least one of the following: block dimensions of the first video block comprising at least one of a block width or a block height, or a block size of the first video block.

In some embodiments, the horizontal ISP split is enabled while the vertical IPS is disabled, if the block height is greater than the block width. For example, the block width is denoted by W, and the block height is denoted by H. In a case where H is greater than W, only horizontal ISP split may be enabled.

In some embodiments, the vertical ISP split is enabled while the horizontal IPS is disabled, if the block width is greater than the block height. In the above examples, in a case where W is greater than H, only vertical ISP split may be enabled.

In some embodiments, both of the vertical ISP split and the horizontal IPS are enabled, if the block width is equal to the block height. In the above examples, in a case where W is equal to H, both horizontal and vertical ISP splits may be enabled.

In some embodiments, one of the vertical ISP split and the horizontal IPS is allowed for the first video block, and a syntax element indicating a type of the ISP split is not included in the bitstream. In other words, for a case where only one ISP split is allowed, no syntax element for indicating the type of the ISP split is need, and thus the signaling overhead is further reduced.

In some embodiments, a determination of a number of subpartitions in the first video block coded with the combination of the DIMD and the ISP may be the same as a determination of a number of subpartitions in a second video block coded with an ISP mode.

In some embodiments, a determination of a number of subpartitions in the first video block coded with the combination of the DIMD and the ISP may be the different from a determination of a number of subpartitions in a second video block coded with an ISP mode. In these embodiments, the number of subpartitions in the first video block is 2 or 4. For example, the number of the subpartitions is denoted by T, and T=2 or T=4.

In some embodiments, a determination of whether the first video block may be allowed to be coded with the combination of the DIMD and the ISP is dependent on coded information of the video.

In some embodiments, the coded information of the video may indicate whether at least one of the DIMD or the ISP is allowed for the first video block.

In some embodiments, the first video block may be disallowed to be coded with the combination of the DIMD and the ISP, if at least one of the DIMD or the ISP is not allowed for the first video block.

In some embodiments, the coded information comprises at least one of the following: block dimensions of the first video block, a block size of the first video block, a block depth of the first video block, a slice type of the picture, a picture type of the picture, information of temporal layer, information of the ISP comprising at least one of a type of the IPS or a number of subpartitions in the first video block, the type of the IPS comprising one of horizontal ISP split and vertical ISP split, or information of a color component. The information of temporal layer may be temporal layer index.

In some embodiments, a plurality of the IPMs may be used by the first video block coded with the combination of the DIMD and the ISP, or a second video block of the picture coded with the ISP.

In some embodiments, the plurality of the IPMs may be used for an intra prediction of a subpartition in the first video block.

In some embodiments, a plurality of predicted samples of the subpartition may be generated based on the plurality of the IPMs. For example, the predicted samples of each subpartition may be generated by using more than one intra prediction mode.

In some embodiments, a first predicted sample of the plurality of predicted samples may be generated based on a first IPM of the plurality of the IPMS, and a second predicted sample of the plurality of predicted samples may be generated based on a second IPM of the plurality of the IPMS. In these embodiments, at 2410, processing the first video block may further comprise: generating a plurality of target predicted samples of the subpartition by weighted blending the plurality of predicted samples.

In the above embodiments, different predicted samples may be generated by using different intra prediction modes, and the predicted samples may be weighted blended to generate the final predicted samples of a subpartition.

In some embodiments, a plurality of sets of weighted blending may be used for the subpartition in the first video block. In this case, different sets of weighted blending may be used.

In some embodiments, an index of a set of weighted blending used for the plurality of subpartitions of the first video block may be included in the bitstream.

In some embodiments, an index of a set of weighted blending used for the plurality of subpartitions of the first video block may be derived based on coded information of the first video block. In this case, since no signaling is needed, the signaling overhead can be reduced.

In some embodiments, a plurality of sets of weighted blending may be used for a plurality of subpartitions in the first video block. In this case, different sets of weighted blending may be used for different subpartitions of the current video block.

In some embodiments, the DIMD may be used for deriving the plurality of the IPMs. Alternatively, in some other embodiments, the plurality of the IPMs may be predefined.

In some embodiments, the plurality of the IPMs may comprise at least one of a Planar mode, a DC mode, a horizontal mode, or a vertical mode.

In some embodiments, the first video block may comprise a plurality of subpartitions, one of the plurality of the IPMs is used for at least one of the plurality of subpartitions, and a rest of the plurality of the IPMs is used for a rest of the plurality of subpartitions. In this case, one IPM may be used for one or more of the subpartitions, and more than one IPMs may be used for the remaining subpartitions.

For a video block coded with the DIMD_ISP mode, a determination of whether to use one or more transform, and/or using which type of transform may be same as a video block coded with ISP mode. In some embodiments, a determination of whether to use at least one transform for the first video block may be the same as for a second video block coded with an ISP mode.

Additionally, or alternatively, in some embodiments, a determination of using which type of at least one transform for the first video block may be the same as for a second video block coded with an ISP mode.

In some embodiments, an implicit multiple transform selection (MTS) may be used for the first video block coded with the combination of the DIMD and the ISP. The condition of using which type of transform may be the same as for the ISP mode. For example, for horizontal transform, DCT7 is used, if the block width is greater than or equal to 4, and is less than or equal to 16, i.e., $4 \leq W \leq 16$; otherwise, DCT2 is used. For another example, for vertical transform, DCT7 is used if the block height is greater than or equal to 4, and is less than or equal to 16, i.e., $4 \leq H \leq 16$; otherwise, DCT2 is used.

In some embodiments, an implicit multiple transform selection (MTS) may be used for the first video block coded with the combination of the DIMD and the ISP, and a determination of using which type of at least one transform for the first video block is different from for a second video block coded with an ISP mode.

In some embodiments, an explicit multiple transform selection (MTS) may be used for the first video block coded with the combination of the DIMD and the ISP, and an MTS index is included in the bitstream.

In some embodiments, at least one set of multiple transform selection (MTS) may be used for the first video block coded with the combination of the DIMD and the ISP.

In some embodiments, a single set of MTS may be used for the first video block coded with the combination of the DIMD and the ISP, and a MTS index is not included in the bitstream. In this case, only one set of MTS is used for the video block coded with the DIMD_ISP mode, the MTS index may be not signalled.

In some embodiments, a determination of whether to use a secondary transform for the first video block coded with the combination of the DIMD and the ISP may be the same as for a second video block coded with an ISP mode, or different from for the second video block coded with the ISP mode. For example, the secondary transform may be low-frequency non-separable transform (LFNST).

Additionally, or alternatively, in some embodiments, a determination of using which set of a secondary transform for the first video block coded with the combination of the DIMD and the ISP may be the same as for a second video block coded with an ISP mode, or different from for the second video block coded with the ISP mode.

In some embodiments, an index of the secondary transform included in the bitstream may indicates a set of LFNST used for the first video block coded with the combination of the DIMD and the ISP. In this case, the index may be an index of the LFNST.

In some embodiments, the secondary transform may be disabled for the first video block coded with the combination of the DIMD and the ISP, and an index of the secondary transform is not included in the bitstream.

In some embodiments, at least one set of the secondary transform is used for the first video block coded with the combination of the DIMD and the ISP.

In some embodiments, a single set of the secondary transform is used for the first video block coded with the combination of the DIMD and the ISP, and an index of the set of the secondary transform is not included in the bitstream. In this way, the signaling overhead of the set of secondary transform can be saved.

In some embodiments, whether and/or how at least one coding tool is used for the first video block coded with the combination of the DIMD and the ISP is the same as for a second video block coded with an ISP mode.

In some embodiments, whether and/or how at least one coding tool coding tool is used for the first video block comprises at least one of the following: whether to filter reference samples, or whether to use at least one of an interpolation filter, a position dependent intra prediction combination (PDPC), or a gradient PDPC.

In some embodiments, at least one coding tool may not be allowed to be used for the first video block coded with the combination of the DIMD and the ISP.

In some embodiments, whether and/or how a coding tool is used for the first video block coded with the combination of the DIMD and the ISP may be different from for a second video block coded with an ISP mode.

In some embodiments, an indication of the combination of the DIMD and the ISP may be included in the bitstream. The indication may be conditionally signaled.

In some embodiments, whether the indication is included in the bitstream is based on at least one of the following: whether at least one of the DIMS or the ISP is allowed for the first video block, block dimensions of the first video block, a block size of the first video block, a block depth of the first video block, a slice type, a picture type, a partition tree type comprising one of a single tree, a dual tree or a local dual tree, a block location of the first video block, or a color component.

In some embodiments, at least one syntax element is included in the bitstream for indicating whether the first video block is coded with the combination of the DIMD and the ISP In some embodiments, the at least one syntax element comprises a first syntax element and a second syntax element, the first syntax element indicates whether the first video block is coded with the DIMD, and the second syntax element indicates whether the first video block is coded with an ISP mode.

In some embodiments, a first value of the first syntax element indicates that the first video block is coded with the DIMD, a second value of the first syntax element indicates that the first video block is not coded with the DIMD, and the first value is different from the second value. In other words, the second value may indicate the first video block is coded with a non-DIMD mode. Additionally, in these embodiments, a third value of the second syntax element indicates that the first video block is coded with the ISPS mode, a fourth value of the second syntax element indicates that the first video block is not coded with the ISP mode, and the third value is different from the fourth value. In other words, the fourth value may indicate the first video block is coded with a non-ISP mode.

In some embodiments, the first syntax element may refer to SE_DIMD, the first value is denoted by X1, and the second value is denoted by X2. For example, X1 may be equal to 1, and X2 may be equal to 0. Alternatively, in another example, X1 may be equal to 0, and X2 may be equal to 1. In still another example, X1 may be an integer greater than 0, and X2 may be equal to 0. In yet another example, X1 may be equal to 0, and X2 may be an integer greater than 0.

In some embodiments, the second syntax element may refer to SE_ISP, the third value is denoted by X3, and the fourth value is denoted by X4. For example, X3 may be equal to 1, and X4 may be equal to 0. Alternatively, in another example, X3 may be equal to 0, and X4 may be equal to 1. In still another example, X3 may be equal to an integer greater than 0, and X4 may be equal to 0. In yet another example, X3 may be equal to 0, and X4 may be an integer greater than 0.

In some embodiments, at 2410, processing the first video block may comprise: in response to the first syntax element is set to the first value and the second syntax element is set to the third value, determining that the first video block is coded with the combination of the DIMD and the ISP. In the above examples, in the case where SE_DIMD is set to X1, and SE_ISP is set to X3, the current video block is coded with the DIMD_ISP mode.

In some embodiments, the first syntax element is included before the second syntax element in the bitstream. In the above examples, SE_DIMD is signalled before SE_ISP.

In some embodiments, the method 2400 may further comprise: in response to the first syntax element being set to the first value, and the second syntax element being not included in the bitstream, determining that the first video block is coded with the DIMD.

In some embodiments, the method 2400 may further comprise: in response to the second syntax element being not included in the bitstream, inferring the second syntax element to be set to the fourth value. By way of example, in a case where the current video block is not allowed to be coded with the DIMD_ISP mode and the current video block is coded with the DIMD mode, for example, SE_DIMD is set to X1, SE_ISP is not signalled and inferred to be X4.

In some embodiments, the method 2400 may further comprise: in response to the first syntax element being set to the first value, and the second syntax element being set to the fourth value, determining that the first video block is coded with the DIMD. By way of example, in a case where the current video block is not allowed to be coded with the DIMD_ISP mode and the current video block is coded with the DIMD mode, SE_DIMD is set to X1, SE_ISP is always signalled to be X4.

In some embodiments, if the second syntax element is context coded, at least one context of the second syntax element is dependent on the first syntax element. In this case, the context of SE_ISP may depend on SE_DIMD.

In some embodiments, the second syntax element is context coded with a first number of contexts if the first syntax element is set to the first value, and the second syntax element is context coded with a second number of contexts if the first syntax element is set to the second value.

By way of example, the first number is denoted by N1, and the second number is denoted by N2. In a case where SE_DIMD is set to X1, N1 contexts are used for SE_ISP, and in a case where SE_DIMD is set to X2, N2 contexts are used for SE_ISP.

In some embodiments, the first number is equal to the second number, and the first number of contexts are different from the second number of contexts. In this case, N1 may be equal to N2, and none of N1 contexts is equal to any of N2 contexts.

In some embodiments, the first number is equal to the second number, and at least one of the first number of contexts is the same as at least one of the second number of contexts. In this case, one or more of N1 contexts may be equal to one or more of N2 contexts.

In some embodiments, if the second syntax element is context coded, at least one context of the second syntax element is independent of the first syntax element.

In some embodiments, if a third syntax element is context coded and indicates a type of ISP split, a context of the third syntax element is dependent on the first syntax element. The type of ISP split may comprise horizontal ISP split or vertical ISP split.

In some embodiments, the third syntax element is context coded with a third number of contexts if the first syntax element is set to the first value, and the third syntax element is context coded with a fourth number of contexts if the first syntax element is set to the second value.

By way of example, the third number is denoted by N3, and the fourth number is denoted by N4. In a case where SE_DIMD is set to X1, N3 contexts are used for the third syntax element. In a case where SE_DIMD is set to X2, N4 contexts are used for the third syntax element.

In some embodiments, the third number is equal to the fourth number, and the third number of contexts are different from the fourth number of contexts. In the above examples, N3 may be equal to N4, and none of N3 contexts is equal to any of N4 contexts.

In some embodiments, the third number is equal to the fourth number, and at least one of the first number of contexts is the same as at least one of the second number of contexts. In the above examples, N3 may be equal to N4, and one or more of N3 contexts may be equal to at least one of N4 contexts.

In some embodiments, the second syntax element is included before the first syntax element in the bitstream. For example, SE_ISP is signalled before SE_DIMD.

In some embodiments, the method 2400 may further comprise: in response to the second syntax element being set to the third value, and the first syntax element being not included in the bitstream, determining that the first video block is coded with the ISP mode. In the above examples, if SE_ISP is set to X3, and SE_DIMD is not signalled, the current video block is not allowed to be coded with the DIMD_ISP mode, and in this case, the current video block is coded with the ISP mode.

In some embodiments, the method 2400 may further comprise: in response to the first syntax element being not included in the bitstream, inferring the first syntax element to be set to the second value. In this case, the SE_DIMD is not signalled and inferred to be X2.

In some embodiments, the method 2400 may further comprise: in response to the second syntax element being set to the third value, and the first syntax element being set to the second value, determining that the first video block is coded with the ISP mode. In the above examples, if SE_ISP is set to X3, and SE_DIMD is set to X2, the current video block is not allowed to be coded with the DIMD_ISP mode, and in this case, the current video block is coded with the ISP mode.

In some embodiments, if the first syntax element is context coded, at least one context of the first syntax element is dependent on the second syntax element.

In some embodiments, the first syntax element is context coded with a first number of contexts if the second syntax element is set to the third value, and the first syntax element is context coded with a second number of contexts if the second syntax element is set to the fourth value. By way of example, in a case where SE_ISP is set to X3, N1 contexts are used for SE_DIMD, and in a case where SE_ISP is set to X4, N2 contexts are used for SE_DIMD.

In some embodiments, the first number is equal to the second number, and the first number of contexts are different from the second number of contexts. In this case, N1 may be equal to N2, and none of N1 contexts is equal to any of N2 contexts.

In some embodiments, the first number is equal to the second number, and at least one of the first number of contexts is the same as at least one of the second number of contexts. In this case, one or more of N1 contexts may be equal to one or more of N2 contexts.

In some embodiments, if the first syntax element is context coded, at least one context of the first syntax element is independent of the second syntax element.

In some embodiments, a plurality of IPMs and/or a plurality of sets of IPMs are used in the DIMD, and a fourth syntax element is context coded and indicates that which IPM and/or which set of IPMs is used for the first video block, and a context of the fourth syntax element is dependent on the second syntax element. For example, the fourth syntax element may be the DIMD index.

In some embodiments, the fourth syntax element may be context coded with a fifth number of contexts if the second syntax element is set to the third value, and the fourth syntax element may be context coded with a sixth number of contexts if the second syntax element is set to the fourth value.

By way of example, the fifth number is denoted by N5, and the sixth number is denoted by N6. In a case where SE_ISP is set to X3, N5 contexts are used for the fourth syntax element. In a case where SE_ISP is set to X4, N6 contexts are used for the fourth syntax element In some embodiments, the fifth number is equal to the sixth number, and the fifth number of contexts are different from the sixth number of contexts. In the above examples, N5 may be equal to N6, and none of N5 contexts is equal to any of N6 contexts.

In some embodiments, the fifth number is equal to the sixth number, and at least one of the fifth number of contexts is the same as at least one of the sixth number of contexts. In the above examples, N5 may be equal to N6, and one or more of N5 contexts may be equal to at least one of N6 contexts.

In some embodiments, the at least one syntax element comprises a fifth syntax element indicating whether the first video block is coded with the combination of the DIMD and the ISP. In this case, the fifth syntax element is specific to the combination of the DIMD and the ISP, i.e., DIMD_ISP mode.

In some embodiments, a fifth value of the fifth syntax element indicates that the first video block is coded with the combination of the DIMD and the ISP, a sixth value of the fifth syntax element indicates that the first video block is not coded with the combination of the DIMD and the ISP, and the fifth value is different from the sixth value.

In some embodiments, the fifth value may be denoted by X5, which indicates that the current video block is coded with the DIMD_ISP mode. Additionally, the sixth value may be denoted by X6, which indicates that the current video block is coded with non-DIMD_ISP mode. For example, X5 may be equal to 1, and X6 may be equal to 0. Alternatively, in another example, X5 may be equal to 0, and X6 may be equal to 1. In still another example, X5 may be an integer greater than 0, and X6 may be equal to 0. In yet another example, X5 may be equal to 0, and X6 may be an integer greater than 0.

In some embodiments, the fifth syntax element is included before at least one of a first syntax element or a second syntax element in the bitstream, where the first syntax element indicates whether the first video block is coded with the DIMD, and the second syntax element indicates whether the first video block is coded with the ISP. In this case, the fifth syntax element specific to the DIMD_ISP mode may be signalled before at least one of SE_DIMD or SE_ISP.

In some embodiments, at least one of the first syntax element or the second syntax element is not included in the bitstream if the fifth syntax element is set to the fifth value, the first syntax element indicates whether the first video block is coded with the DIMD, and the second syntax element indicates whether the first video block is coded with the ISP. For example, if the fifth syntax element is set to X5, SE_DIMD and/or SE_ISP may be not signalled.

In some embodiments, the fifth syntax element is binarized with one of the following coding techniques: fixed length coding, truncated unary coding, unary coding, EG coding, or a flag.

In some embodiments, the fifth syntax element may be bypass coded.

In some embodiments, the fifth syntax element may be context coded based on coded information comprising at least one of the following: block dimensions of the first video block, a block size of the first video block, a slice type, a picture type, information of neighboring video blocks comprising at least one of adjacent or non-adjacent video blocks relative to the first video block, information of coding tools used for the first video block, or information of temporal layer.

In some embodiments, whether the first video block is allowed to be coded with the combination of the DIMD and the ISP is determined based on at least one syntax element.

In this case, the at least one syntax element may be signalled as general constraints information.

In some embodiments, the at least one syntax element comprises a sixth syntax element indicating constraints information about the combination of the DIMD and the ISP. For example, the sixth syntax element may be gci_no_dimd_isp_constraint_flag that indicates the general constraint on the DIMD_ISP mode.

In some embodiments, a seventh value of the sixth syntax element indicates that the combination of the DIMD and the ISP is not allowed for processing the first video block.

By way of example, the seventh value of the sixth syntax element may be denoted by X7, where X7=0 or 1. If the sixth syntax element is set to X7, then DIMD_ISP shall be not allowed.

In some embodiments, the at least one syntax element comprises a seventh syntax element indicating constraints information about the DIMD, and an eighth syntax element indicating constraints information about the ISP. For example, the seventh syntax element may be gci_no_dimd_constraint_flag that indicates the general constraint on DIMD. Moreover, the eighth syntax element may be gci_no_isp_constraint_flag that indicates the general constraint on the ISP mode.

In some embodiments, the combination of the DIMD and the ISP is not allowed for processing the first video block, if the seventh syntax element is set to an eighth value, or if the eighth syntax element is set to a nineth value. In this example, the eighth value may be the same as or different from the nineth value. In the above examples, the eighth value is denoted by X8, where X8=0 or 1. Additionally, the nineth value is denoted by X9, where X9=0 or 19. If gci_no_dimd_constraint_flag is set to X8, or gci_no_isp_constraint_flag is set to X9, the DIMD_ISP mode shall be not allowed.

In some embodiments, the at least one syntax element is included in one of the following: a sequence header, a picture header, a sequence parameter set (SPS), a video parameter set (VPS), decoding parameter set (DPS), decoding capability information (DCI), a picture parameter set (PPS), an adaptation parameter set (APS), a slice header, or a tile group header.

In some embodiments, the conversion may comprise decoding the picture from the bitstream of the video.

In some embodiments, the conversion may comprise encoding the picture into the bitstream of the video.

It should be understood that values, parameters, or configurations in the above embodiments are given for the illustrative purpose, and any other suitable values, parameters, or configurations are also applicable to the implementations of the present disclosure. Therefore, the scope of the present disclosure is not limited in this regard.

Implementations of the present disclosure can be described in view of the following clauses, the features of which can be combined in any reasonable manner.

Clause 1. A method for video processing, comprising: processing, during a conversion between a picture of a video and a bitstream of the video, a first video block in the picture based on a combination of decoder-side intra prediction mode derivation (DIMD) and intra prediction with subpartitions (ISP), the DIMD being used for deriving at least one intra prediction mode (IPM); and performing the conversion based on the combination of the DIMD and the ISP.

Clause 2. The method of clause 1, wherein the first video block comprises a plurality of subpartitions, and the at least one IPM comprises a single first IPM, and wherein processing the first video block comprises: processing at least one target subpartition of the plurality of subpartitions based on the first IPM.

Clause 3. The method of clause 2, wherein processing the first video block comprises: processing the plurality of subpartitions in the first video block based on the first IPM.

Clause 4. The method of clause 2, wherein processing the first video block further comprises: processing a rest of the plurality of subpartitions based on at least one second IPM, the first IPM is different from the at least one second IPM.

Clause 5. The method of clause 4, wherein the at least one target subpartition comprises at least one of the first subpartition, the first two subpartitions, the last subpartition, or the last two subpartitions of the at least one target subpartition, and a number of the at least one second IPM is equal to a number of the rest of the plurality of subpartitions.

Clause 6. The method of clause 4, wherein the at least one second IPM is predefined and comprises at least one of a Planar mode, a DC mode, a horizontal mode, or a vertical mode.

Clause 7. The method of clause 4, wherein the at least one second IPM is determined based on the first IPM.

Clause 8. The method of clause 7, wherein a mode number of the first IPM is a first number, and at least one mode number of the at least one second IPM is at least one of a sum of the first number and a second number or a difference between the first number and the second number, the first number and the second number are integers.

Clause 9. The method of clause 1, wherein the first video block comprises a plurality of subpartitions, and the at least one IPM comprises at least a third IPM and a fourth IPM, and wherein processing the first video block comprises: processing a first subpartition of the plurality of subpartitions based on the third IPM; and processing a second subpartition of the plurality of subpartitions based on the fourth IPM, the third IPM being different from the fourth IPM.

Clause 10. The method of clause 9, wherein the DIMD is applied per subpartition of the first video block.

Clause 11. The method of clause 1, wherein whether at least one of horizontal or vertical ISP split is allowed for the first video block coded with the combination of the DIMD and the ISP is the same as for a second video block coded with an ISP mode.

Clause 12. The method of clause 11, wherein one of the horizontal ISP split and the vertical ISP split is allowed for the first video block coded with the combination of the DIMD and the ISP.

Clause 13. The method of clause 11, wherein coding information of the first video block is used for deriving whether the horizontal ISP split or the vertical ISP split is used for the first video block coded with the combination of the DIMD and the ISP.

Clause 14. The method of clause 13, wherein the coding information comprises at least one of the following: block dimensions of the first video block comprising at least one of a block width or a block height, or a block size of the first video block.

Clause 15. The method of clause 14, wherein the horizontal ISP split is enabled while the vertical IPS is disabled, if the block height is greater than the block width.

Clause 16. The method of clause 14, wherein the vertical ISP split is enabled while the horizontal IPS is disabled, if the block width is greater than the block height.

Clause 17. The method of clause 14, wherein both of the vertical ISP split and the horizontal IPS are enabled, if the block width is equal to the block height.

Clause 18. The method of clause 11, wherein one of the vertical ISP split and the horizontal IPS is allowed for the first video block, and a syntax element indicating a type of the ISP split is not included in the bitstream.

Clause 19. The method of clause 1, wherein a determination of a number of subpartitions in the first video block coded with the combination of the DIMD and the ISP is the same as a determination of a number of subpartitions in a second video block coded with an ISP mode.

Clause 20. The method of clause 1, wherein a determination of a number of subpartitions in the first video block coded with the combination of the DIMD and the ISP is the different from a determination of a number of subpartitions in a second video block coded with an ISP mode.

Clause 21. The method of clause 1, wherein the number of subpartitions in the first video block is 2 or 4.

Clause 22. The method of clause 1, wherein a determination of whether the first video block is allowed to be coded with the combination of the DIMD and the ISP is dependent on coded information of the video.

Clause 23. The method of clause 22, wherein the coded information of the video indicates whether at least one of the DIMD or the ISP is allowed for the first video block.

Clause 24. The method of clause 23, wherein the first video block is disallowed to be coded with the combination of the DIMD and the ISP if at least one of the DIMD or the ISP is not allowed for the first video block.

Clause 25. The method of clause 22, wherein the coded information comprises at least one of the following: block dimensions of the first video block, a block size of the first video block, a block depth of the first video block, a slice type of the picture, a picture type of the picture, information of temporal layer, information of the ISP comprising at least one of a type of the IPS or a number of subpartitions in the first video block, the type of the IPS comprising one of horizontal ISP split and vertical ISP split, or information of a color component.

Clause 26. The method of clause 1, wherein a plurality of the IPMs is used by the first video block coded with the combination of the DIMD and the ISP, or a second video block of the picture coded with the ISP.

Clause 27. The method of clause 26, wherein the plurality of the IPMs is used for an intra prediction of a subpartition in the first video block.

Clause 28. The method of clause 27, wherein a plurality of predicted samples of the subpartition is generated based on the plurality of the IPMs.

Clause 29. The method of clause 27, wherein a first predicted sample of the plurality of predicted samples is generated based on a first IPM of the plurality of the IPMS, and a second predicted sample of the plurality of predicted samples is generated based on a second IPM of the plurality of the IPMS, and wherein processing the first video block further comprises: generating a plurality of target predicted samples of the subpartition by weighted blending the plurality of predicted samples.

Clause 30. The method of clause 29, wherein a plurality of sets of weighted blending is used for the subpartition in the first video block.

Clause 31. The method of clause 29, wherein an index of a set of weighted blending used for the plurality of subpartitions of the first video block is included in the bitstream.

Clause 32. The method of clause 29, wherein an index of a set of weighted blending used for the plurality of subpartitions of the first video block is derived based on coded information of the first video block.

Clause 33. The method of clause 29, wherein a plurality of sets of weighted blending is used for a plurality of subpartitions in the first video block.

Clause 34. The method of clause 28, wherein the DIMD is used for deriving the plurality of the IPMs.

Clause 35. The method of clause 28, wherein the plurality of the IPMs is predefined.

Clause 36. The method of clause 35, wherein the plurality of the IPMs comprises at least one of a Planar mode, a DC mode, a horizontal mode, or a vertical mode.

Clause 37. The method of clause 26, wherein the first video block comprises a plurality of subpartitions, one of the plurality of the IPMs is used for at least one of the plurality of subpartitions, and a rest of the plurality of the IPMs is used for a rest of the plurality of subpartitions.

Clause 38. The method of clause 1, wherein a determination of whether to use at least one transform for the first video block is the same as for a second video block coded with an ISP mode.

Clause 39. The method of clause 1, wherein a determination of using which type of at least one transform for the first video block is the same as for a second video block coded with an ISP mode.

Clause 40. The method of clause 39, wherein an implicit multiple transform selection (MTS) is used for the first video block coded with the combination of the DIMD and the ISP.

Clause 41. The method of clause 1, wherein an implicit multiple transform selection (MTS) is used for the first video block coded with the combination of the DIMD and the ISP, and a determination of using which type of at least one transform for the first video block is different from for a second video block coded with an ISP mode.

Clause 42. The method of clause 1, wherein an explicit multiple transform selection (MTS) is used for the first video block coded with the combination of the DIMD and the ISP, and an MTS index is included in the bitstream.

Clause 43. The method of clause 1, wherein at least one set of multiple transform selection (MTS) is used for the first video block coded with the combination of the DIMD and the ISP.

Clause 44. The method of clause 43, wherein a single set of MTS is used for the first video block coded with the combination of the DIMD and the ISP, and a MTS index is not included in the bitstream.

Clause 45. The method of clause 1, wherein a determination of whether to use a secondary transform for the first video block coded with the combination of the DIMD and the ISP is the same as for a second video block coded with an ISP mode, or different from for the second video block coded with the ISP mode.

Clause 46. The method of clause 1, wherein a determination of using which set of a secondary transform for the first video block coded with the combination of the DIMD and the ISP is the same as for a second video block coded with an ISP mode, or different from for the second video block coded with the ISP mode.

Clause 47. The method of clause 45 or 46, wherein an index of the secondary transform included in the bitstream indicates a set of Low-frequency non-separable transform (LFNST) used for the first video block coded with the combination of the DIMD and the ISP.

Clause 48. The method of clause 45 or 46, wherein the secondary transform is disabled for the first video block coded with the combination of the DIMD and the ISP, and an index of the secondary transform is not included in the bitstream.

Clause 49. The method of clause 45 or 46, wherein at least one set of the secondary transform is used for the first video block coded with the combination of the DIMD and the ISP Clause 50. The method of clause 49, wherein a single set of the secondary transform is used for the first video block coded with the combination of the DIMD and the ISP, and an index of the set of the secondary transform is not included in the bitstream.

Clause 51. The method of clause 1, wherein whether and/or how at least one coding tool is used for the first video block coded with the combination of the DIMD and the ISP is the same as for a second video block coded with an ISP mode.

Clause 52. The method of clause 51, wherein whether and/or how at least one coding tool coding tool is used for the first video block comprises at least one of the following: whether to filter reference samples, or whether to use at least one of an interpolation filter, a position dependent intra prediction combination (PDPC), or a gradient PDPC.

Clause 53. The method of clause 1, wherein at least one coding tool is not allowed to be used for the first video block coded with the combination of the DIMD and the ISP.

Clause 54. The method of clause 1, wherein whether and/or how a coding tool is used for the first video block coded with the combination of the DIMD and the ISP is different from for a second video block coded with an ISP mode.

Clause 55. The method of clause 1, wherein an indication of the combination of the DIMD and the ISP is included in the bitstream.

Clause 56. The method of clause 55, wherein whether the indication is included in the bitstream is based on at least one of the following: whether at least one of the DIMS or the ISP is allowed for the first video block, block dimensions of the first video block, a block size of the first video block, a block depth of the first video block, a slice type, a picture type, a partition tree type comprising one of a single tree, a dual tree or a local dual tree, a block location of the first video block, or a color component.

Clause 57. The method of clause 1, wherein at least one syntax element is included in the bitstream for indicating whether the first video block is coded with the combination of the DIMD and the ISP.

Clause 58. The method of clause 57, wherein the at least one syntax element comprises a first syntax element and a second syntax element, the first syntax element indicates whether the first video block is coded with the DIMD, and the second syntax element indicates whether the first video block is coded with an ISP mode.

Clause 59. The method of clause 58, wherein a first value of the first syntax element indicates that the first video block is coded with the DIMD, and a second value of the first syntax element indicates that the first video block is not coded with the DIMD, and the first value is different from the second value, and wherein a third value of the second syntax element indicates that the first video block is coded with the ISPS mode, and a fourth value of the second syntax element indicates that the first video block is not coded with the ISP mode, and the third value is different from the fourth value.

Clause 60. The method of clause 59, wherein processing the first video block comprises: in response to the first syntax element is set to the first value and the second syntax element is set to the third value, determining that the first video block is coded with the combination of the DIMD and the ISP.

Clause 61. The method of clause 59, wherein the first syntax element is included before the second syntax element in the bitstream.

Clause 62. The method of clause 61, further comprising: in response to the first syntax element being set to the first value, and the second syntax element being not included in the bitstream, determining that the first video block is coded with the DIMD.

Clause 63. The method of clause 62, further comprising: in response to the second syntax element being not included in the bitstream, inferring the second syntax element to be set to the fourth value.

Clause 64. The method of clause 61, further comprising: in response to the first syntax element being set to the first value, and the second syntax element being set to the fourth value, determining that the first video block is coded with the DIMD.

Clause 65. The method of clause 61, wherein if the second syntax element is context coded, at least one context of the second syntax element is dependent on the first syntax element.

Clause 66. The method of clause 65, wherein the second syntax element is context coded with a first number of contexts if the first syntax element is set to the first value, and the second syntax element is context coded with a second number of contexts if the first syntax element is set to the second value.

Clause 67. The method of clause 66, wherein the first number is equal to the second number, and the first number of contexts are different from the second number of contexts.

Clause 68. The method of clause 66, wherein the first number is equal to the second number, and at least one of the first number of contexts is the same as at least one of the second number of contexts.

Clause 69. The method of clause 61, wherein if the second syntax element is context coded, at least one context of the second syntax element is independent of the first syntax element.

Clause 70. The method of clause 61, wherein if a third syntax element is context coded and indicates a type of ISP split, a context of the third syntax element is dependent on the first syntax element, the type of ISP split comprises horizontal ISP split or vertical ISP split.

Clause 71. The method of clause 70, wherein the third syntax element is context coded with a third number of contexts if the first syntax element is set to the first value, and the third syntax element is context coded with a fourth number of contexts if the first syntax element is set to the second value.

Clause 72. The method of clause 71, wherein the third number is equal to the fourth number, and the third number of contexts are different from the fourth number of contexts.

Clause 73. The method of clause 71, wherein the third number is equal to the fourth number, and at least one of the first number of contexts is the same as at least one of the second number of contexts.

Clause 74. The method of clause 59, wherein the second syntax element is included before the first syntax element in the bitstream.

Clause 75. The method of clause 74, further comprising: in response to the second syntax element being set to the third value, and the first syntax element being not included in the bitstream, determining that the first video block is coded with the ISP mode.

Clause 76. The method of clause 75, further comprising: in response to the first syntax element being not included in the bitstream, inferring the first syntax element to be set to the second value.

Clause 77. The method of clause 74, further comprising: in response to the second syntax element being set to the third value, and the first syntax element being set to the second value, determining that the first video block is coded with the ISP mode.

Clause 78. The method of clause 74, wherein if the first syntax element is context coded, at least one context of the first syntax element is dependent on the second syntax element.

Clause 79. The method of clause 78, wherein the first syntax element is context coded with a first number of contexts if the second syntax element is set to the third value, and the first syntax element is context coded with a second number of contexts if the second syntax element is set to the fourth value.

Clause 80. The method of clause 79, wherein the first number is equal to the second number, and the first number of contexts are different from the second number of contexts.

Clause 81. The method of clause 79, wherein the first number is equal to the second number, and at least one of the first number of contexts is the same as at least one of the second number of contexts.

Clause 82. The method of clause 74, wherein if the first syntax element is context coded, at least one context of the first syntax element is independent of the second syntax element.

Clause 83. The method of clause 74, wherein a plurality of IPMs and/or a plurality of sets of IPMs are used in the DIMD, and a fourth syntax element is context coded and indicates that which IPM and/or which set of IPMs is used for the first video block, and a context of the fourth syntax element is dependent on the second syntax element.

Clause 84. The method of clause 83, wherein the fourth syntax element is context coded with a fifth number of contexts if the second syntax element is set to the third value, and the fourth syntax element is context coded with a sixth number of contexts if the second syntax element is set to the fourth value.

Clause 85. The method of clause 84, wherein the fifth number is equal to the sixth number, and the fifth number of contexts are different from the sixth number of contexts.

Clause 86. The method of clause 84, wherein the fifth number is equal to the sixth number, and at least one of the fifth number of contexts is the same as at least one of the sixth number of contexts.

Clause 87. The method of clause 57, wherein the at least one syntax element comprises a fifth syntax element indicating whether the first video block is coded with the combination of the DIMD and the ISP.

Clause 88. The method of clause 87, wherein a fifth value of the fifth syntax element indicates that the first video block is coded with the combination of the DIMD and the ISP, and a sixth value of the fifth syntax element indicates that the first video block is not coded with the combination of the DIMD and the ISP, the fifth value is different from the sixth value.

Clause 89. The method of clause 87 or 88, wherein the fifth syntax element is included before at least one of a first syntax element or a second syntax element in the bitstream, the first syntax element indicates whether the first video block is coded with the DIMD, and the second syntax element indicates whether the first video block is coded with the ISP.

Clause 90. The method of clause 87 or 88, wherein at least one of the first syntax element or the second syntax element is not included in the bitstream if the fifth syntax element is set to the fifth value, the first syntax element indicates whether the first video block is coded with the DIMD, and the second syntax element indicates whether the first video block is coded with the ISP.

Clause 91. The method of clause 87, wherein the fifth syntax element is binarized with one of the following coding techniques: fixed length coding, truncated unary coding, unary coding, EG coding, or a flag.

Clause 92. The method of clause 87, wherein the fifth syntax element is bypass coded.

Clause 93. The method of clause 87, wherein the fifth syntax element is context coded based on coded information comprising at least one of the following: block dimensions of the first video block, a block size of the first video block, a slice type, a picture type, information of neighboring video blocks comprising at least one of adjacent or non-adjacent video blocks relative to the first video block, information of coding tools used for the first video block, or information of temporal layer.

Clause 94. The method of clause 57, wherein whether the first video block is allowed to be coded with the combination of the DIMD and the ISP is determined based on at least one syntax element.

Clause 95. The method of clause 94, wherein the at least one syntax element comprises a sixth syntax element indicating constraints information about the combination of the DIMD and the ISP.

Clause 96. The method of clause 95, wherein a seventh value of the sixth syntax element indicates that the combination of the DIMD and the ISP is not allowed for processing the first video block.

Clause 97. The method of clause 94, wherein the at least one syntax element comprises a seventh syntax element indicating constraints information about the DIMD, and an eighth syntax element indicating constraints information about the ISP.

Clause 98. The method of clause 97, wherein the combination of the DIMD and the ISP is not allowed for processing the first video block, if the seventh syntax element is set to an eighth value, or if the eighth syntax element is set to a nineth value, the eighth value is the same as or different from the nineth value.

Clause 99. The method of clause 94, wherein the at least one syntax element is included in one of the following: a sequence header, a picture header, a sequence parameter set (SPS), a video parameter set (VPS), decoding parameter set (DPS), decoding capability information (DCI), a picture parameter set (PPS), an adaptation parameter set (APS), a slice header, or a tile group header.

Clause 100. The method of any of clauses 1 to 99, wherein the conversion comprises decoding the picture from the bitstream of the video.

Clause 101. The method of any of clauses 1 to 99, wherein the conversion comprises encoding the picture into the bitstream of the video.

Clause 102. An apparatus for video processing, comprising a processor and a non-transitory memory coupled to the processor and having instructions stored thereon, wherein the instructions upon execution by the processor, cause the processor to: process, during a conversion between a picture of a video and a bitstream of the video, a first video block in the picture based on a combination of decoder-side intra prediction mode derivation (DIMD) and intra prediction with subpartitions (ISP), the DIMD being used for deriving at least one intra prediction mode (IPM); and perform the conversion based on the combined mode.

Clause 103. A non-transitory computer-readable storage medium storing instructions that cause a processor to perform a method in accordance with any of clauses 1 to 101.

Clause 104. A non-transitory computer-readable recording medium storing a bitstream of a video which is generated by a method performed by an apparatus for video processing, wherein the method comprises: processing a first video block in a picture of the video based on a combination of decoder-side intra prediction mode derivation (DIMD) and intra prediction with subpartitions (ISP), the DIMD being used for deriving at least one intra prediction mode (IPM); and generating the bitstream based on the combination of the DIMD and the ISP.

Clause 105. A method for storing a bitstream of a video, comprising: processing a first video block in a picture of the video based on a combination of decoder-side intra prediction mode derivation (DIMD) and intra prediction with subpartitions (ISP), the DIMD being used for deriving at least one intra prediction mode (IPM); generating the bitstream based on the combination of the DIMD and the ISP; and storing the bitstream in a non-transitory computer-readable recording medium.

Example Device

Figure 25:
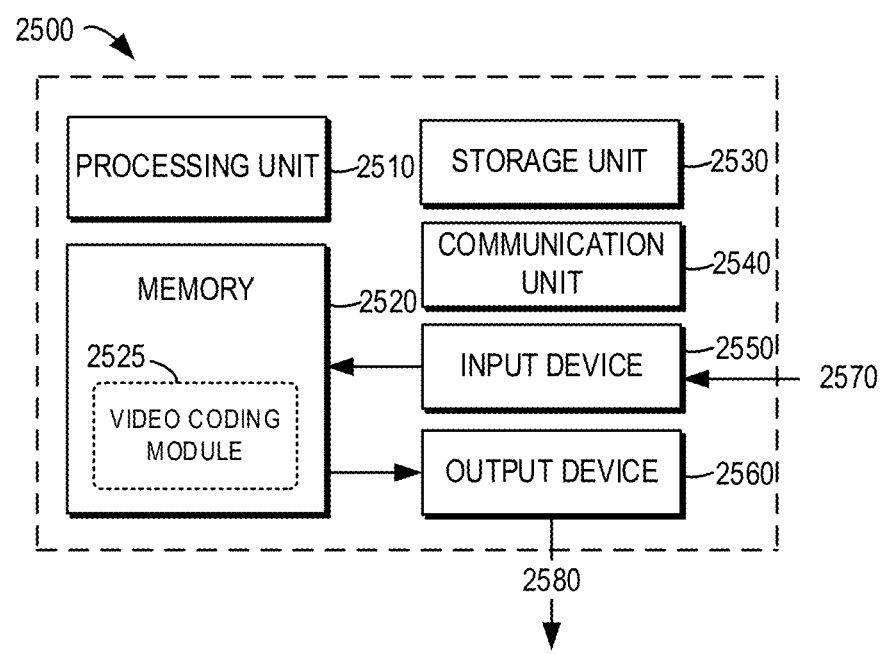
FIG. 25 illustrates a block diagram of a computing device in which various embodiments of the present disclosure can be implemented.

FIG. 25 illustrates a block diagram of a computing device 2500 in which various embodiments of the present disclosure can be implemented. The computing device 2500 may be implemented as or included in the source device 110 (or the video encoder 114 or 200) or the destination device 120 (or the video decoder 124 or 300).

It would be appreciated that the computing device 2500 shown in FIG. 25 is merely for purpose of illustration, without suggesting any limitation to the functions and scopes of the embodiments of the present disclosure in any manner.

As shown in FIG. 25, the computing device 2500 includes a general-purpose computing device 2500. The computing device 2500 may at least comprise one or more processors or processing units 2510, a memory 2520, a storage unit 2530, one or more communication units 2540, one or more input devices 2550, and one or more output devices 2560.

In some embodiments, the computing device 2500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 2500 can support any type of interface to a user (such as "wearable" circuitry and the like).

The processing unit 2510 may be a physical or virtual processor and can implement various processes based on programs stored in the memory 2520. In a multi-processor system, multiple processing units execute computer executable instructions in parallel so as to improve the parallel processing capability of the computing device 2500. The processing unit 2510 may also be referred to as a central processing unit (CPU), a microprocessor, a controller or a microcontroller.

The computing device 2500 typically includes various computer storage medium. Such medium can be any medium accessible by the computing device 2500, including, but not limited to, volatile and non-volatile medium, or detachable and non-detachable medium. The memory 2520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 2530 may be any detachable or non-detachable medium and may include a machine-readable medium such as a memory, flash memory drive, magnetic disk or another other media, which can be used for storing information and/or data and can be accessed in the computing device 2500.

The computing device 2500 may further include additional detachable/non-detachable, volatile/non-volatile memory medium. Although not shown in FIG. 25, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 2540 communicates with a further computing device via the communication medium. In addition, the functions of the components in the computing device 2500 can be implemented by a single computing cluster or multiple computing machines that can communicate via communication connections. Therefore, the computing device 2500 can operate in a networked environment using a logical connection with one or more other servers, networked personal computers (PCs) or further general network nodes.

The input device 2550 may be one or more of a variety of input devices, such as a mouse, keyboard, tracking ball, voice-input device, and the like. The output device 2560 may be one or more of a variety of output devices, such as a display, loudspeaker, printer, and the like. By means of the communication unit 2540, the computing device 2500 can further communicate with one or more external devices (not shown) such as the storage devices and display device, with one or more devices enabling the user to interact with the computing device 2500, or any devices (such as a network card, a modem and the like) enabling the computing device 2500 to communicate with one or more other computing devices, if required. Such communication can be performed via input/output (I/O) interfaces (not shown).

In some embodiments, instead of being integrated in a single device, some or all components of the computing device 2500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 2500 may be used to implement video encoding/decoding in embodiments of the present disclosure. The memory 2520 may include one or more video coding modules 2525 having one or more program instructions. These modules are accessible and executable by the processing unit 2510 to perform the functionalities of the various embodiments described herein.

In the example embodiments of performing video encoding, the input device 2550 may receive video data as an input 2570 to be encoded. The video data may be processed, for example, by the video coding module 2525, to generate an encoded bitstream. The encoded bitstream may be provided via the output device 2560 as an output 2580.

In the example embodiments of performing video decoding, the input device 2550 may receive an encoded bitstream as the input 2570. The encoded bitstream may be processed, for example, by the video coding module 2525, to generate decoded video data. The decoded video data may be provided via the output device 2560 as the output 2580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
processing, during a conversion between a picture of a video and a bitstream of the video, a first video block in the picture based on a combination of decoder-side intra prediction mode derivation (DIMD) and intra prediction with sub-partitions (ISP), the DIMD being used for deriving at least one intra prediction mode (IPM); and
performing the conversion based on the first video block,
wherein the bitstream comprises a first syntax element indicating whether the first video block is coded with the DIMD, a first value of the first syntax element indicates that the first video block is coded with the DIMD, a second value of the first syntax element indicates that the first video block is not coded with the DIMD, and the first value is different from the second value, and
wherein the bitstream further comprises a second syntax element indicating whether the first video block is coded with an ISP mode, a third value of the second syntax element indicates that the first video block is coded with the ISP mode, and a fourth value of the second syntax element indicates that the first video block is not coded with the ISP mode, and the third value is different from the fourth value.

2. The method of claim 1, wherein the first video block comprises a plurality of subpartitions, and the at least one IPM comprises a single first IPM, and wherein processing the first video block comprises:
processing at least one target subpartition of the plurality of subpartitions based on the first IPM.

3. The method of claim 1, wherein the first video block comprises a plurality of subpartitions, and the at least one IPM comprises at least a third IPM and a fourth IPM, and wherein processing the first video block comprises:
processing a first subpartition of the plurality of subpartitions based on the third IPM; and
processing a second subpartition of the plurality of subpartitions based on the fourth IPM, the third IPM being different from the fourth IPM, or
wherein the DIMD is applied per subpartition of the first video block.

4. The method of claim 1, wherein whether at least one of horizontal or vertical ISP split is allowed for the first video block coded with the combination of the DIMD and the ISP is the same as for a second video block coded with an ISP mode, or
wherein the number of subpartitions in the first video block is 2 or 4, or
wherein the coded information comprises at least one of the following:
block dimensions of the first video block,
a block size of the first video block,
a block depth of the first video block,
a slice type of the picture,
a picture type of the picture,
information of temporal layer,
information of the ISP comprising at least one of a type of the IPS or a number of subpartitions in the first video block, the type of the IPS comprising one of horizontal ISP split and vertical ISP split, or
information of a color component.

5. The method of claim 1, wherein a plurality of the IPMs is used by the first video block coded with the combination of the DIMD and the ISP, or a second video block of the picture coded with the ISP, or
wherein the plurality of the IPMs is used for an intra prediction of a subpartition in the first video block.

6. The method of claim 5, wherein a plurality of predicted samples of the subpartition is generated based on the plurality of the IPMs, or
wherein a first predicted sample of the plurality of predicted samples is generated based on a first IPM of the plurality of the IPMS, and a second predicted sample of the plurality of predicted samples is generated based on a second IPM of the plurality of the IPMS, and wherein processing the first video block further comprises:
generating a plurality of target predicted samples of the subpartition by weighted blending the plurality of predicted samples.

7. The method of claim 1, wherein a determination of whether to use at least one transform for the first video block is the same as for a second video block coded with an ISP mode, or
wherein a determination of using which type of at least one transform for the first video block is the same as for a second video block coded with an ISP mode, or
wherein at least one set of multiple transform selection (MTS) is used for the first video block coded with the combination of the DIMD and the ISP, or wherein a single set of MTS is used for the first video block coded with the combination of the DIMD and the ISP, and a MTS index is not included in the bitstream.

8. The method of claim 1, wherein a determination of whether to use a secondary transform for the first video block coded with the combination of the DIMD and the ISP is the same as for a second video block coded with an ISP mode, or different from for the second video block coded with the ISP mode.

9. The method of claim 8, wherein the secondary transform is disabled for the first video block coded with the combination of the DIMD and the ISP, and an index of the secondary transform is not included in the bitstream, or
wherein at least one set of the secondary transform is used for the first video block coded with the combination of the DIMD and the ISP, and wherein a single set of the secondary transform is used for the first video block coded with the combination of the DIMD and the ISP, and an index of the set of the secondary transform is not included in the bitstream.

10. The method of claim 1, wherein an indication of the combination of the DIMD and the ISP is included in the bitstream, or
wherein whether the indication is included in the bitstream is based on at least one of the following:
whether at least one of the DIMS or the ISP is allowed for the first video block,
block dimensions of the first video block,
a block size of the first video block,
a block depth of the first video block,
a slice type,
a picture type,
a partition tree type comprising one of a single tree, a dual tree or a local dual tree,
a block location of the first video block, or
a color component.

11. The method of claim 1, wherein at least one syntax element is included in the bitstream for indicating whether the first video block is coded with the combination of the DIMD and the ISP.

12. The method of claim 1, wherein the first syntax element is included before the second syntax element in the bitstream, or
wherein the second syntax element is included before the first syntax element in the bitstream.

13. The method of claim 11, wherein the at least one syntax element comprises a fifth syntax element indicating whether the first video block is coded with the combination of the DIMD and the ISP, or
wherein whether the first video block is allowed to be coded with the combination of the DIMD and the ISP is determined based on at least one syntax element.

14. The method of claim 13, wherein the at least one syntax element comprises a sixth syntax element indicating constraints information about the combination of the DIMD and the ISP, or
wherein a seventh value of the sixth syntax element indicates that the combination of the DIMD and the ISP is not allowed for processing the first video block.

15. The method of claim 13, wherein the at least one syntax element comprises a seventh syntax element indicating constraints information about the DIMD, and an eighth syntax element indicating constraints information about the ISP, or
wherein the combination of the DIMD and the ISP is not allowed for processing the first video block, if the seventh syntax element is set to an eighth value, or if the eighth syntax element is set to a nineth value, the eighth value is the same as or different from the nineth value, or wherein the at least one syntax element is included in one of the following: a sequence header, a picture header, a sequence parameter set (SPS), a video parameter set (VPS), decoding parameter set (DPS), decoding capability information (DCI), a picture parameter set (PPS), an adaptation parameter set (APS), a slice header, or a tile group header.

16. The method of claim 1, wherein the conversion comprises decoding the picture from the bitstream of the video, or wherein the conversion comprises encoding the picture into the bitstream of the video.

17. An apparatus for video processing, comprising a processor and a non-transitory memory coupled to the processor and having instructions stored thereon, wherein the instructions upon execution by the processor, cause the processor to:

process, during a conversion between a picture of a video and a bitstream of the video, a first video block in the picture based on a combination of decoder-side intra prediction mode derivation (DIMD) and intra prediction with sub-partitions (ISP), the DIMD being used for deriving at least one intra prediction mode (IPM); and perform the conversion based on the first video block, wherein the bitstream comprises a first syntax element indicating whether the first video block is coded with the DIMD, a first value of the first syntax element indicates that the first video block is coded with the DIMD, a second value of the first syntax element indicates that the first video block is not coded with the DIMD, and the first value is different from the second value, and wherein the bitstream further comprises a second syntax element indicating whether the first video block is coded with an ISP mode, a third value of the second syntax element indicates that the first video block is coded with the ISP mode, and a fourth value of the second syntax element indicates that the first video block is not coded with the ISP mode, and the third value is different from the fourth value.

18. A non-transitory computer-readable storage medium storing instructions that cause a processor to perform a method for video processing comprising:

processing, during a conversion between a picture of a video and a bitstream of the video, a first video block in the picture based on a combination of decoder-side intra prediction mode derivation (DIMD) and intra prediction with sub-partitions (ISP), the DIMD being used for deriving at least one intra prediction mode (IPM); and performing the conversion based on the first video block, wherein the bitstream comprises a first syntax element indicating whether the first video block is coded with the DIMD, a first value of the first syntax element indicates that the first video block is coded with the DIMD, a second value of the first syntax element indicates that the first video block is not coded with the DIMD, and the first value is different from the second value, and wherein the bitstream further comprises a second syntax element indicating whether the first video block is coded with an ISP mode, a third value of the second syntax element indicates that the first video block is coded with the ISP mode, and a fourth value of the second syntax element indicates that the first video block is not coded with the ISP mode, and the third value is different from the fourth value.

19. The method of claim 1, further comprising:

storing the bitstream in a non-transitory computer-readable recording medium.

* * * * *